(12) United States Patent
Thompson

(10) Patent No.: US 7,144,326 B2
(45) Date of Patent: Dec. 5, 2006

(54) CONSTANT VELOCITY COUPLING AND CONTROL SYSTEM THEREFOR

(76) Inventor: Glenn Alexander Thompson, 68 Summer Street, Orange NSW 2800 (AU)

( * ) Notice: Subject to any disclaimer, the term of this patent is extended or adjusted under 35 U.S.C. 154(b) by 0 days.

(21) Appl. No.: 10/472,969

(22) PCT Filed: Mar. 26, 2002

(86) PCT No.: PCT/IB02/00927

§ 371 (c)(1),
(2), (4) Date: Sep. 26, 2003

(87) PCT Pub. No.: WO02/077479

PCT Pub. Date: Oct. 3, 2002

(65) Prior Publication Data

US 2004/0106458 A1    Jun. 3, 2004

(30) Foreign Application Priority Data

| Mar. 26, 2001 | (AU) | ..... | PR3946 |
| Apr. 19, 2001 | (AU) | ..... | PR4452 |
| Apr. 30, 2001 | (AU) | ..... | PR4620 |
| May 7, 2001 | (AU) | ..... | PR4767 |
| May 18, 2001 | (AU) | ..... | PR5078 |
| Jun. 18, 2001 | (AU) | ..... | PR5731 |
| Jun. 29, 2001 | (AU) | ..... | PR5979 |
| Jun. 29, 2001 | (AU) | ..... | PR5992 |
| Jul. 2, 2001 | (AU) | ..... | PR6075 |
| Sep. 10, 2001 | (AU) | ..... | PR7569 |
| Dec. 21, 2001 | (AU) | ..... | PR9690 |

(51) Int. Cl.
*F16D 3/16*    (2006.01)

(52) U.S. Cl. ............. 464/112; 464/125; 464/106; 464/904; 464/905; 464/136

(58) Field of Classification Search ............. 464/125, 464/126, 136, 112, 106, 904, 905
See application file for complete search history.

(56) References Cited

U.S. PATENT DOCUMENTS

| 1,180,468 | A | * | 4/1916 | Bartlett | .............. 464/136 |
| 2,432,395 | A | * | 12/1947 | Dunn | .............. 464/124 |
| 2,864,246 | A | | 12/1958 | Hulse | |
| 3,456,456 | A | | 7/1969 | Dixon | |
| 3,456,458 | A | * | 7/1969 | Dixon | .............. 464/125 |
| 3,517,528 | A | * | 6/1970 | Eccher | .............. 464/125 |
| 3,965,700 | A | | 6/1976 | Nicoletti | |
| 4,103,513 | A | | 8/1978 | Grosser | |
| 4,509,932 | A | | 4/1985 | Weible | |
| 5,954,586 | A | | 9/1999 | Kirson | |

FOREIGN PATENT DOCUMENTS

AU          42595          8/1968

(Continued)

*Primary Examiner*—Aaron Dunwoody
(74) *Attorney, Agent, or Firm*—Knobbe, Martens, Olson & Bear LLP

(57) ABSTRACT

A constant velocity coupling which rotabably connects an input shaft to an output shaft by means of a control mechanism or control system which, in particular forms, includes a gimbal arrangement comprised of an inner yoke rotatably connected to an outer yoke. The control mechanism including control yoke constrains at least portions of the coupling to lie on or in association with a homokinetic plane of the coupling. In particular forms the control mechanism operates symmetrically about supplementary angle bisector.

1 Claim, 52 Drawing Sheets

FOREIGN PATENT DOCUMENTS

| | | |
|---|---|---|
| DE | 2453084 | 5/1976 |
| DE | 2454011 | 5/1976 |
| EP | 0 361 745 | 4/1990 |
| GB | 2 089 471 | 6/1982 |
| JP | 10-37848 | 2/1998 |
| JP | 10037848 | 2/1998 |

* cited by examiner

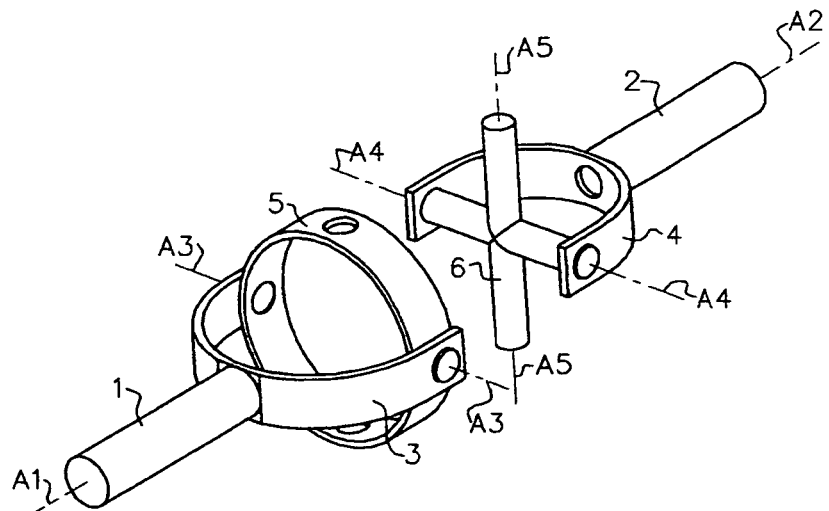
Fig. 14.1
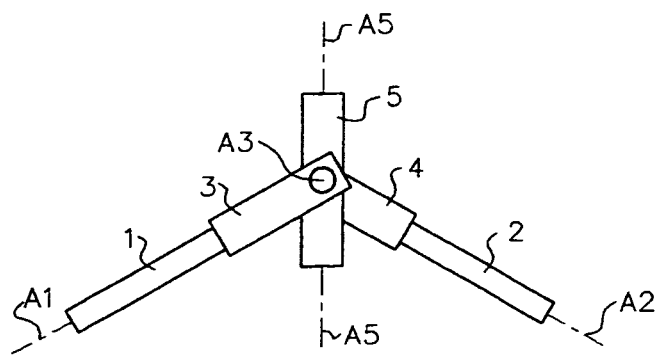
Fig. 14.2
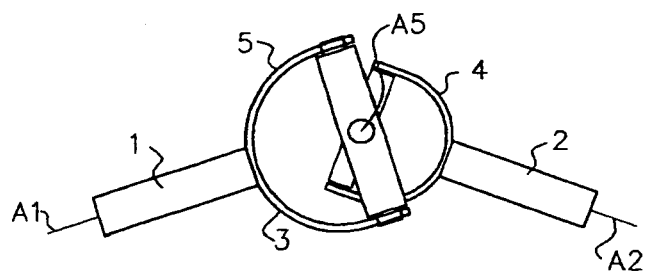
Fig. 14.3

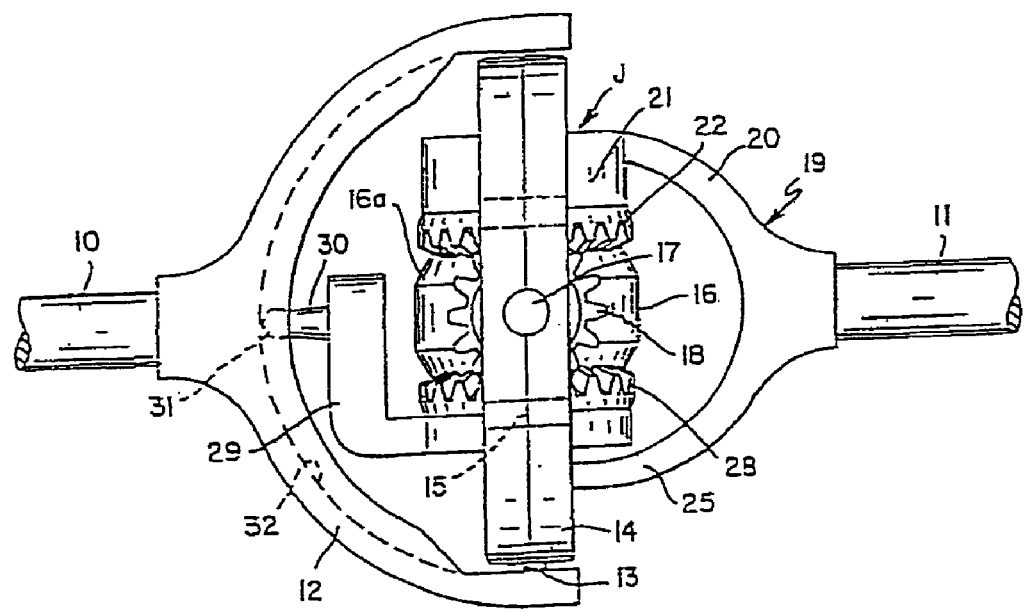
Fig. 14.4
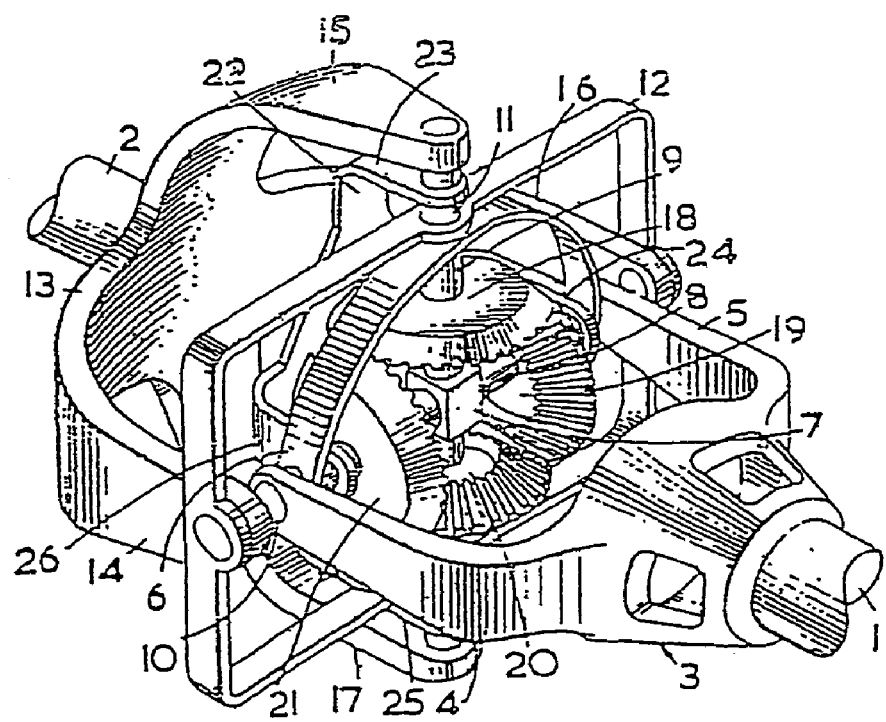
Fig. 14.5

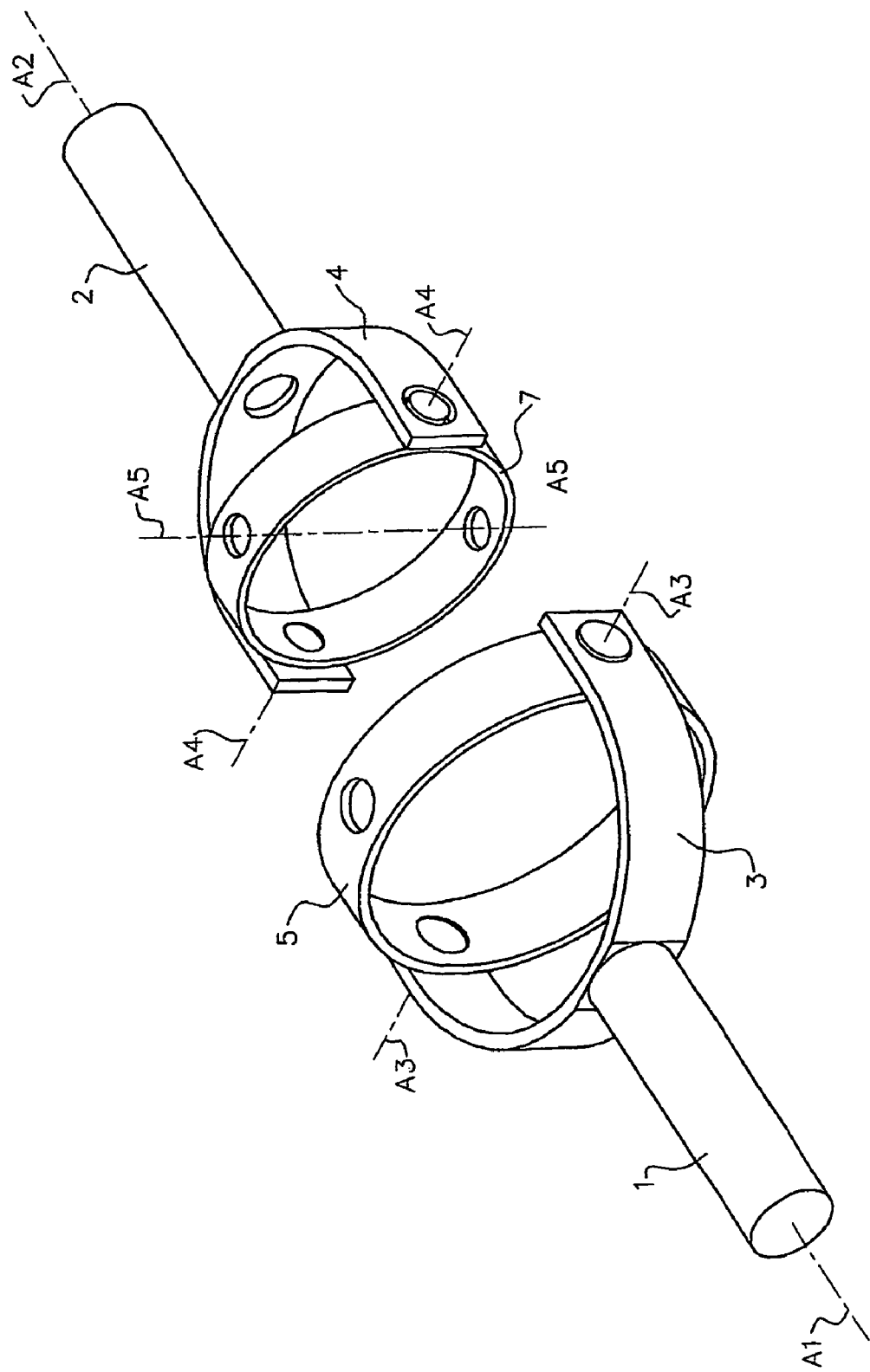
Fig. 14.6

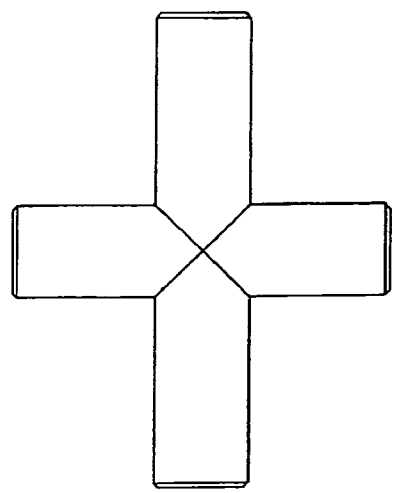
Fig. 14.7
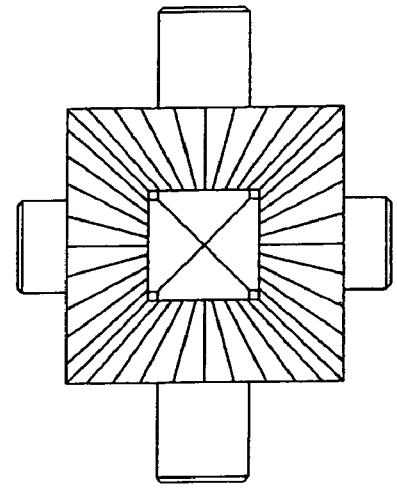
Fig. 14.8
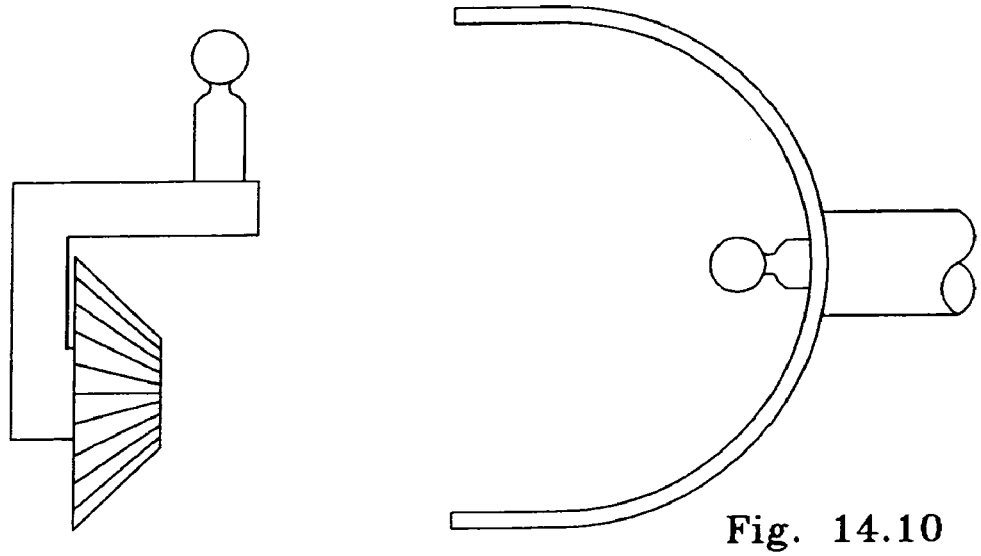
Fig. 14.9
Fig. 14.10
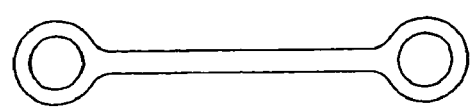
Fig. 14.11

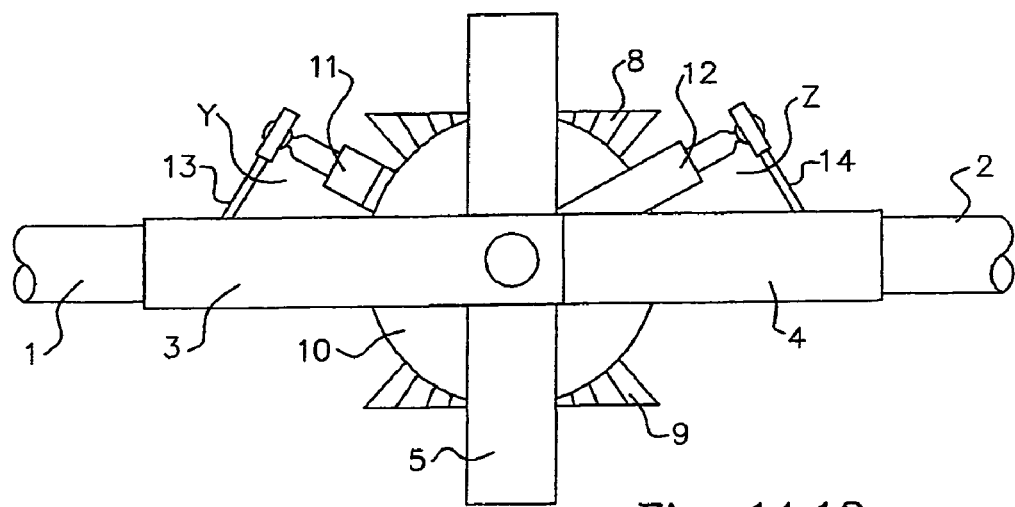
Fig. 14.12
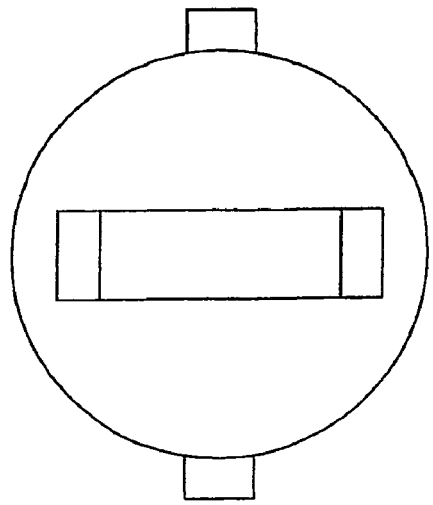
Fig. 14.13
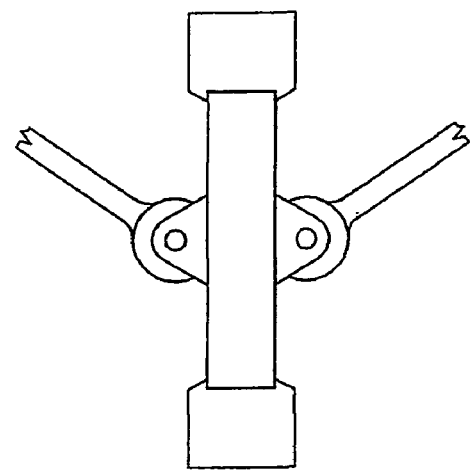
Fig. 14.14
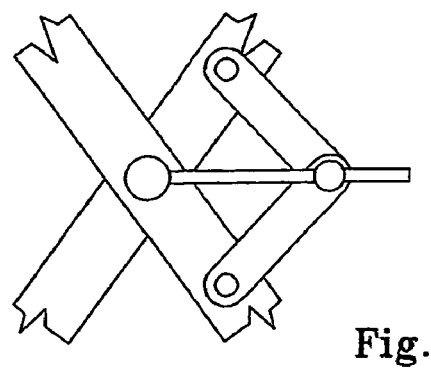
Fig. 14.15

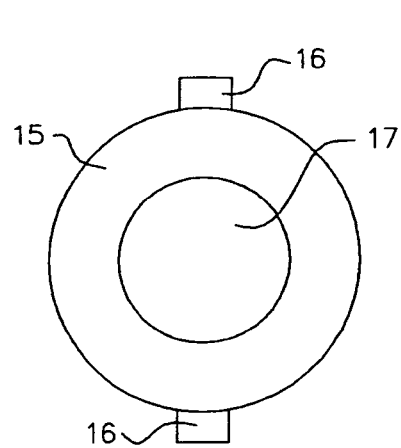
Fig. 14.16
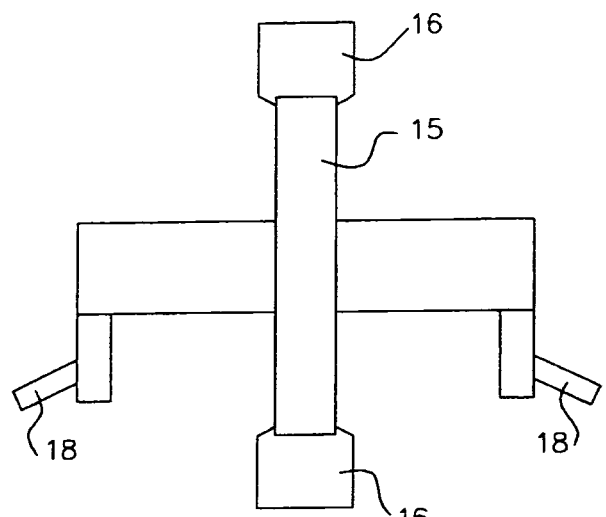
Fig. 14.18
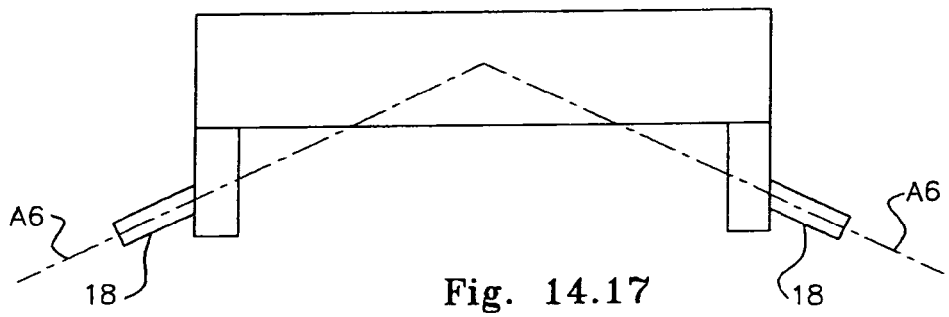
Fig. 14.17
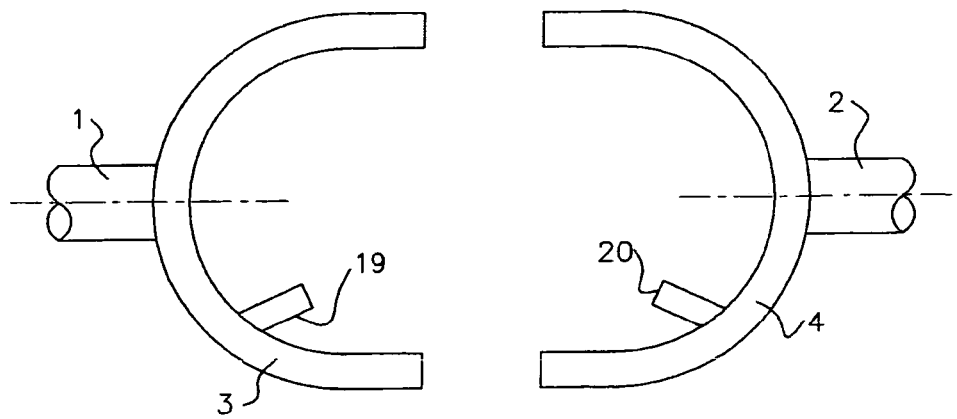
Fig. 14.19

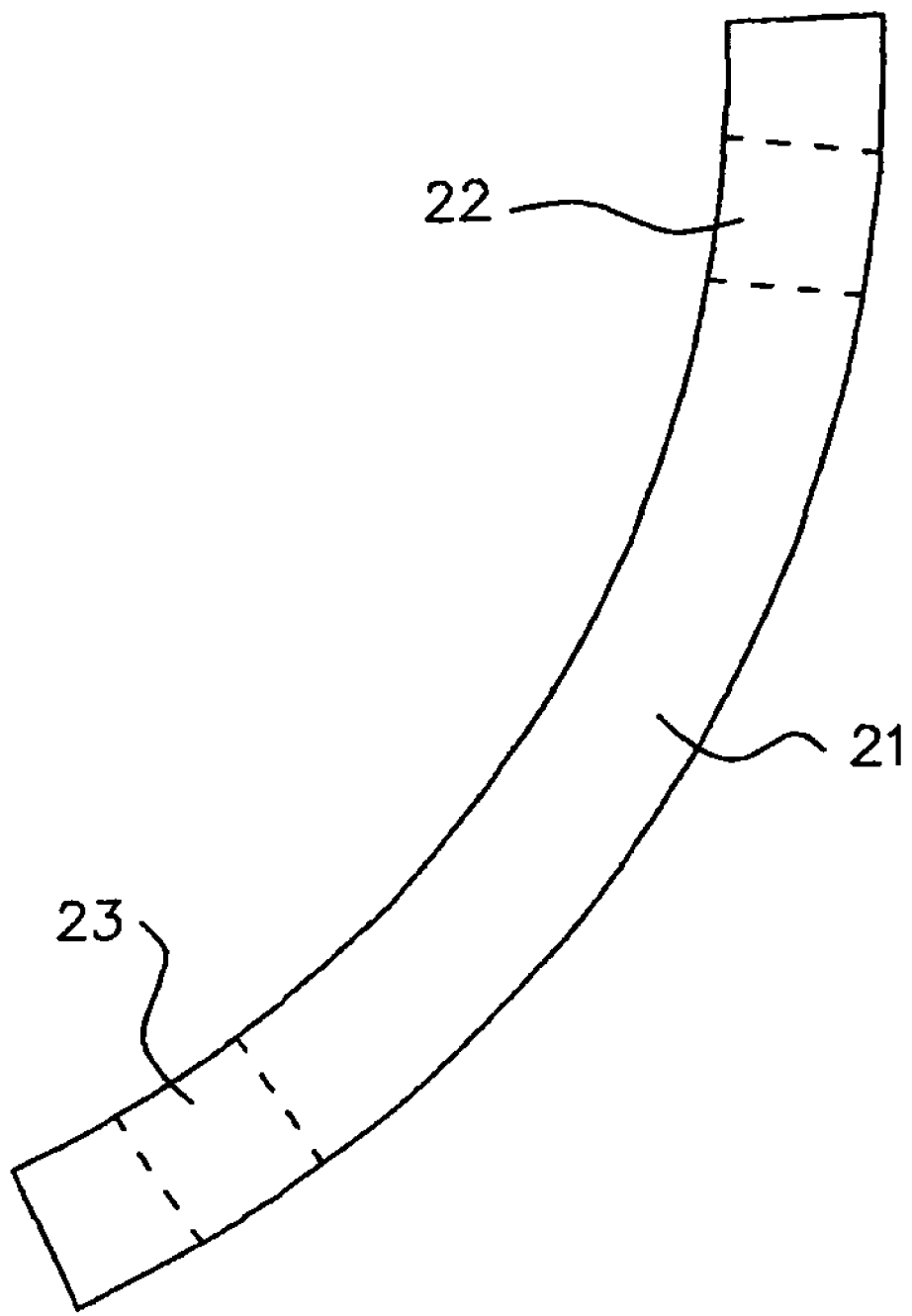
Fig. 14.20

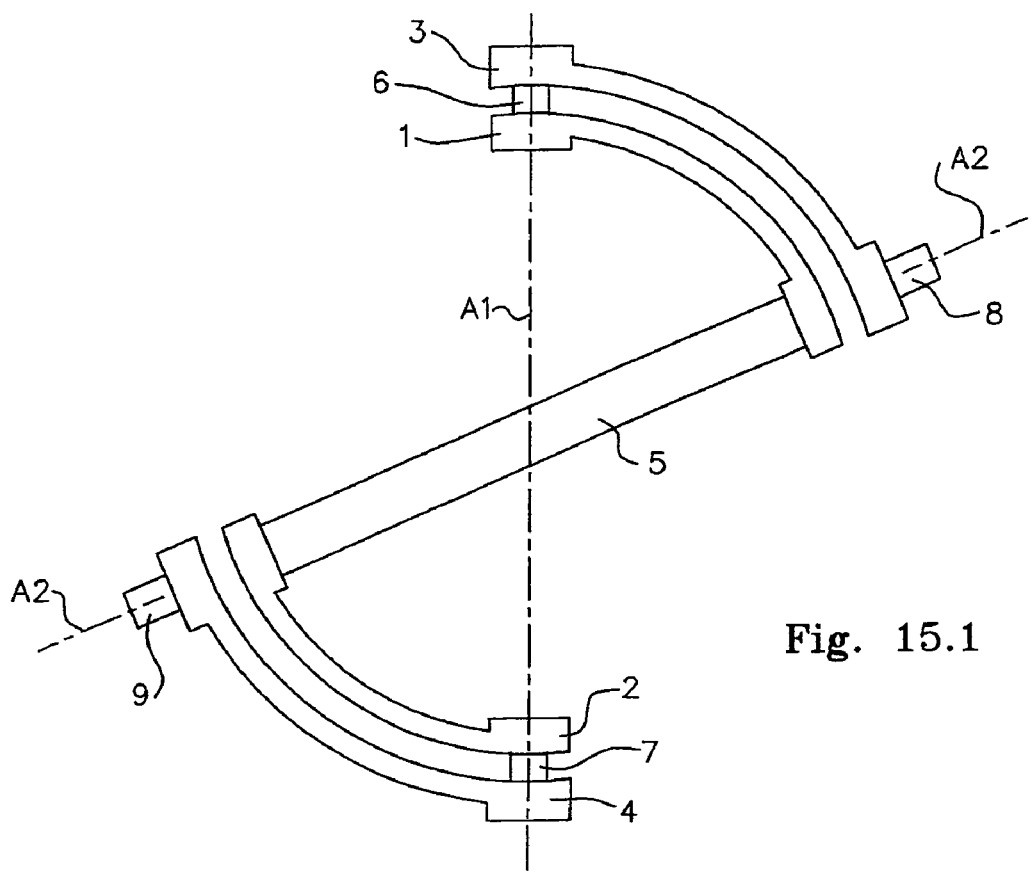
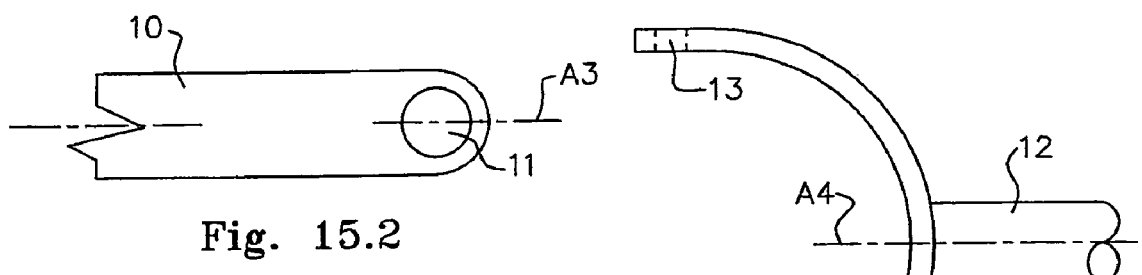
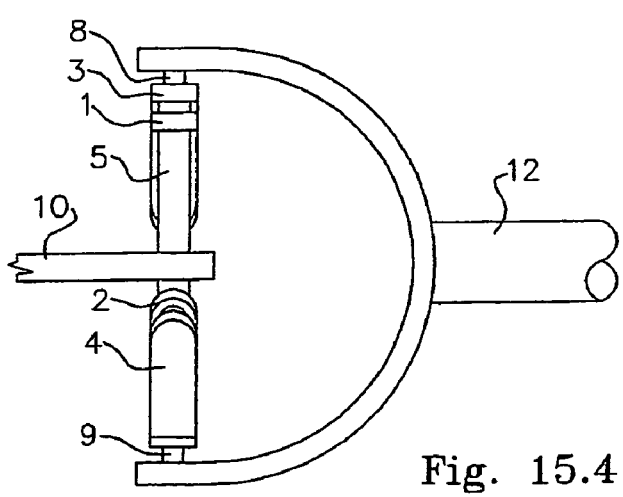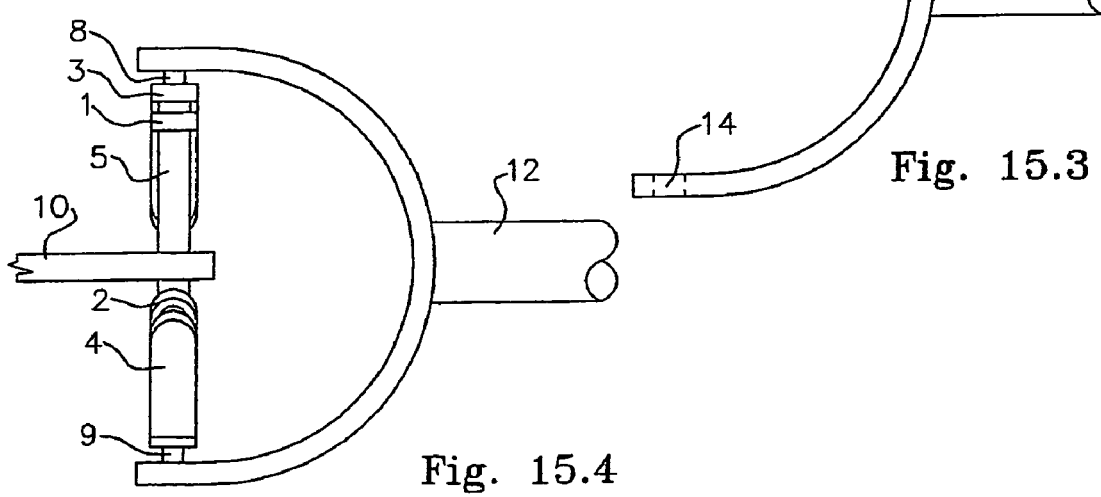
Fig. 15.1
Fig. 15.2
Fig. 15.3
Fig. 15.4

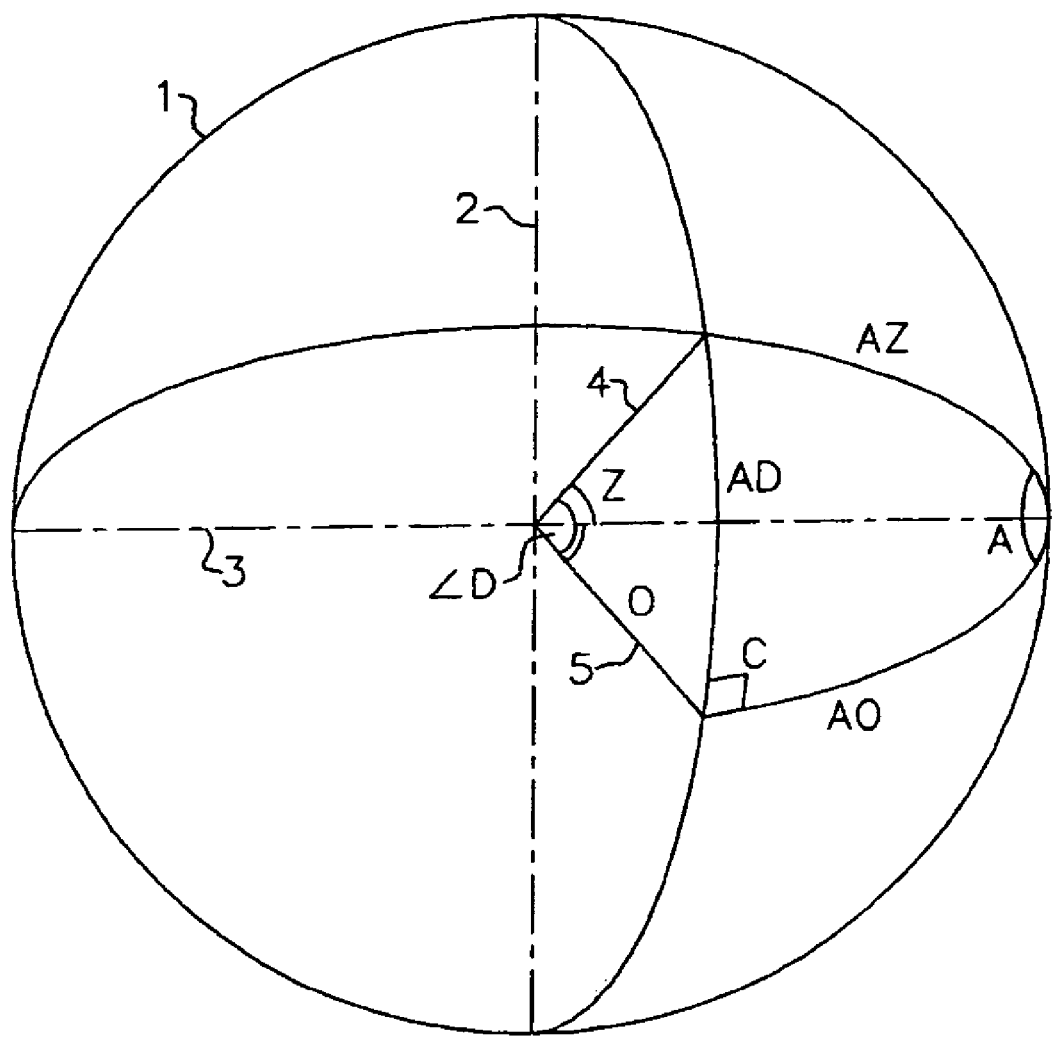
Fig. 16.1

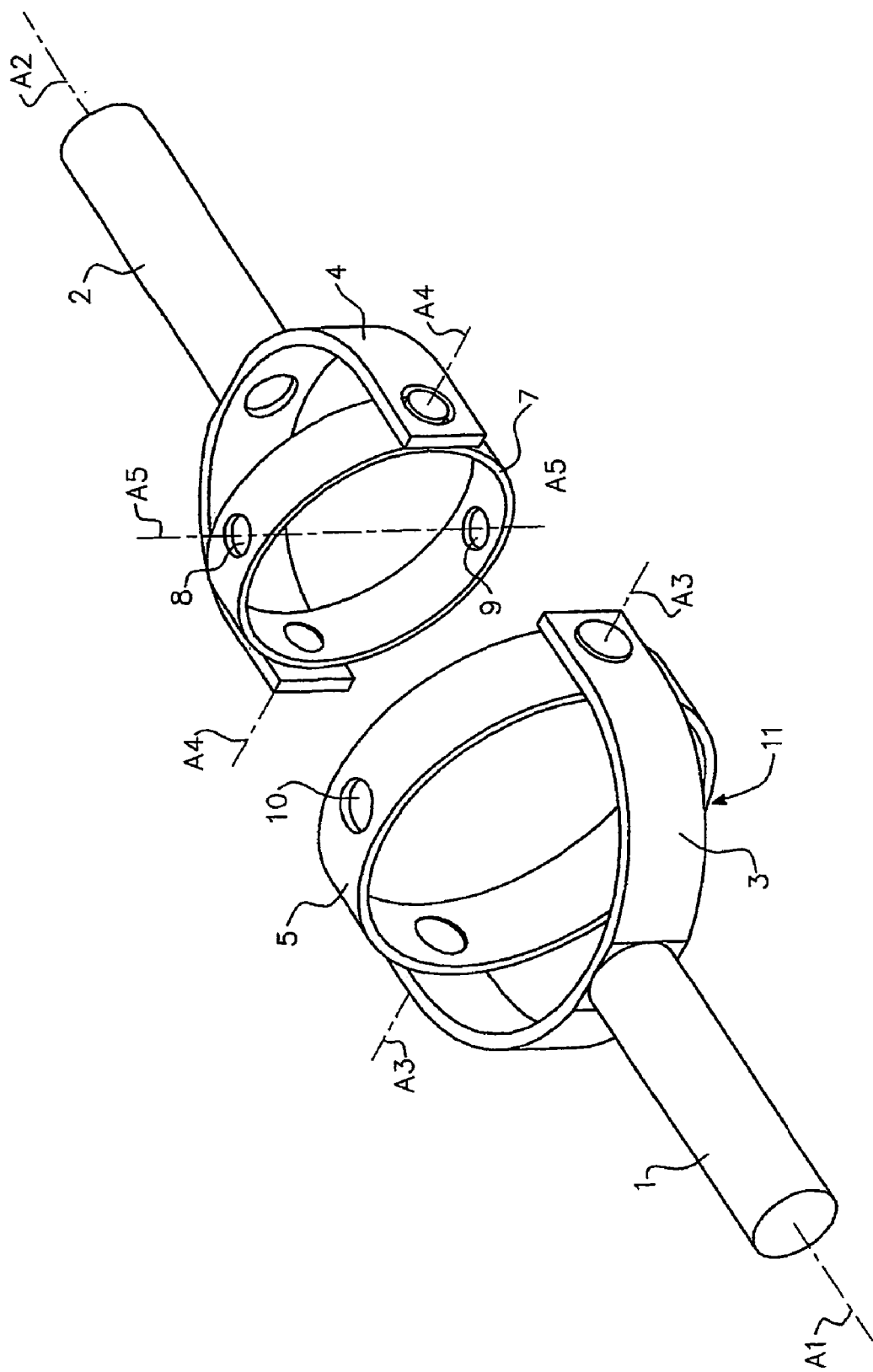
Fig. 16.2

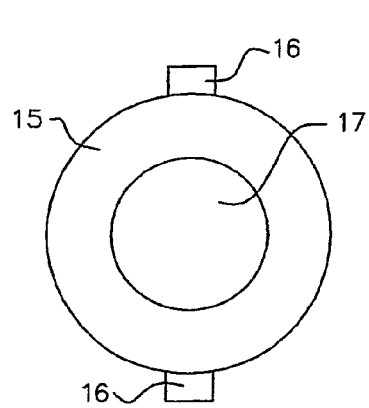
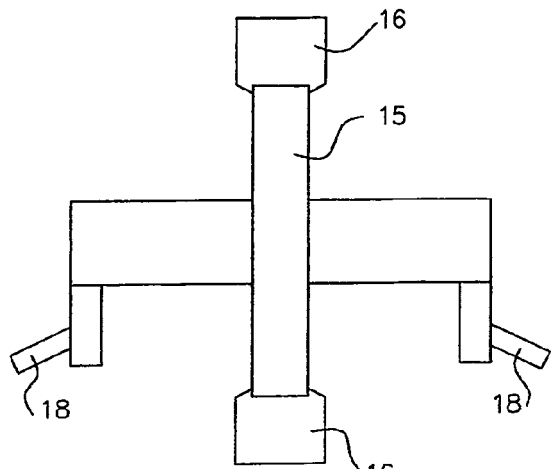
Fig. 16.3    Fig. 16.4
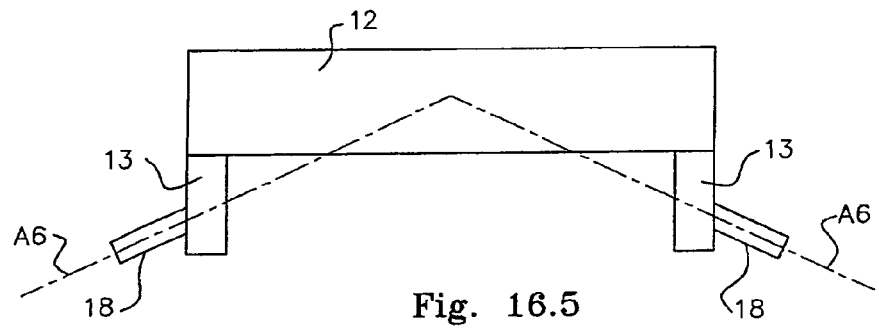
Fig. 16.5
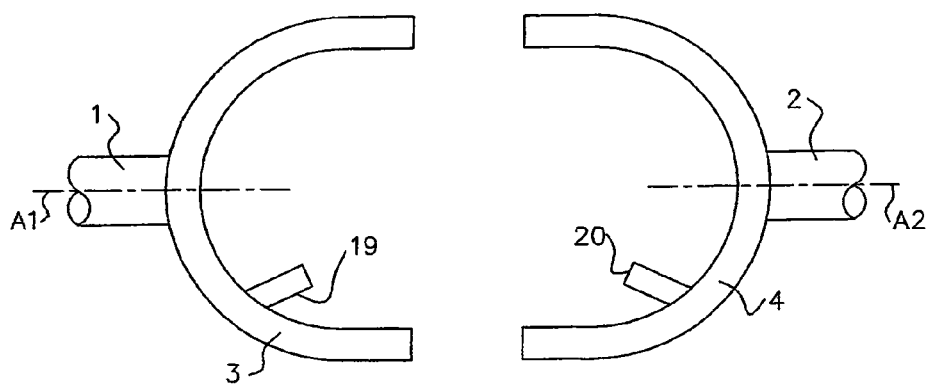
Fig. 16.6

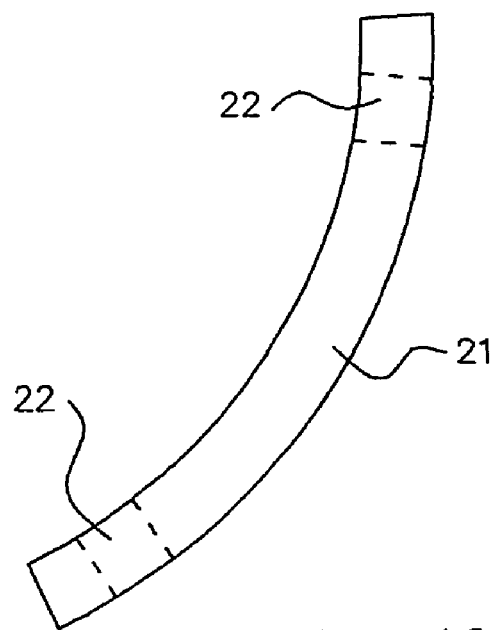
Fig. 16.7
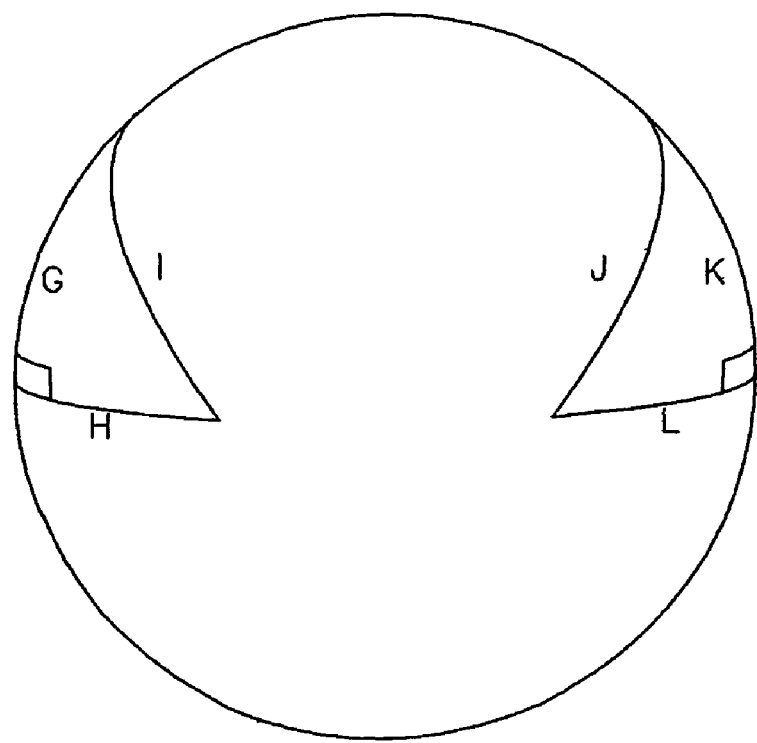
Fig. 16.8

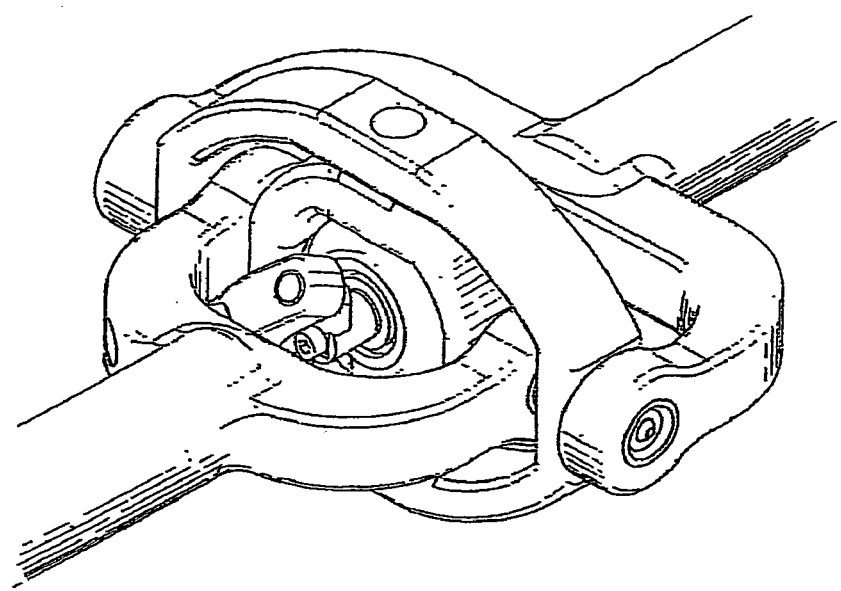
Fig. 16.8A
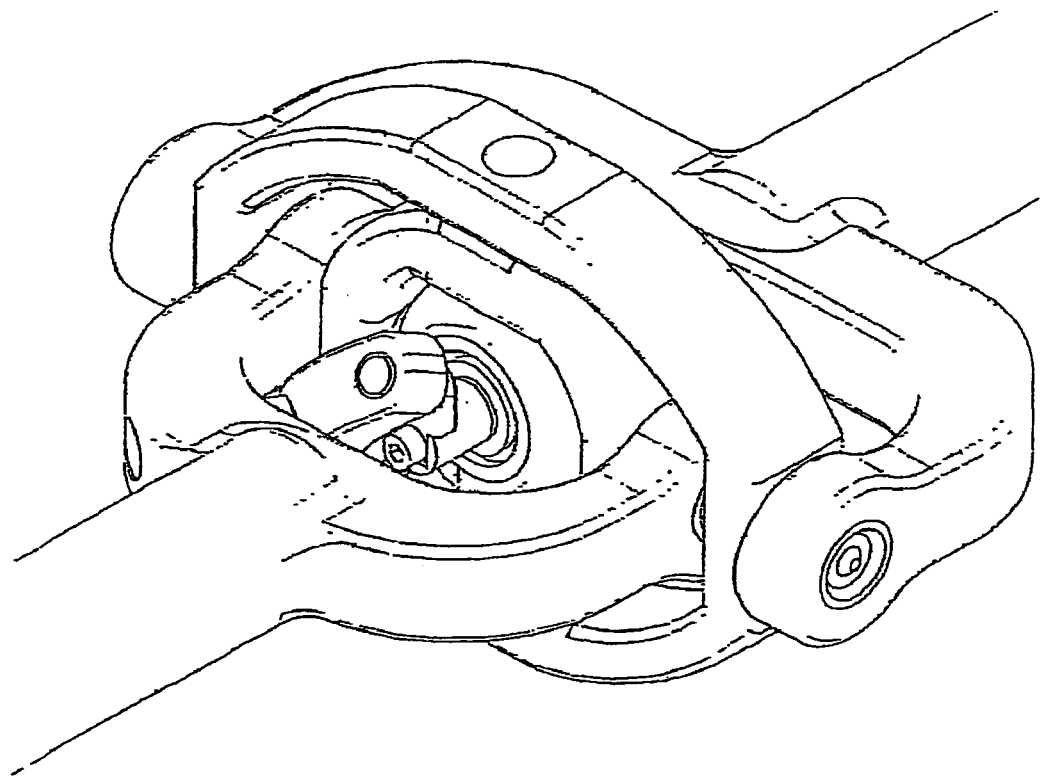
Fig. 16.8B

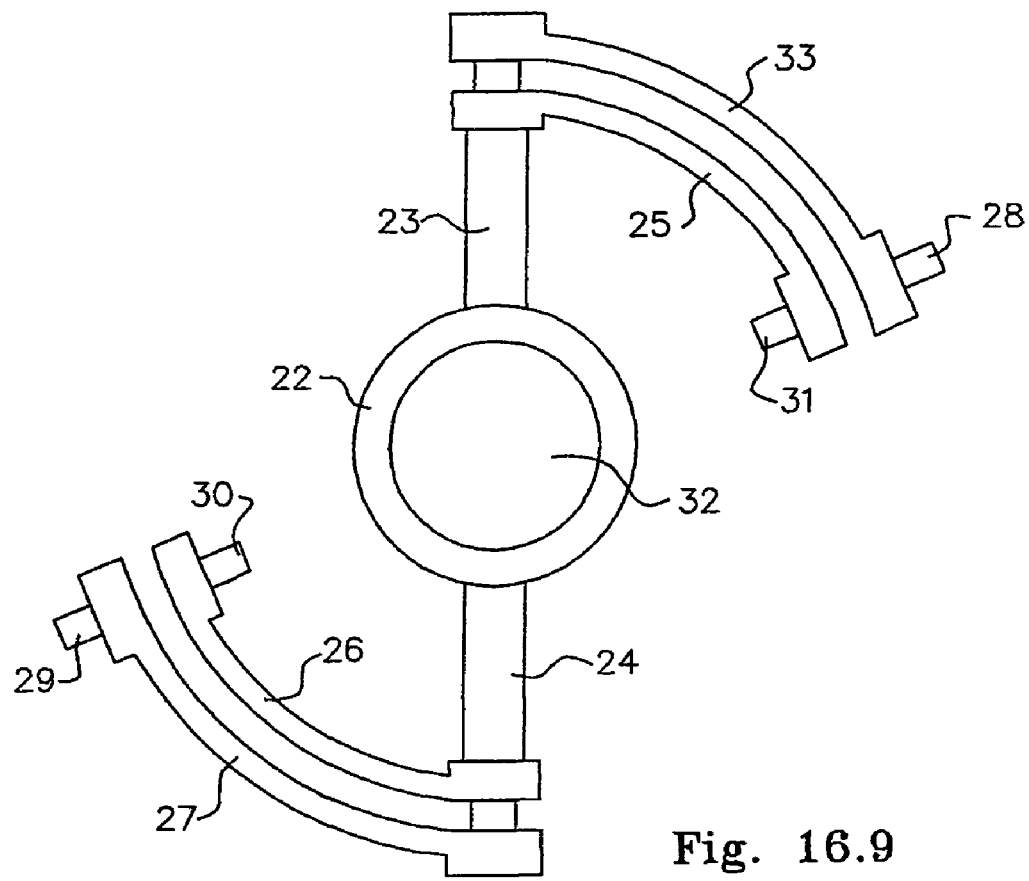
Fig. 16.9
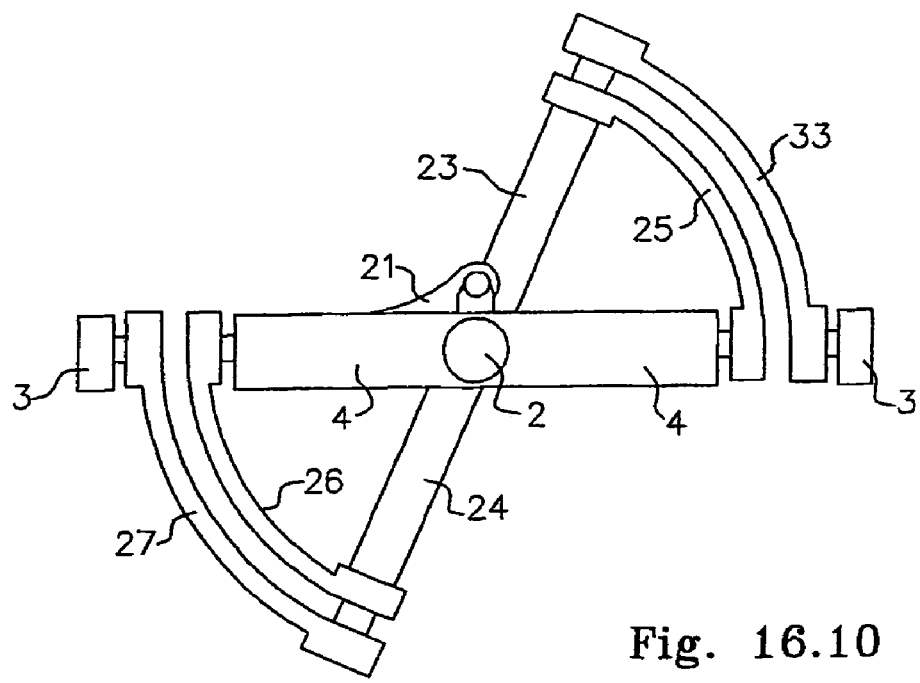
Fig. 16.10

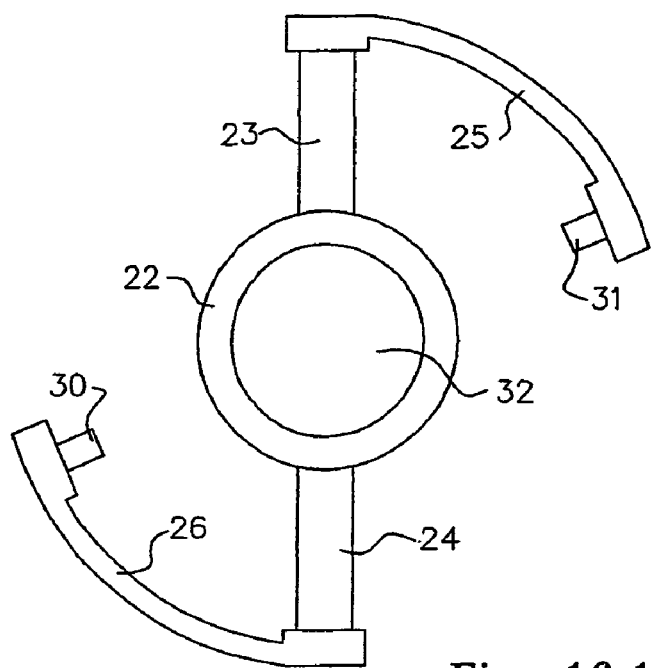
Fig. 16.11
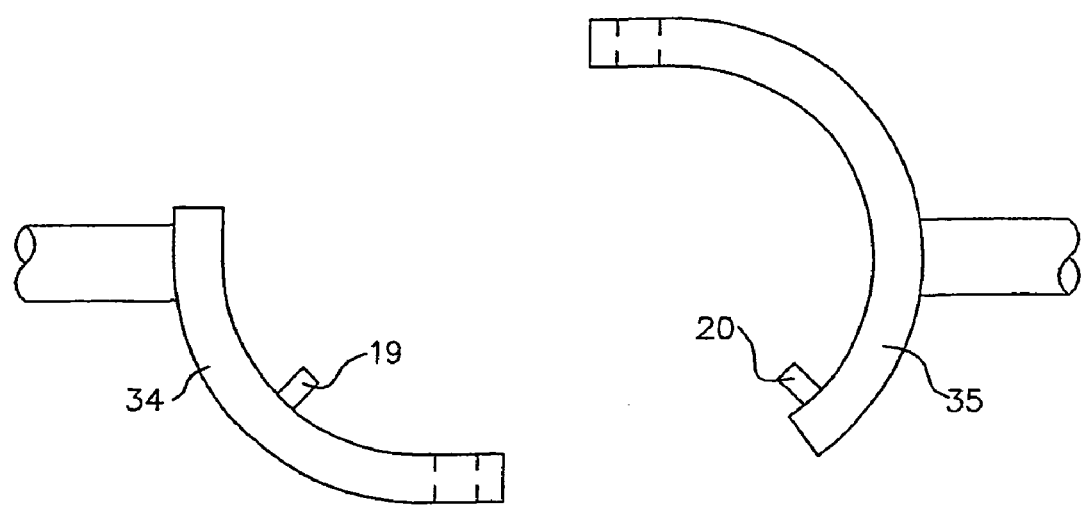
Fig. 16.12

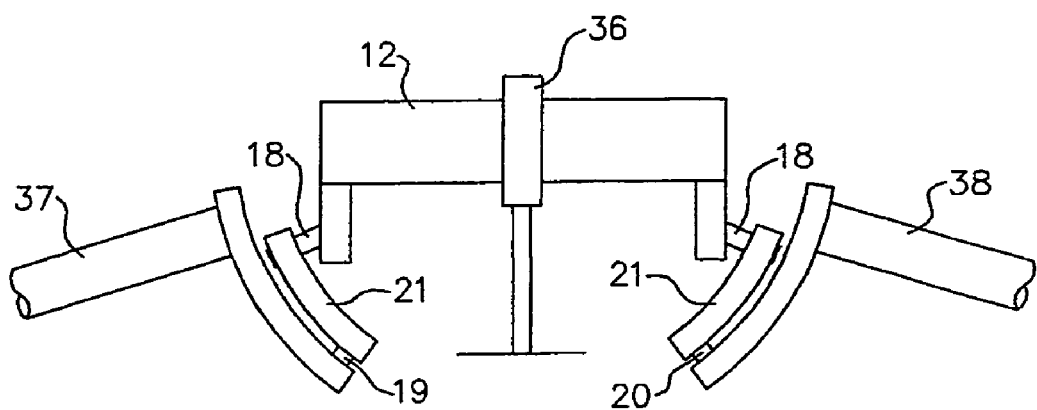
Fig. 16.13
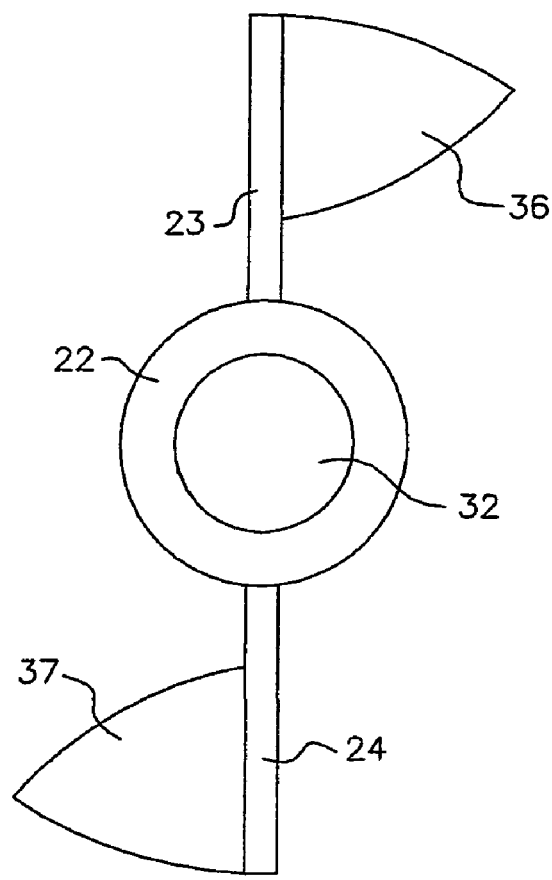
Fig. 16.14

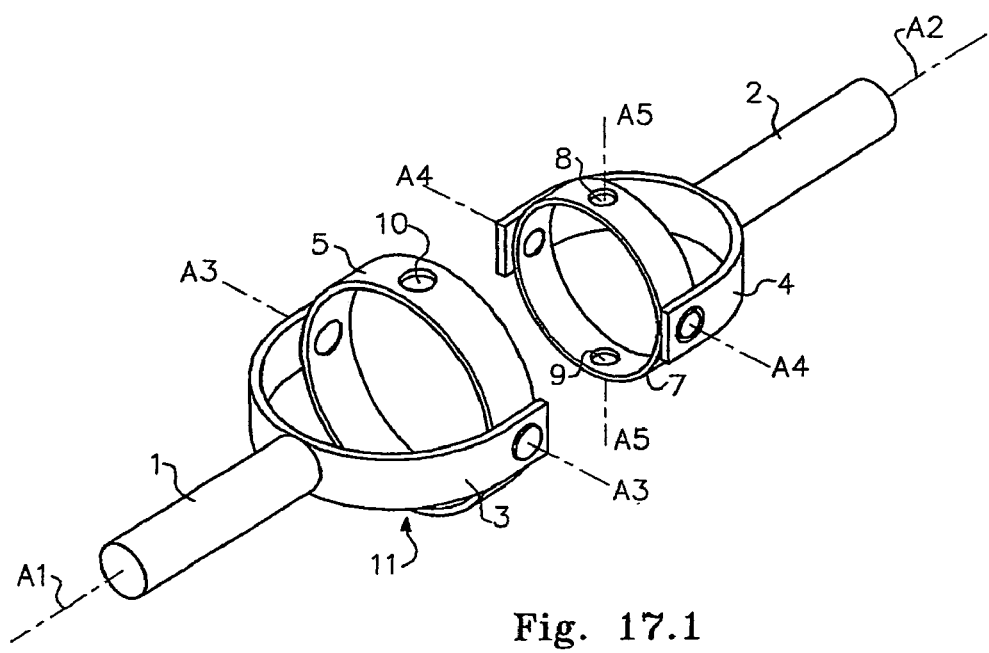
Fig. 17.1
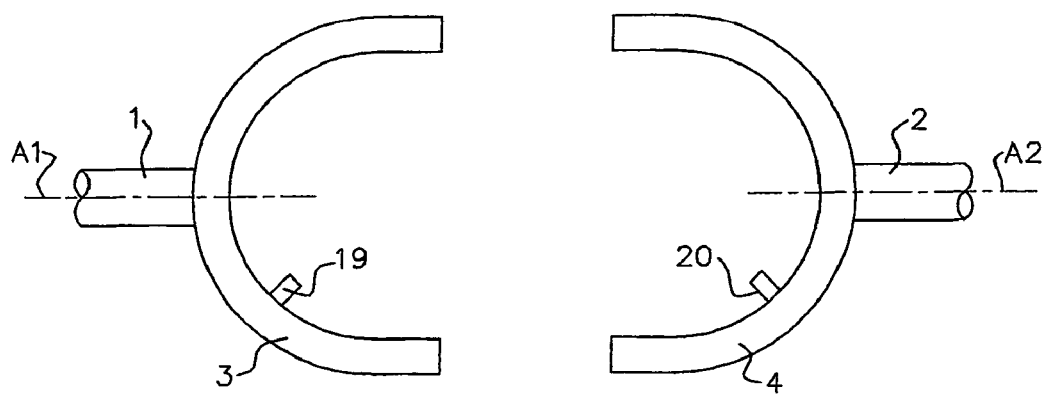
Fig. 17.2

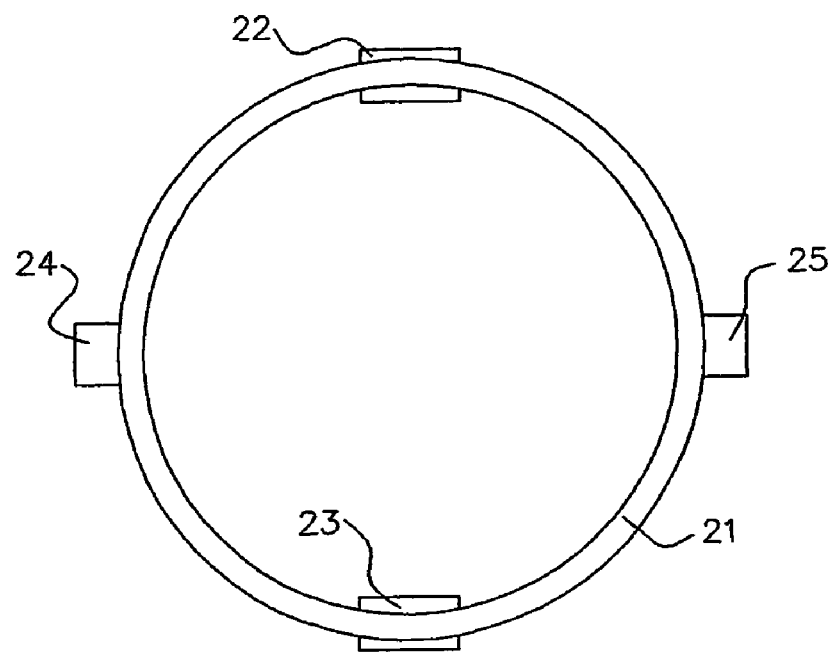
Fig. 17.3
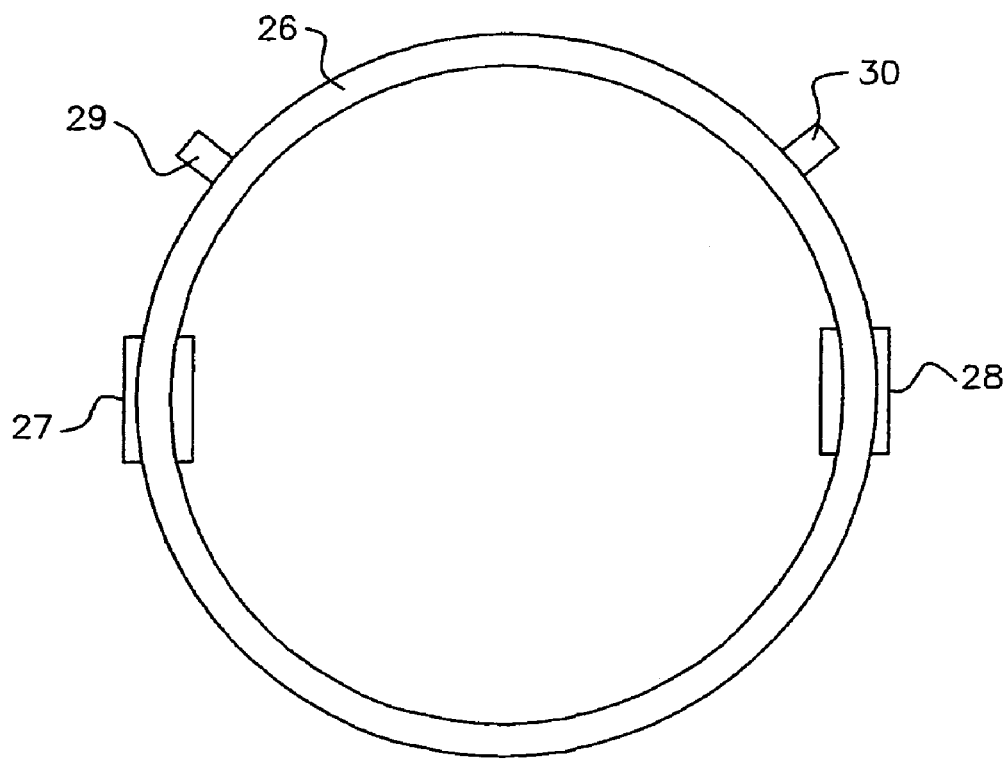
Fig. 17.4

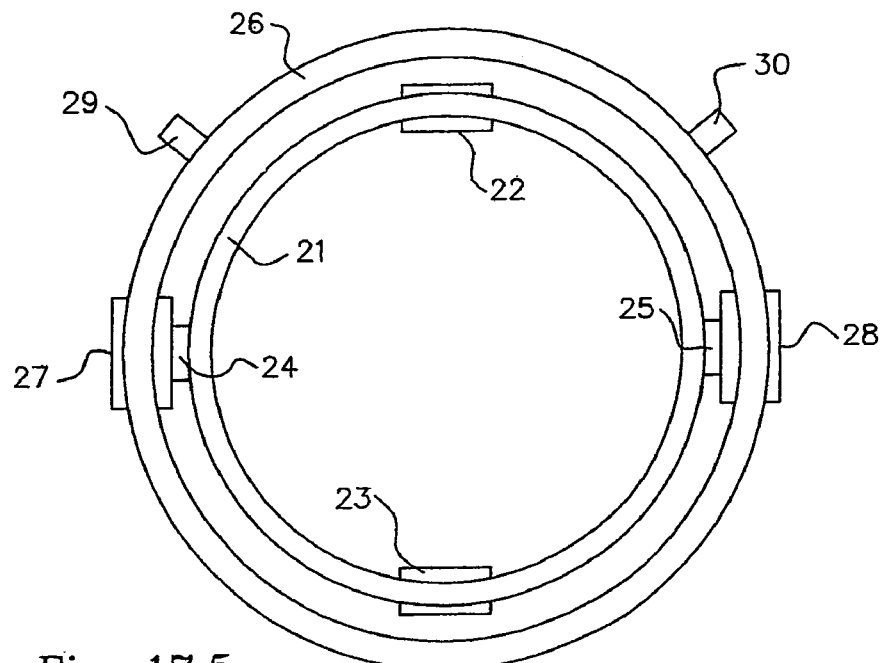
Fig. 17.5
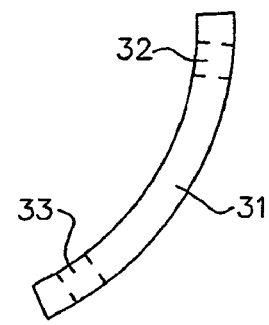
Fig. 17.7
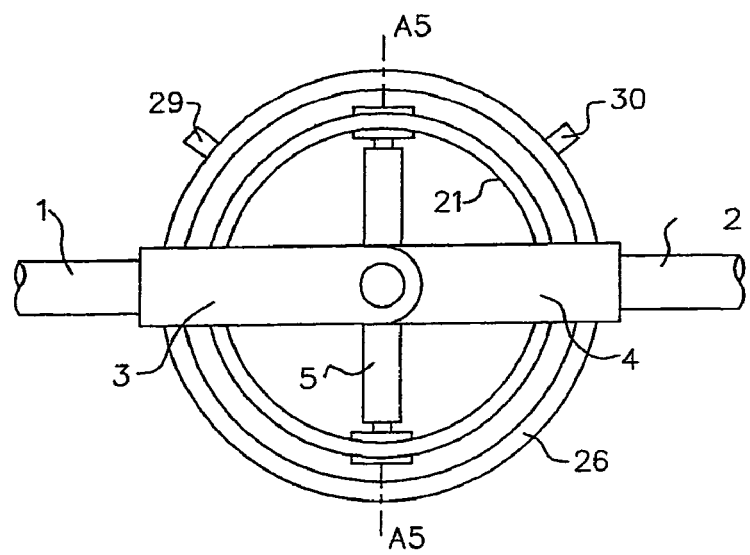
Fig. 17.6

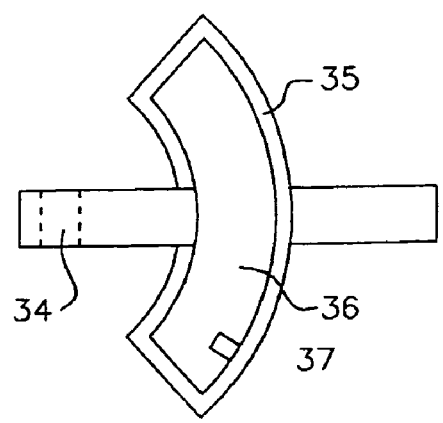
Fig. 17.8
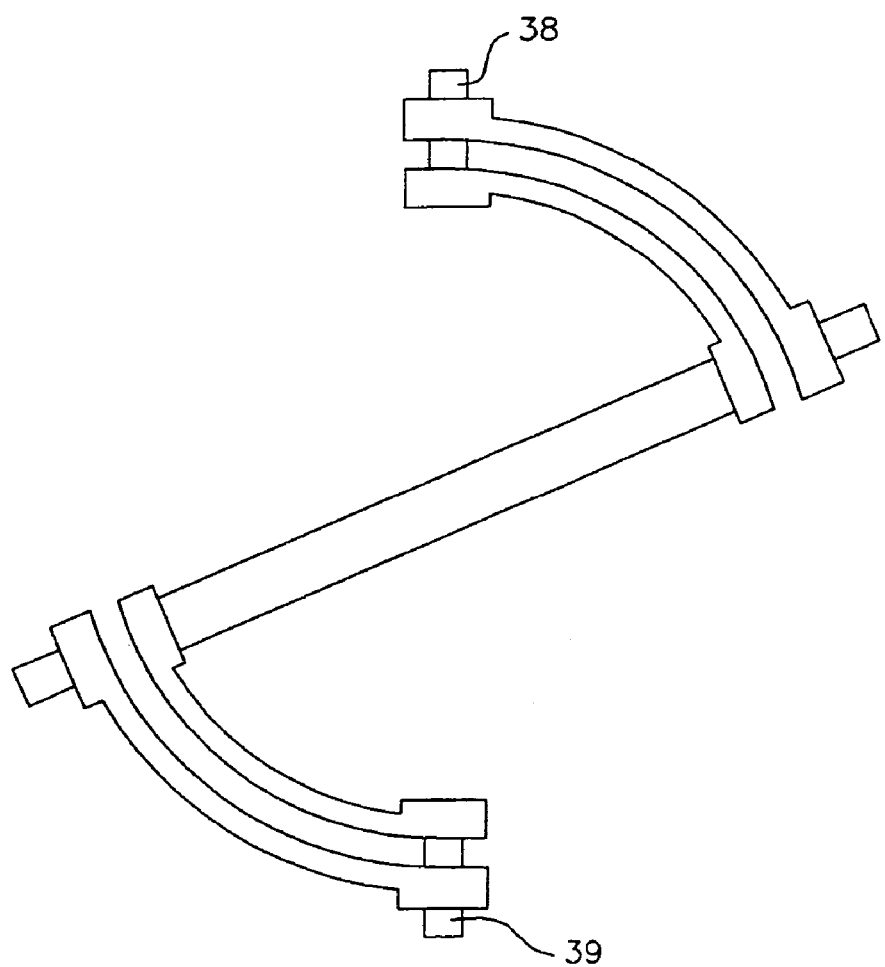
Fig. 17.9

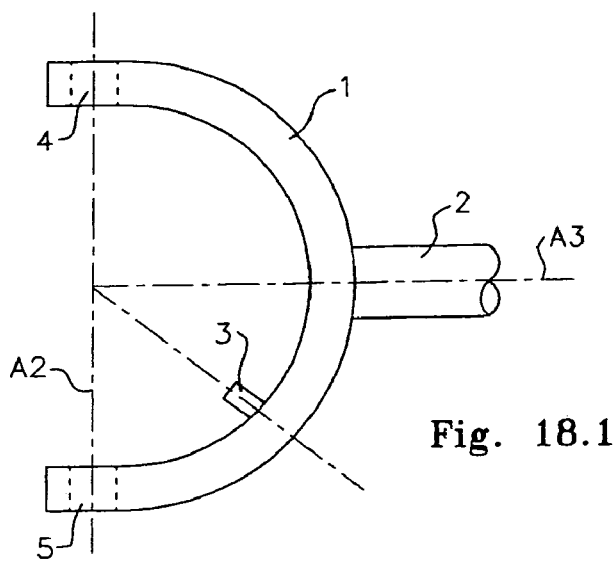
Fig. 18.1
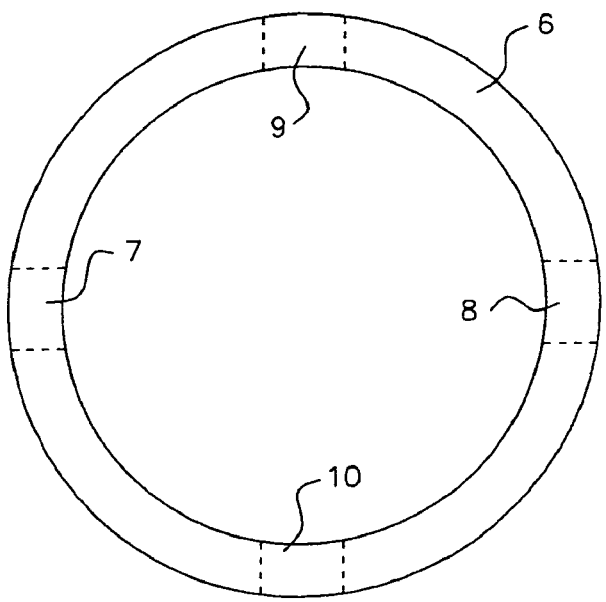
Fig. 18.2
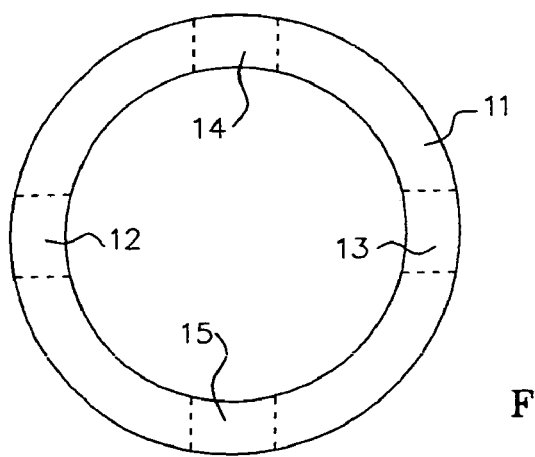
Fig. 18.3

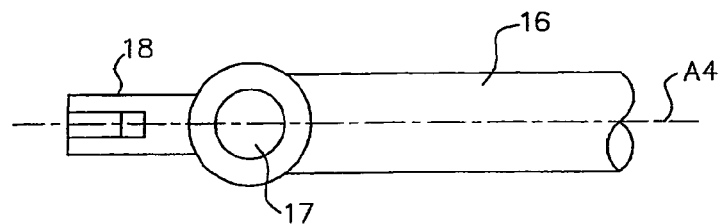
Fig. 18.4
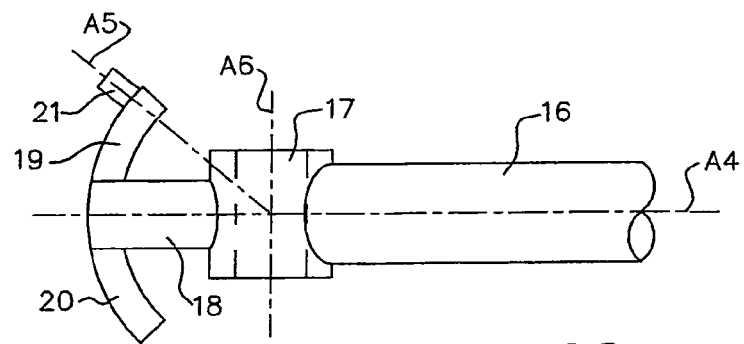
Fig. 18.5
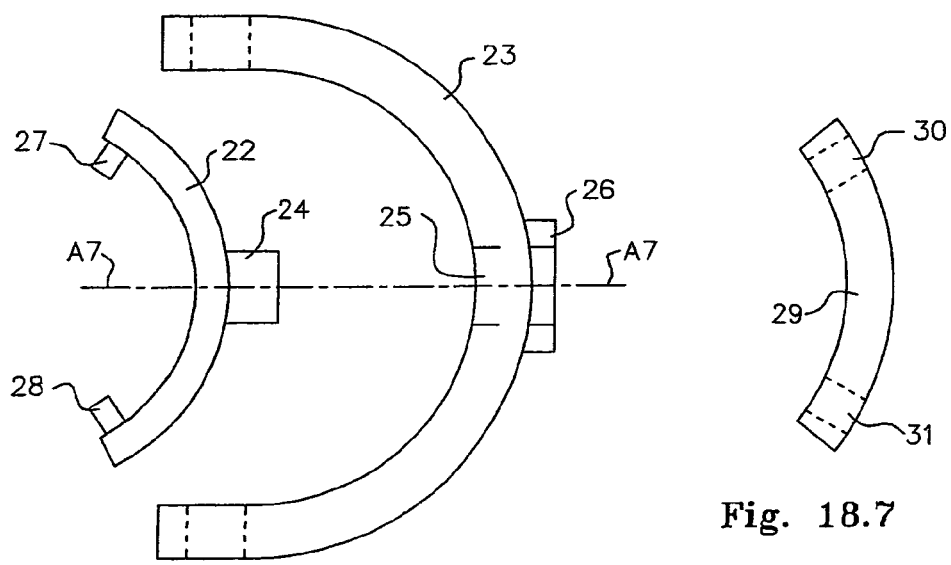
Fig. 18.6
Fig. 18.7

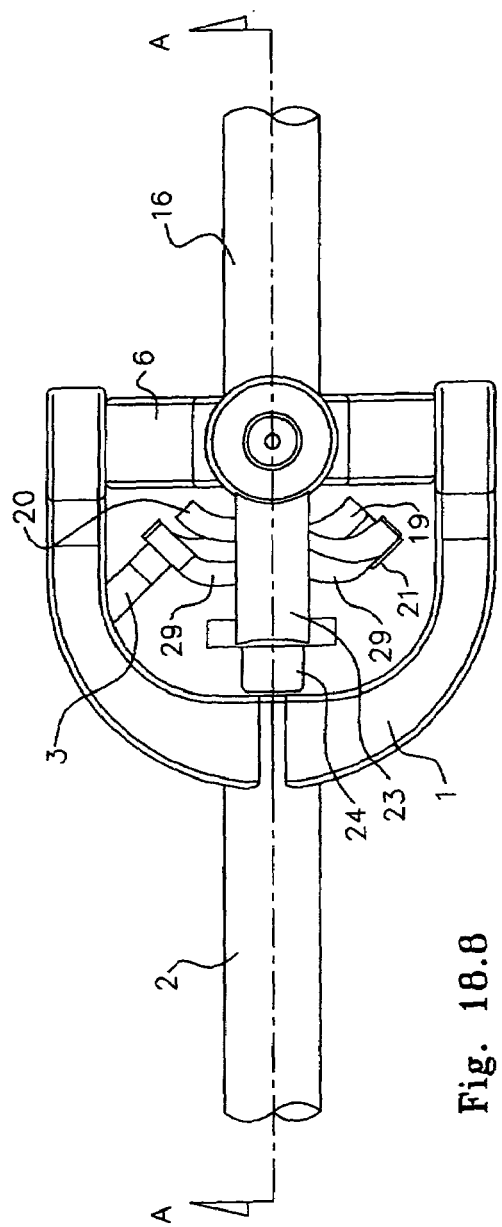
Fig. 18.8
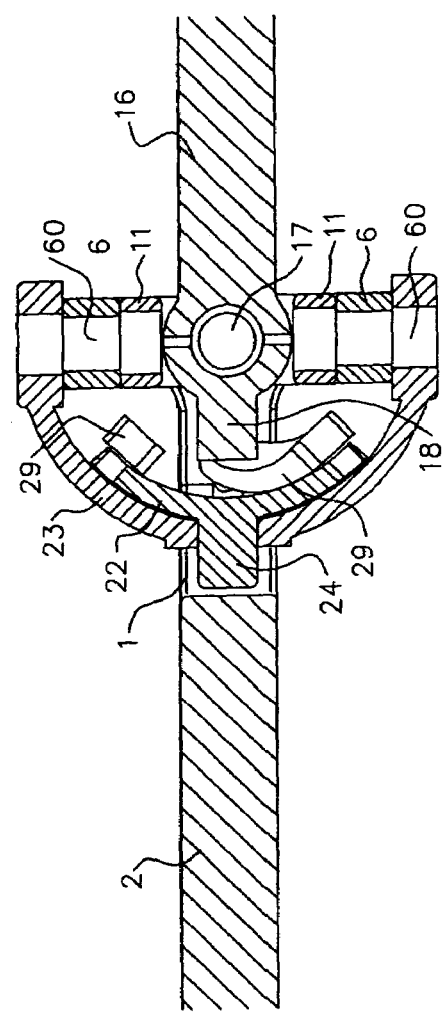
Fig. 18.9

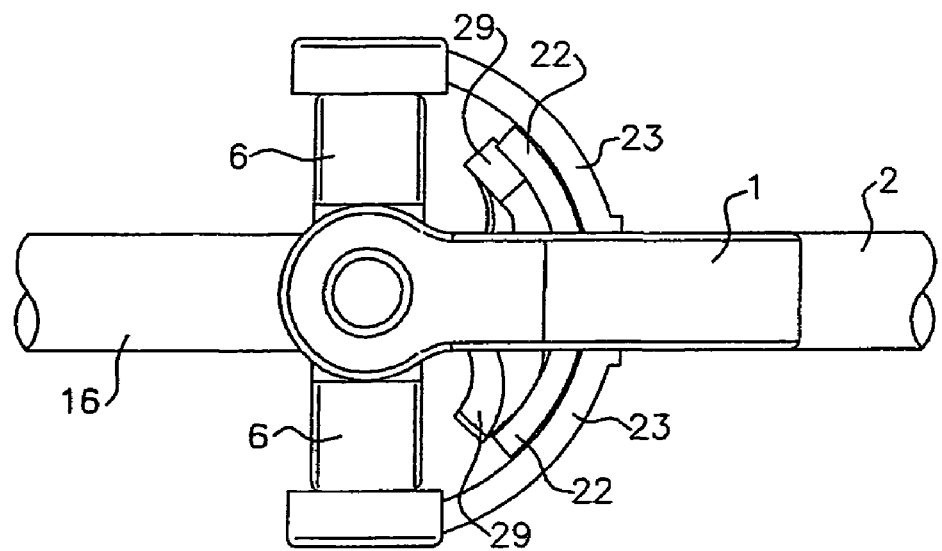
Fig. 18.10
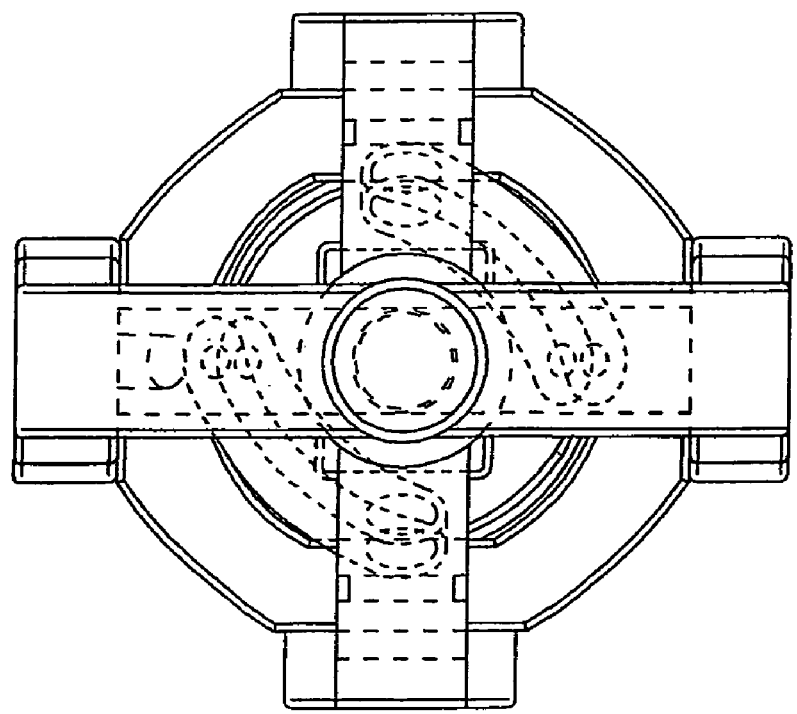
Fig. 18.11

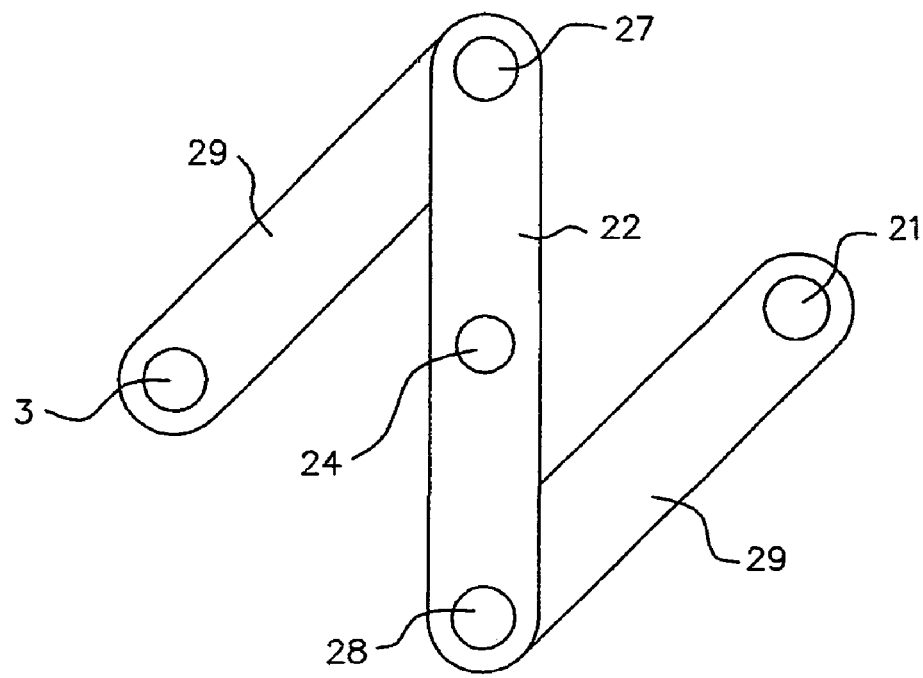
Fig. 18.12
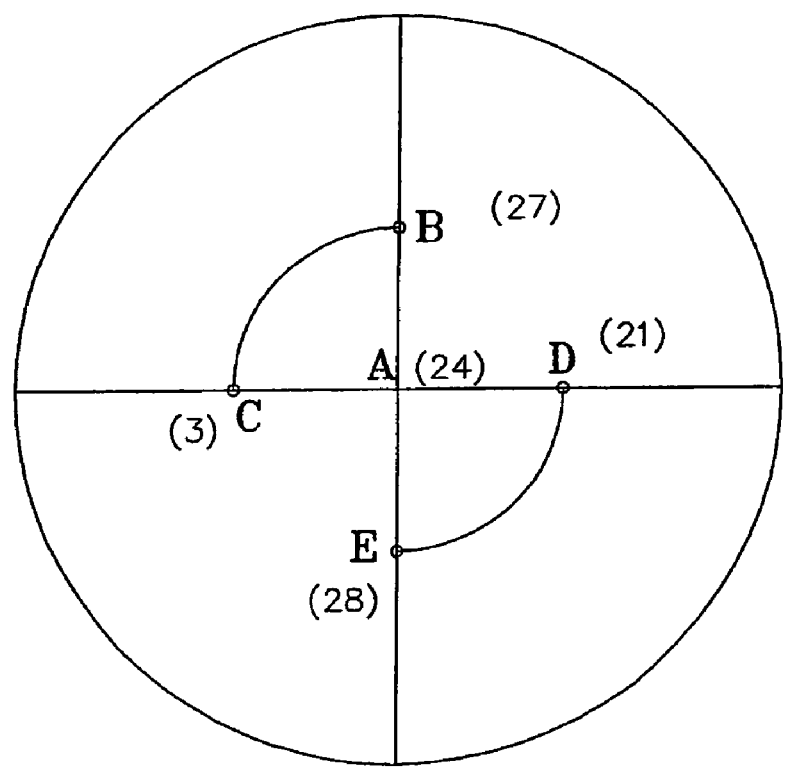
Fig. 18.13

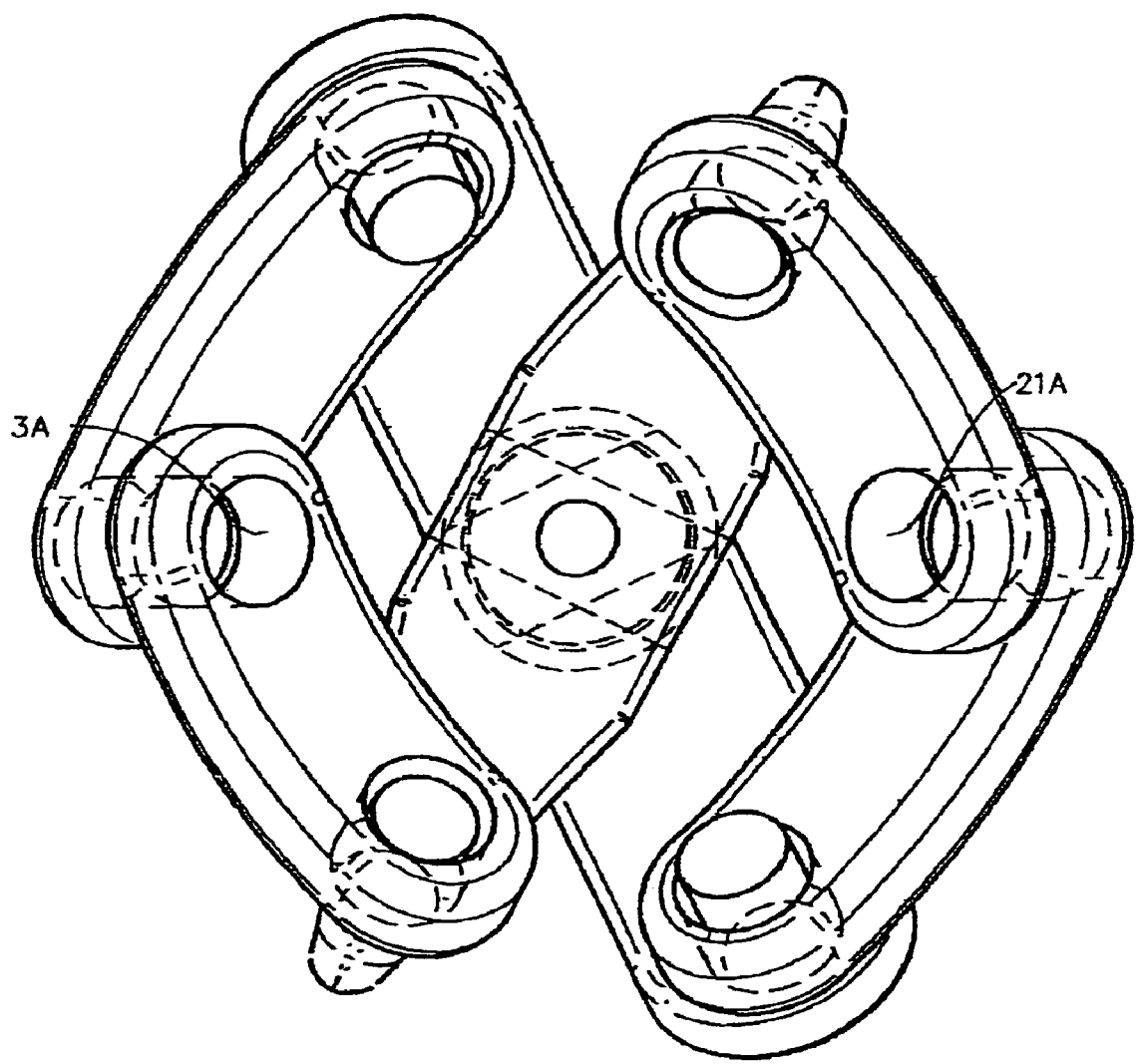
Fig. 19.1

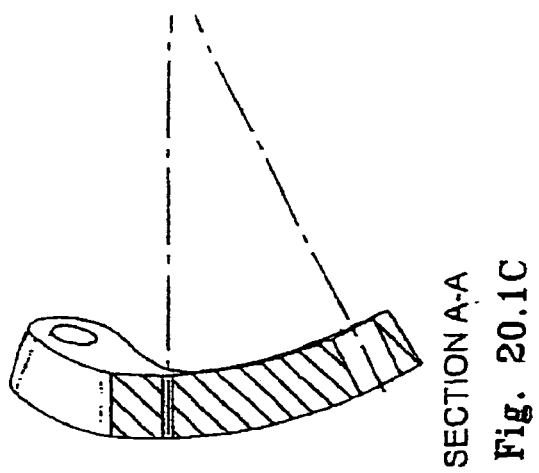
SECTION A-A
Fig. 20.1C
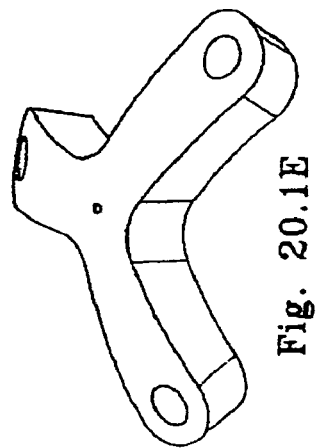
Fig. 20.1E
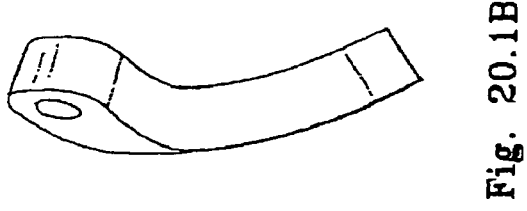
Fig. 20.1B
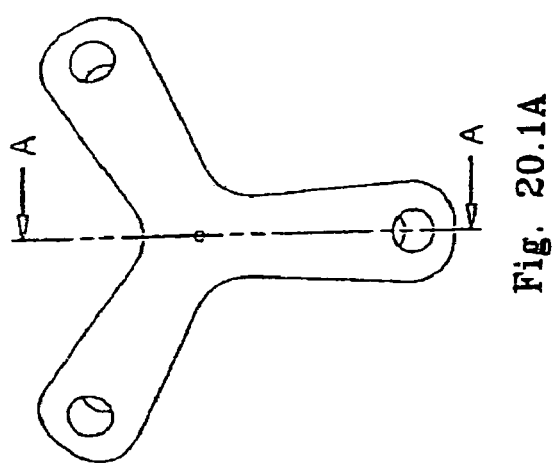
Fig. 20.1A
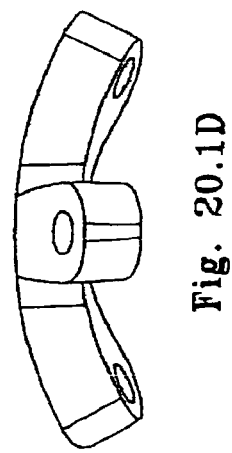
Fig. 20.1D

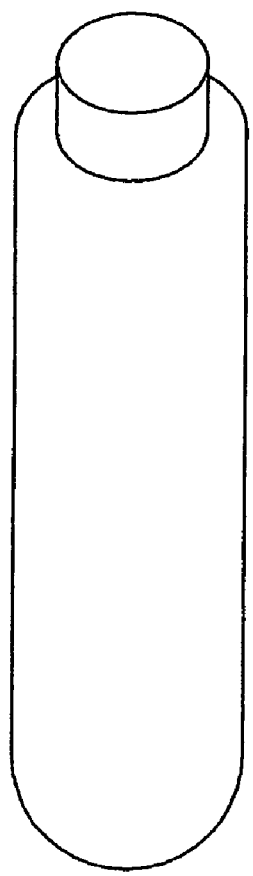
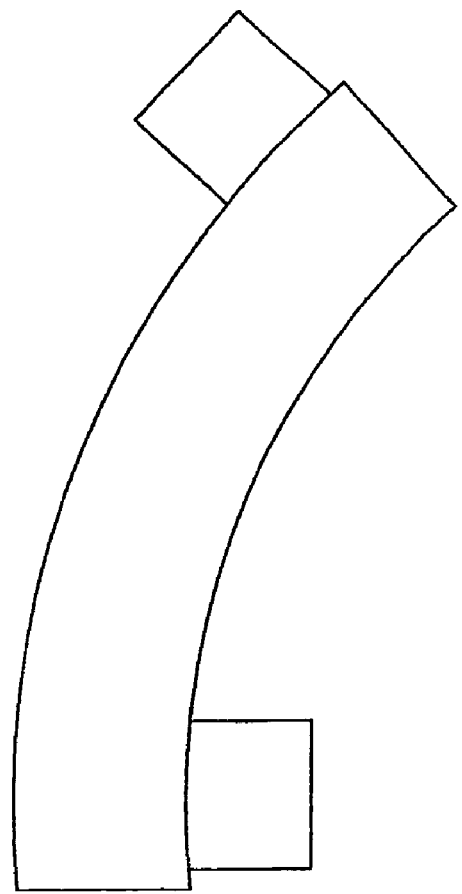
Fig. 20.2A  Fig. 20.2B

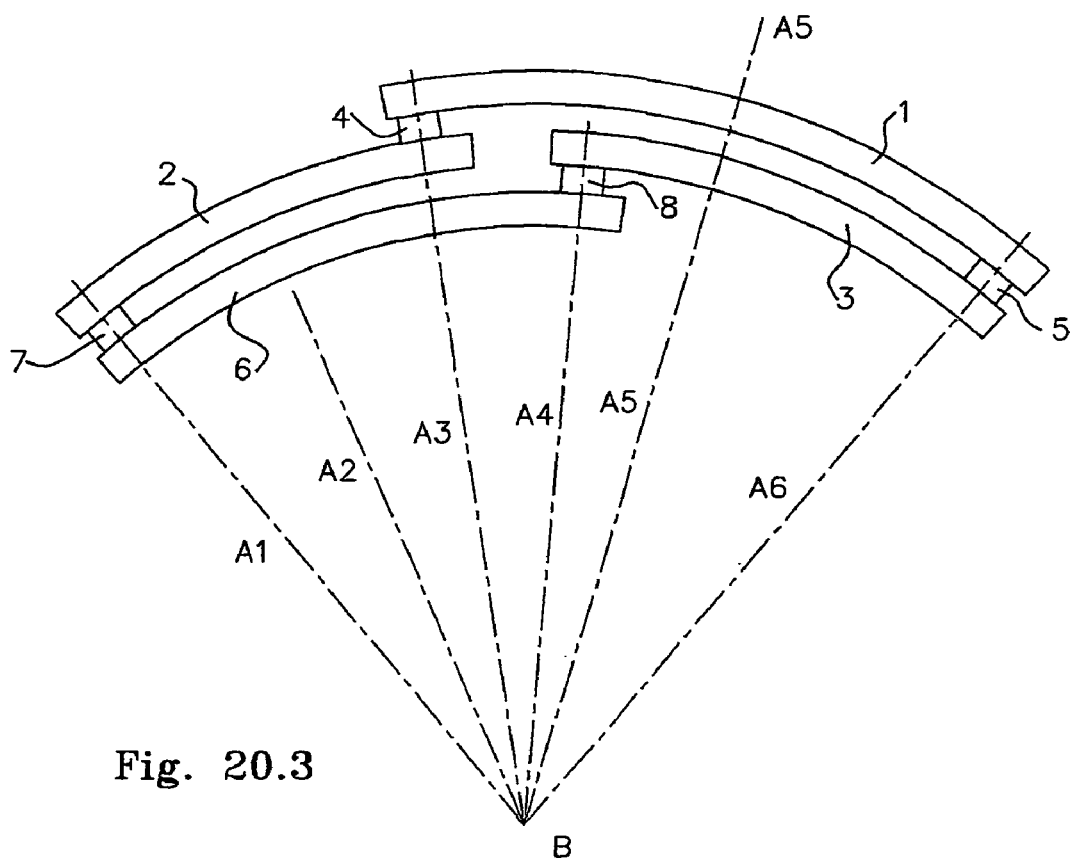
Fig. 20.3
Fig. 20.4
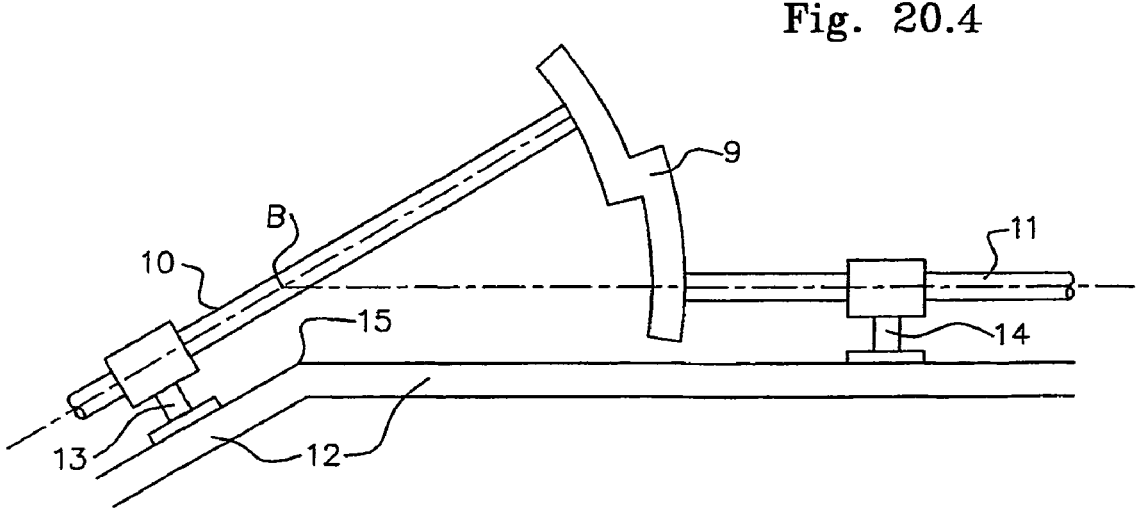
Fig. 20.5

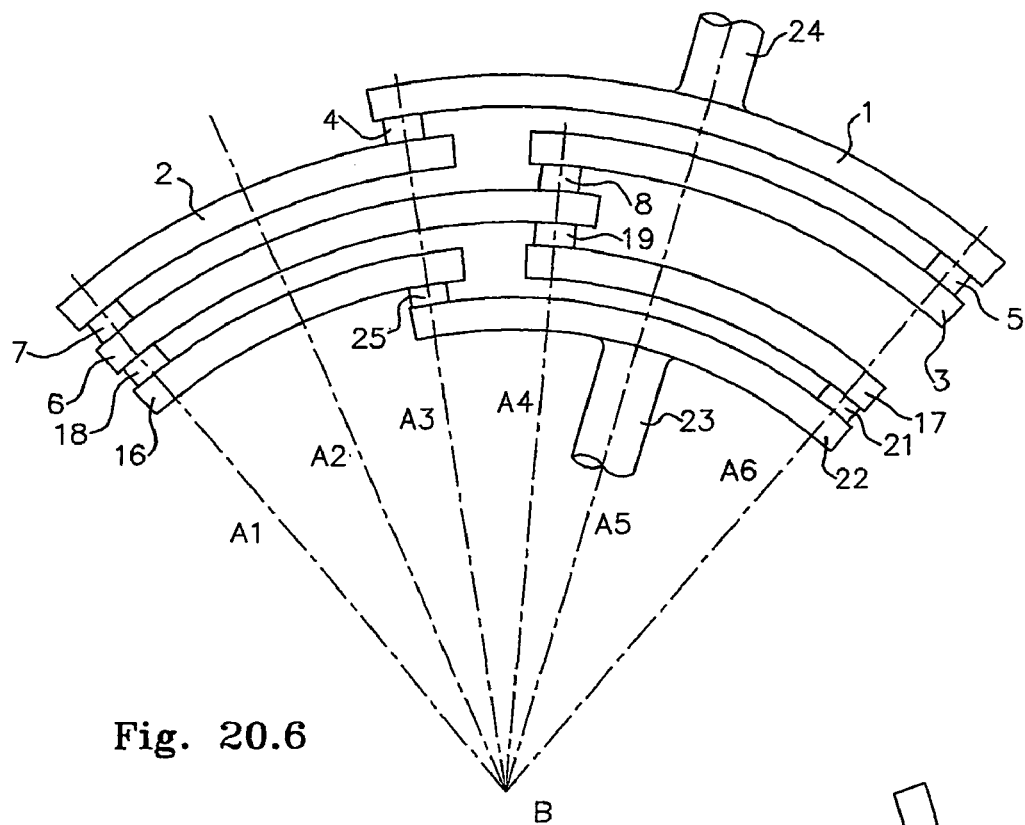
Fig. 20.6
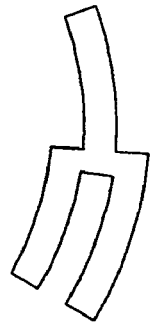
Fig. 20.7
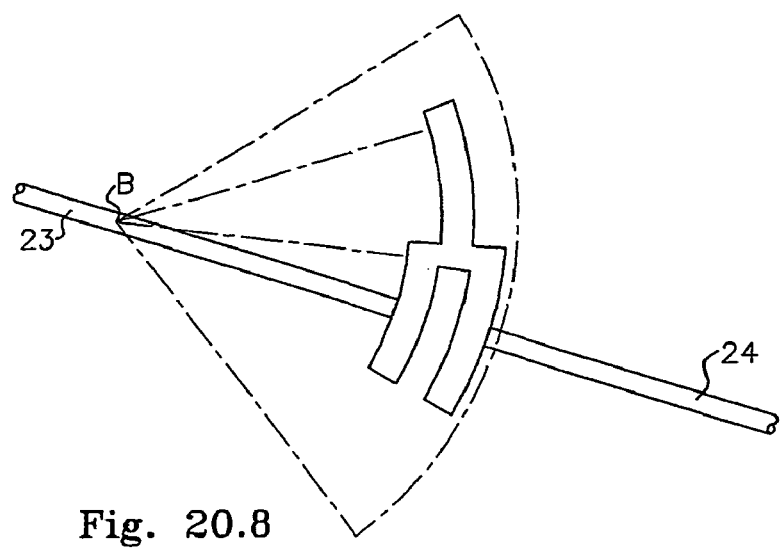
Fig. 20.8

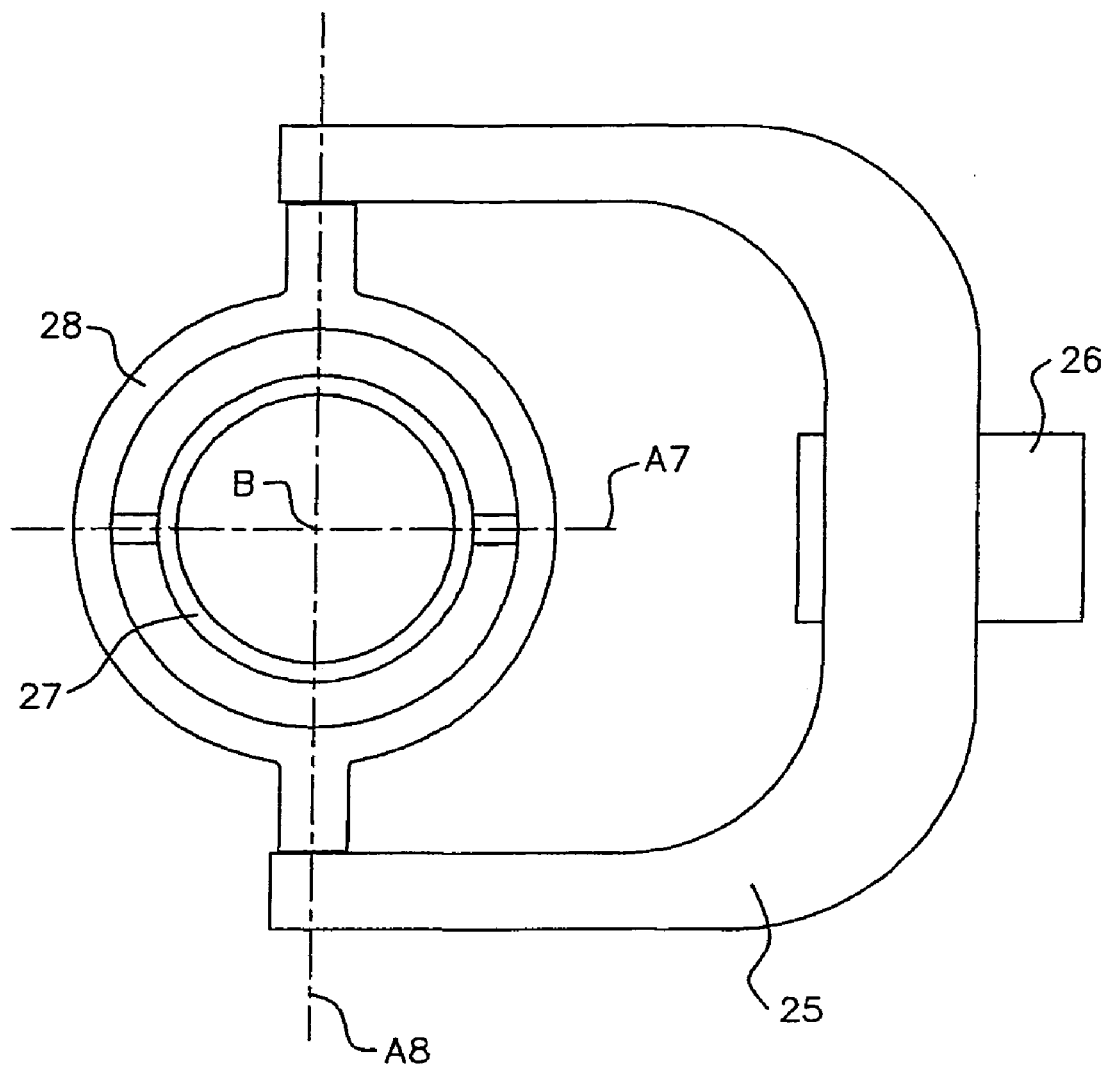
Fig. 20.9

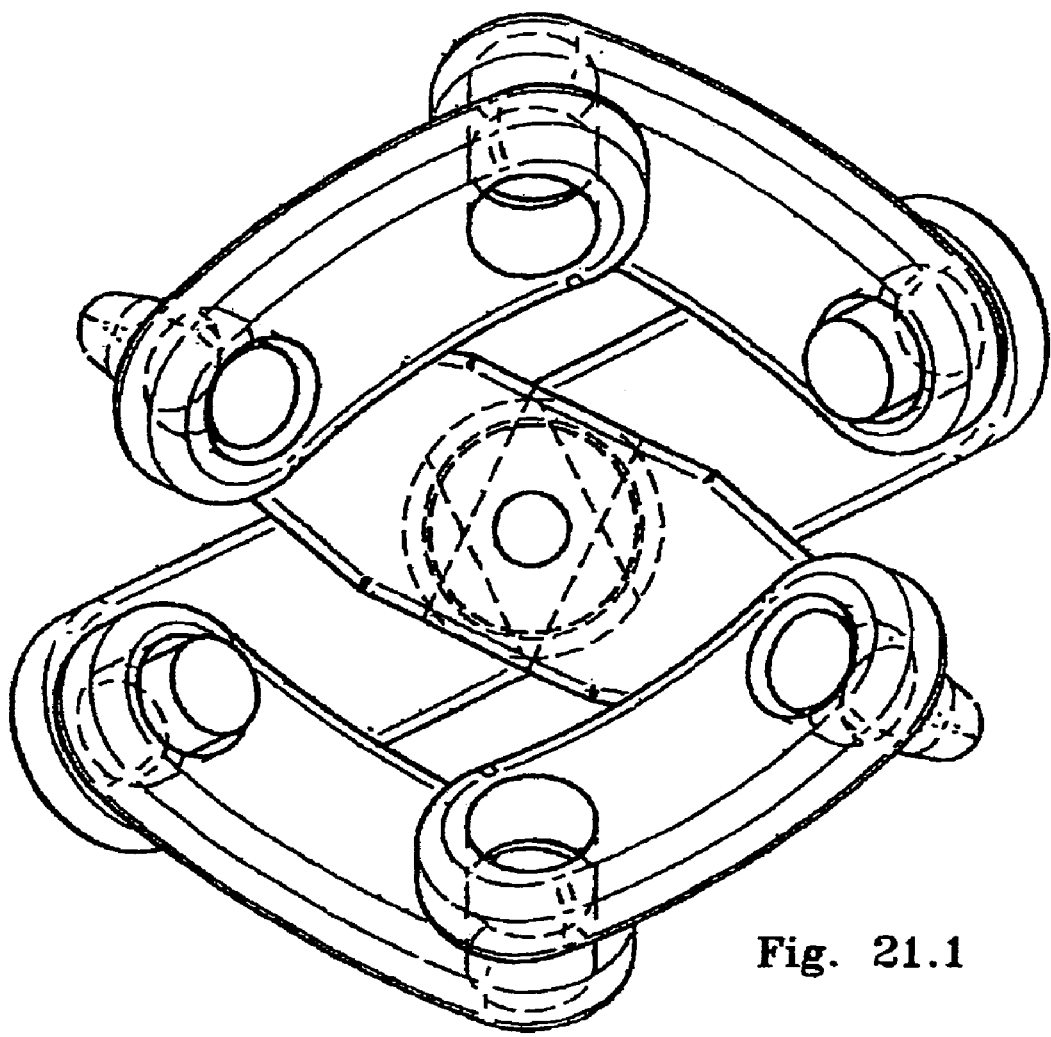
Fig. 21.1
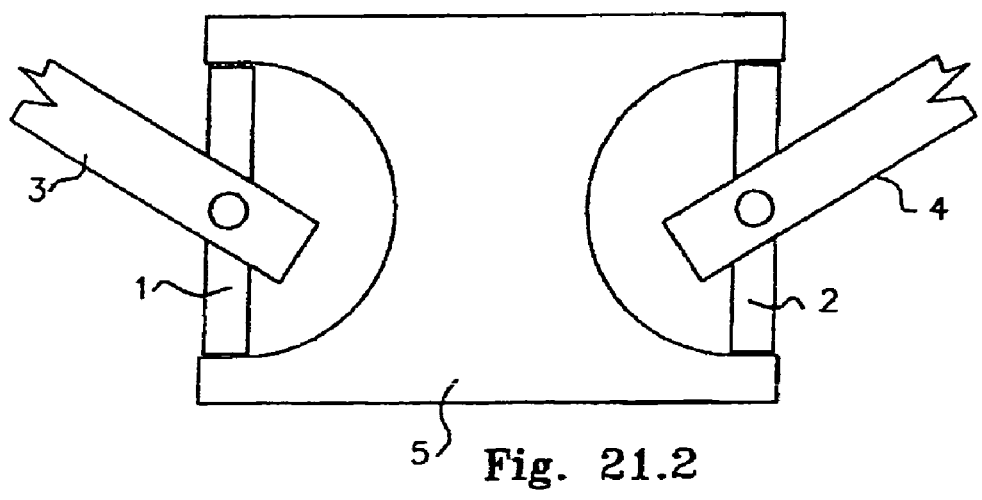
Fig. 21.2

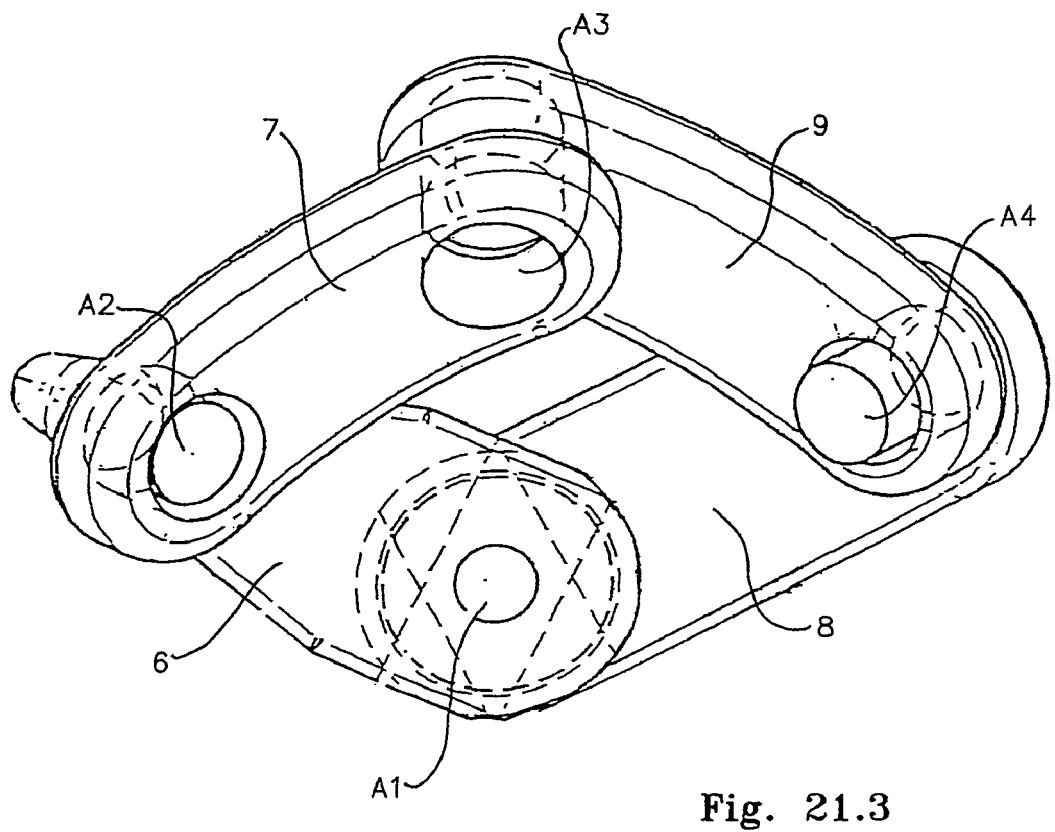
Fig. 21.3
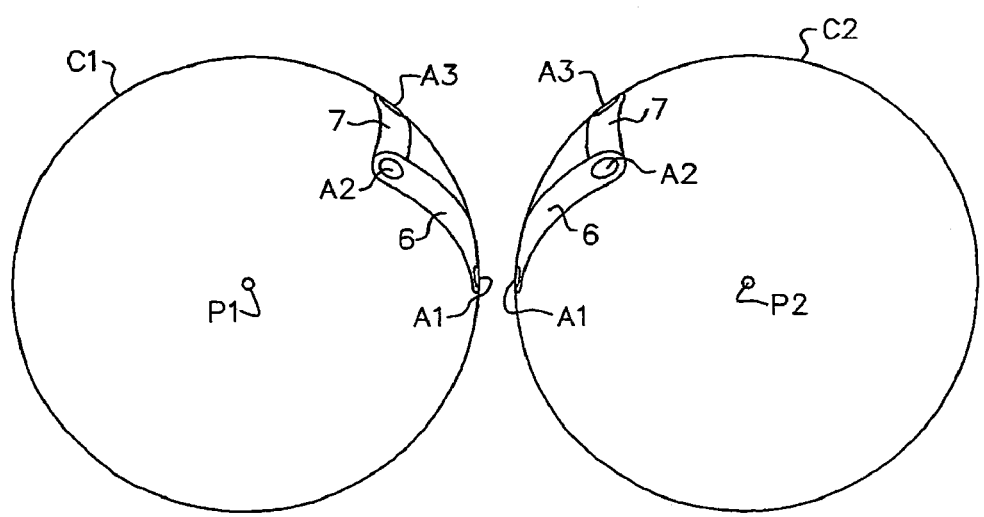
Fig. 21.4

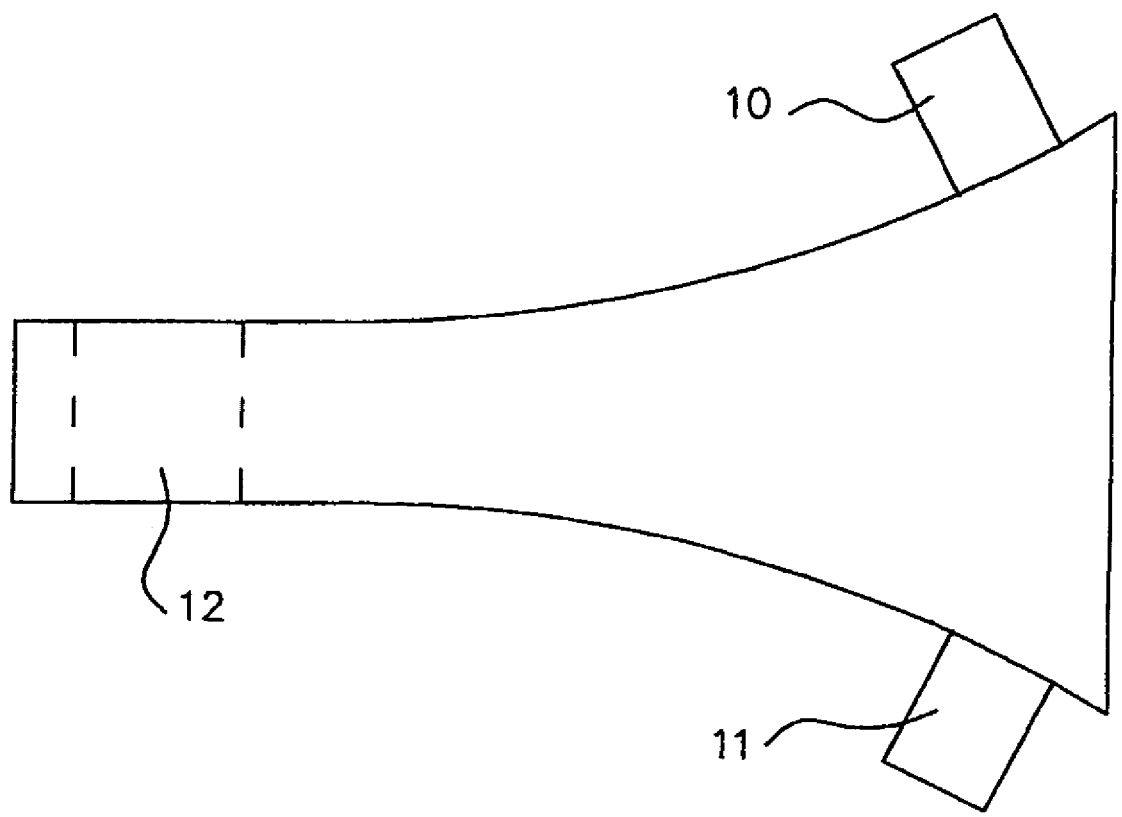
Fig. 21.5

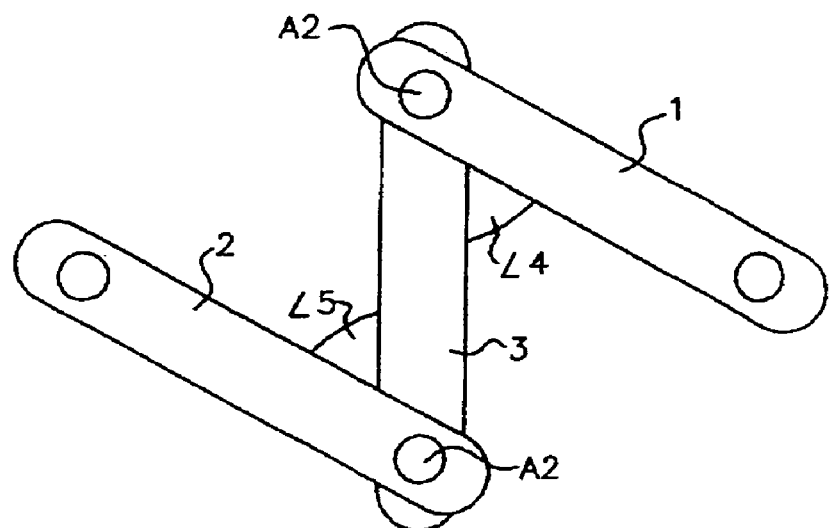
Fig. 22.1
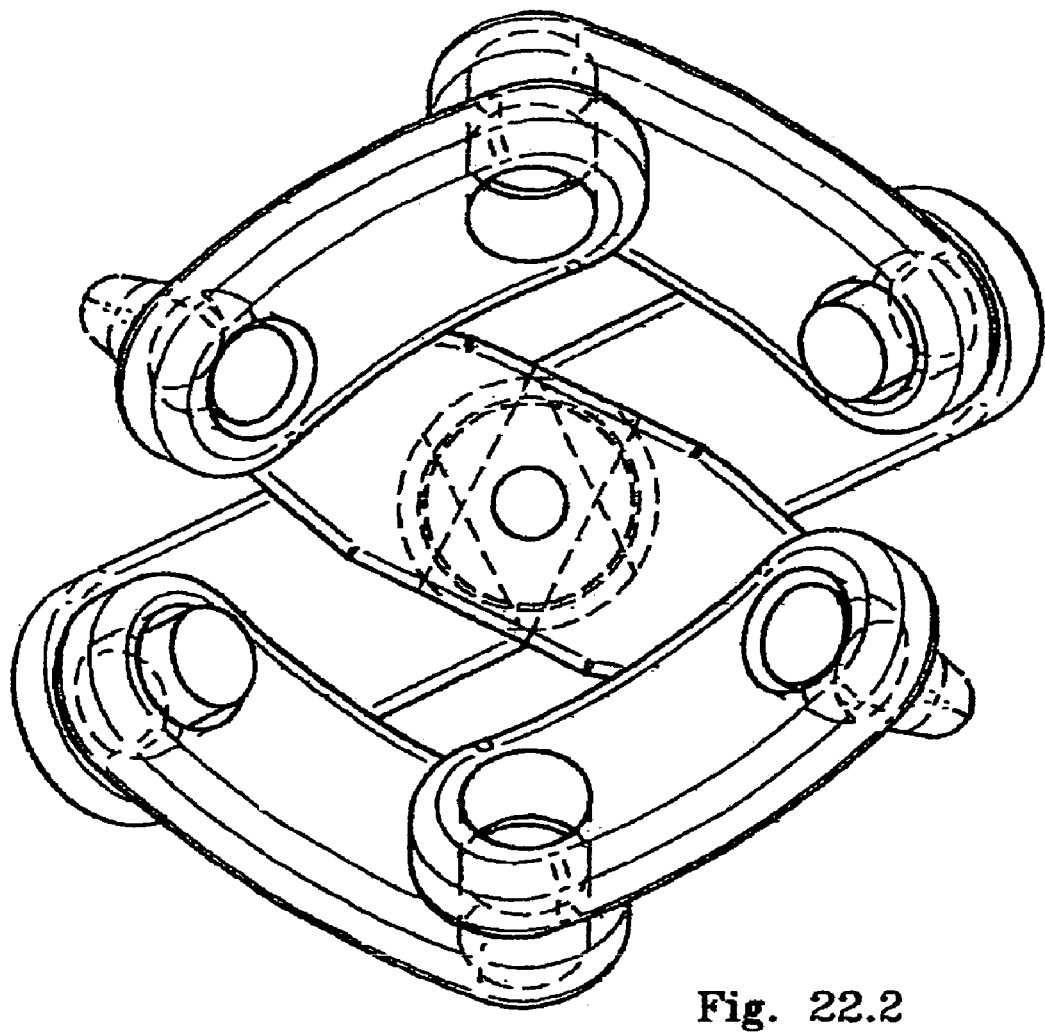
Fig. 22.2

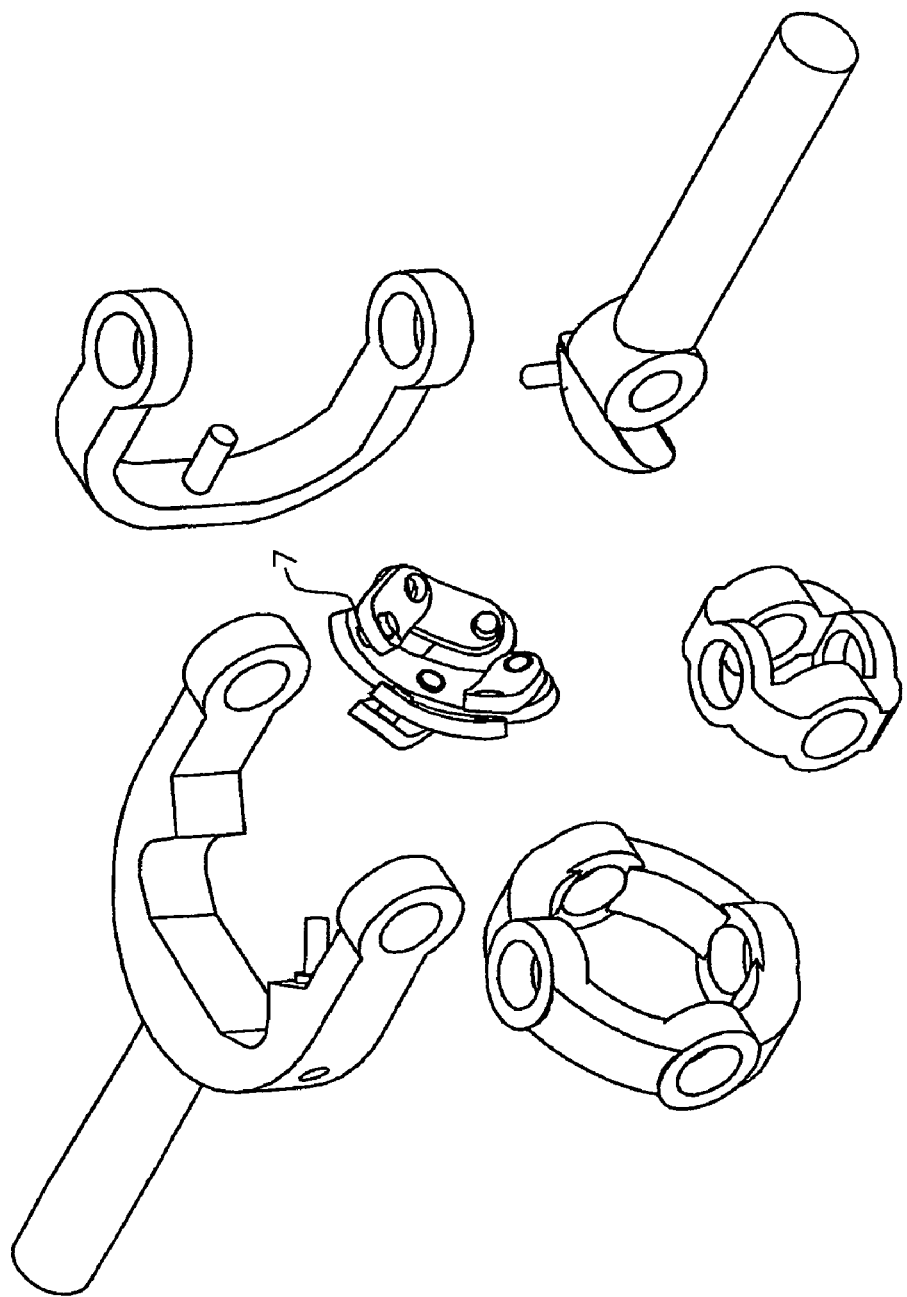
Fig. 22.3

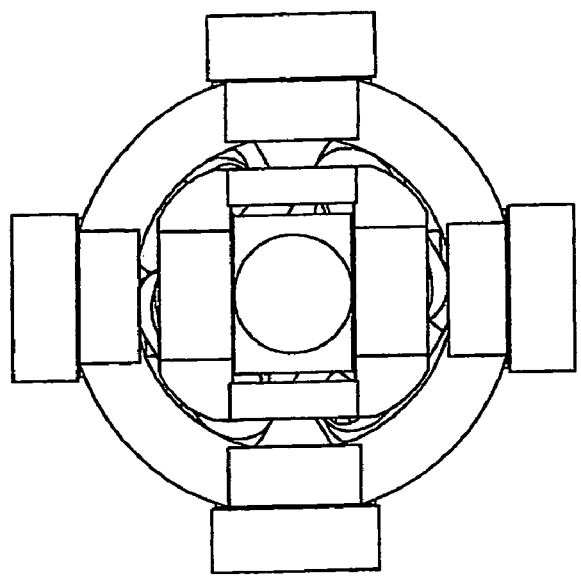
Fig. 22.4
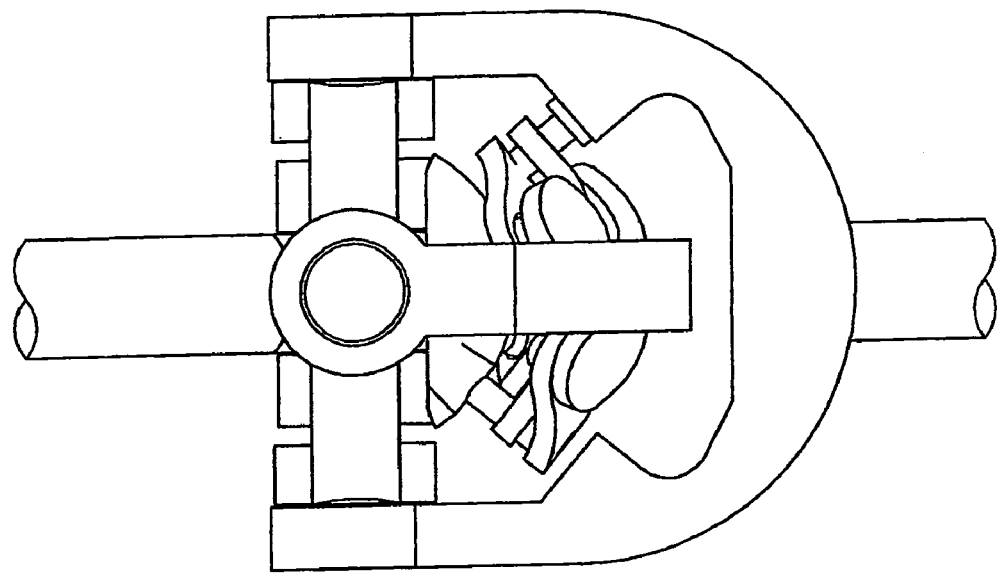
Fig. 22.5

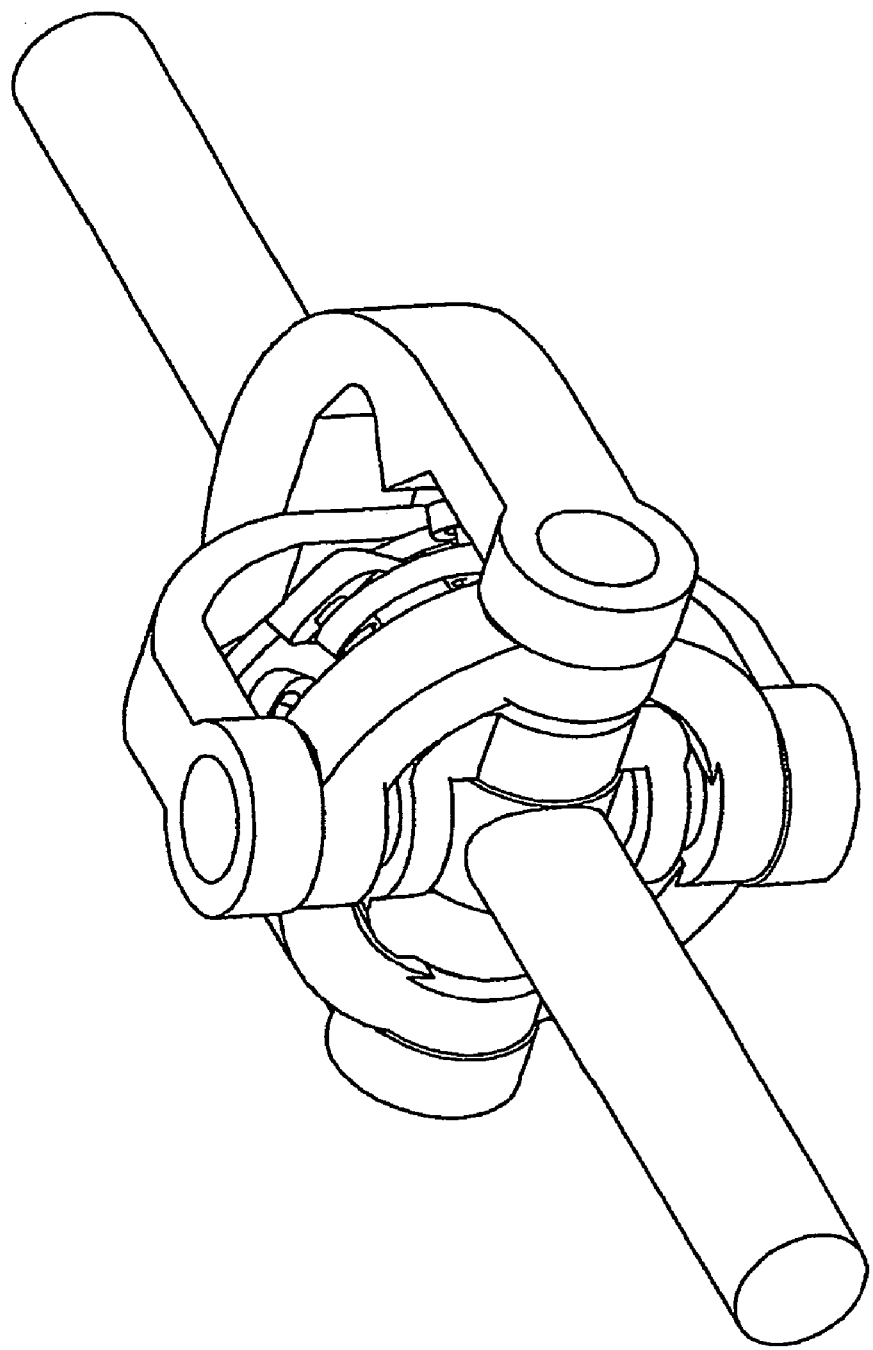
Fig. 22.6

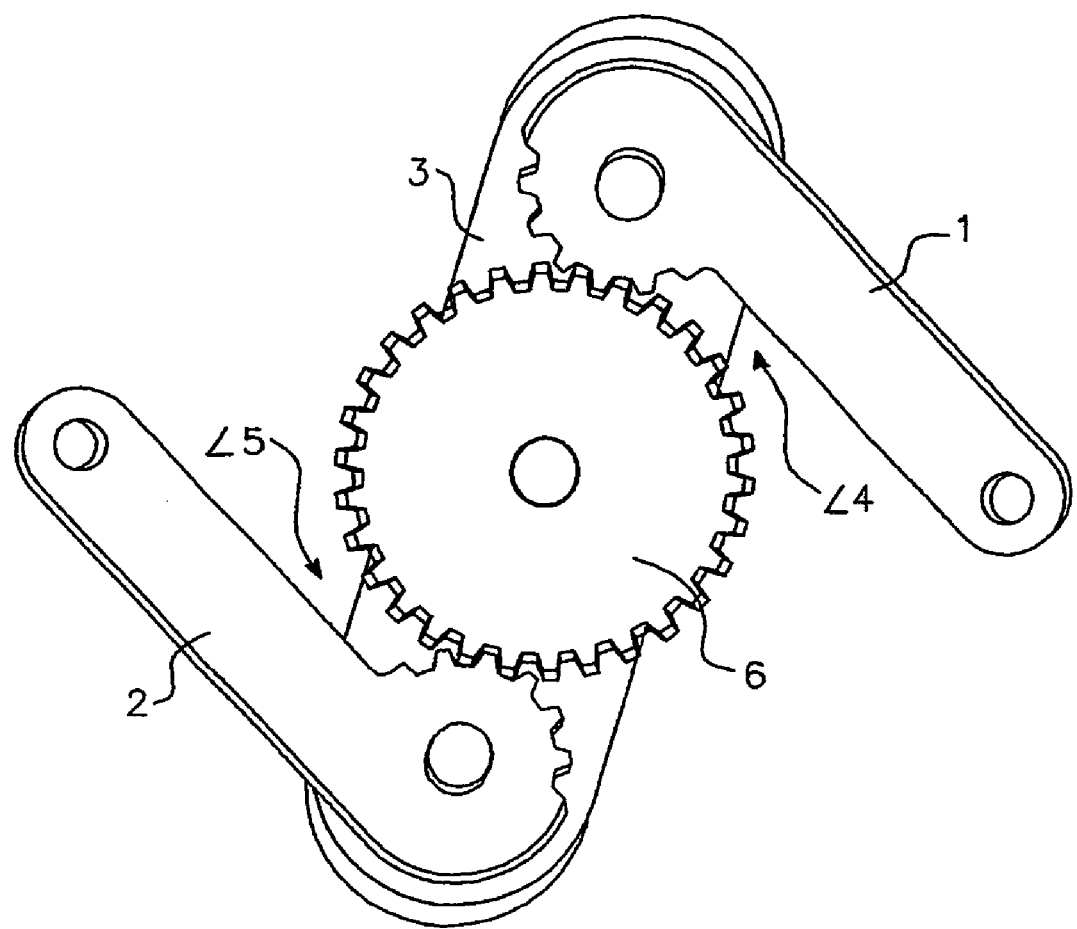
Fig. 22.7

CONSTANT VELOCITY COUPLING AND CONTROL SYSTEM THEREFOR

RELATED APPLICATIONS

This application is the U.S. National Phase of PCT/IB02/00927 filed Mar. 26, 2002 and claims priority to Australian Provisional Patent Application No. PR3946 filed Mar. 26, 2001, Australian Provisional Patent Application No. PR4452 filed Apr. 19, 2001, Australian Provisional Patent Application No. PR4620 filed Apr. 30, 2001, Australian Provisional Patent Application No. PR4767 filed May 7, 2001, Australian Provisional Patent Application No. PR5078 filed May 18, 2001, Australian Provisional Patent Application No. PR5731 filed Jun. 18, 2001, Australian Provisional Patent Application No. PR5979 filed Jun. 29, 2001, Australian Provisional Patent Application No. PR5992 filed Jun. 29, 2001, Australian Provisional Patent Application No. PR6075 filed Jul. 2, 2001, Australian Provisional Patent Application No. PR7569 filed Sep. 10, 2001, and Australian Provisional Patent Application No. PR9690 filed Dec. 21, 2001, which are hereby incorporated in their entirety by reference herein.

BACKGROUND OF THE INVENTION

1. Field of the Invention

The present invention relates to couplings between shafts and in particular forms to universal joints and, more particularly to couplings having or seeking to achieve equal instantaneous input shaft and output shaft angular velocities.

2. Description of Related Art

The problem of coupling two rotating shafts operating at an angle to each other has confronted engineers since at least the beginning of the industrial revolution. The "Cardan Joint" developed initially by Cardan in the 16$^{th}$ century is in principle still in use today despite its inherent shortcomings and is found for example in virtually every rear wheel drive vehicle.

An inherent flaw in the design of the simple Cardan Joint is the fact that at any angle between input and output shafts other than 180 degrees, the angular velocity of the output shaft fluctuates sinusoidally relative to that of the input shaft.

Commonly, and as employed again for example in the drive lines of rear wheel drive vehicles, two Cardan Joints are employed, coupling the input and output shafts to an intermediate shaft. By maintaining a parallel alignment between input and output shafts and matching orientations of joint elements, equal angular velocities can be maintained for the input and output shafts with the fluctuations now restricted to the intermediate shaft.

However fluctuating stresses arising from the variations in input and output shaft angular velocities with that of the intermediate shaft are required to be absorbed in the two Cardan Joints. As well it is impossible in many applications and in particular in road vehicles to maintain a strict geometric relationship between input and output shafts giving rise to vibrations, mechanical stresses and power transmission losses.

A partial solution to the problem of maintaining input and output shaft alignment was developed as the so-called "Double Cardan Joint", often referred to as a Constant Velocity Joint, which is an assembly of two Cardan joints coupled to a short intermediate shaft together with a centering mechanism which constrains both joints to be held in a fixed geometric relationship to each other such that the input and output shafts form equal angles with the intermediate shaft. The major shortcomings of this arrangement reside in the transfer of any axial and radial loads to the centering mechanism resulting in accelerated wear and frictional losses.

Numerous other couplings have been developed to seek to achieve constant angular velocity transfer between shafts. Generally all suffer from being approximate solutions to the strict geometrical constraints of a true constant velocity coupling or achieve an approximation to the geometry at the cost of high wear frictional losses from sliding components.

It is an object of the present invention to address or ameliorate at least one of the above disadvantages or at least provide a useful alternative.

SUMMARY OF THE INVENTION

Accordingly, in one broad form of the invention there is provided a constant velocity coupling wherein the conditions for equal instantaneous transfer of angular velocities between an input and an output shaft are maintained by a control mechanism, said coupling including, (a) an input shaft rotation axis
(b) an output shaft rotation axis
(c) a control mechanism, said control mechanism adapted to constrain at least portions of said coupling so as to achieve a constant velocity characteristic.

In a further broad form of the invention there is provided a constant velocity coupling wherein the angle between an input shaft and an output shaft is controlled so as to vary the volumetric characteristics of a swash plate hydraulic displacement device.

In yet a further broad form of the invention there is provided a double constant velocity coupling wherein the conditions for equal instantaneous transfer of angular velocities between an input and an output axis are maintained by a control mechanism, said coupling comprising, (a) an input axis
(b) an output axis
(c) input end yoke
(d) output end yoke
(e) a control mechanism.

In yet a further broad form of the invention there is provided a constant velocity joint having an input shaft rotatably connected to an output shaft by way of a gimbal mechanism; said joint including mechanical control means which constrains said gimbal with respect to said input axis and said output axis whereby, in use, a constant velocity characteristic is maintained over a predetermined range of angles between said input shaft and said output shaft.

In yet a further broad form of the invention there is provided a constant velocity joint incorporating a control mechanism based on spherical geometry with respect to a geometric centre defined as the intersection of said input axis and said output axis.

In yet a further broad form of the invention there is provided centering means for a constant velocity joint; said centering means incorporating joints defined with respect to spherical triangle structures so as to constrain at least portions of said joint on a homokinetic plane defined with respect to the point of intersection of said input axis with said output axis.

In yet a further broad form of the invention there is provided a method of constraining a first input shaft with respect to a second output shaft of a constant velocity joint so as to achieve substantially constant velocity behaviour; said method comprising utilising control means centered on and pivotable about one or more axes passing through a coupling centre defined as the intersection of an input shaft with an output shaft axis.

BRIEF DESCRIPTION OF THE DRAWINGS

Embodiments of the present invention will now be described with reference to the accompanying drawings wherein.

DETAILED DESCRIPTION OF THE PREFERRED EMBODIMENTS

Figure 1:
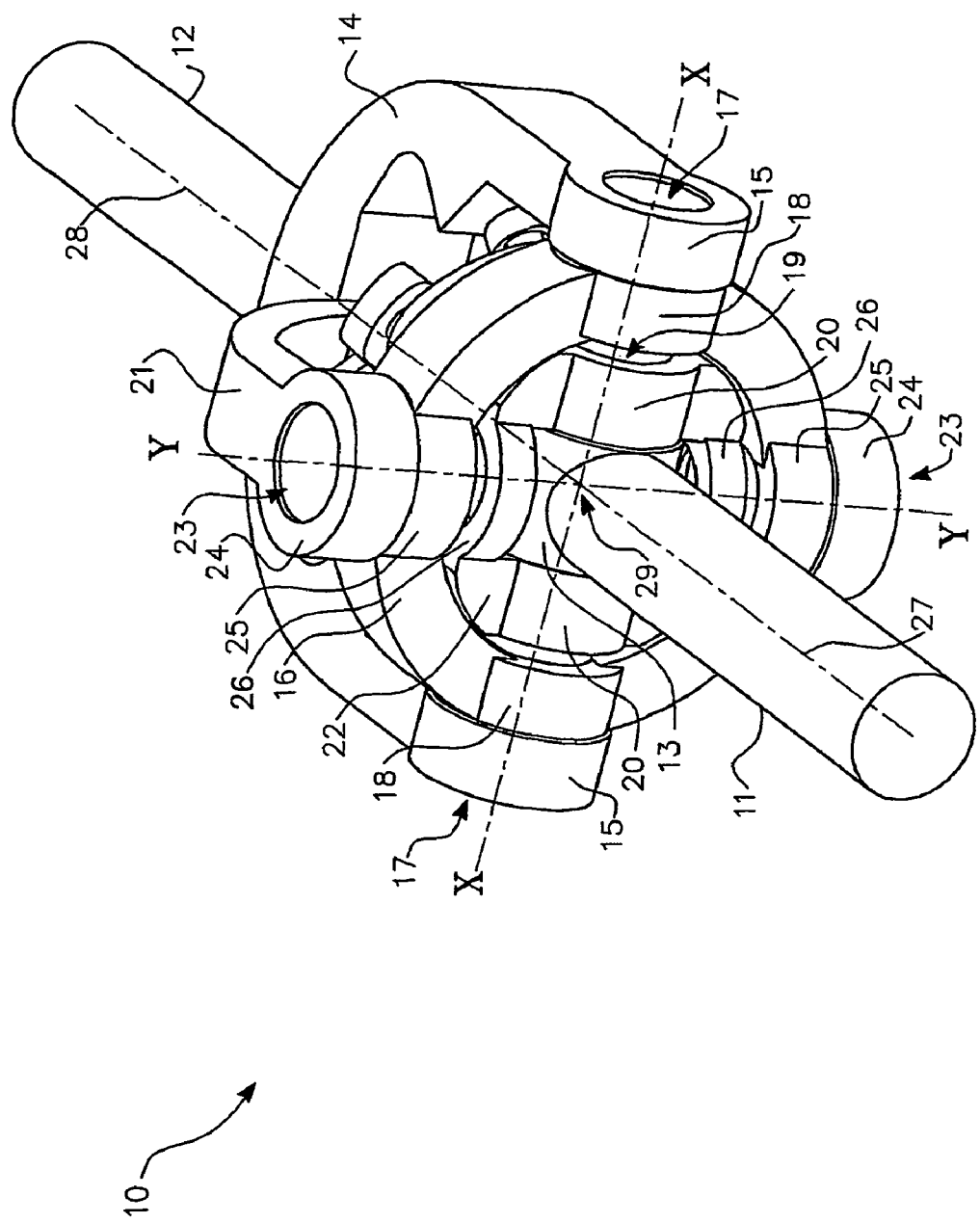
FIG. 1 is a perspective view of a fully assembled constant velocity coupling according to a first preferred embodiment with input and output shafts in line.

A significant number of varied embodiments will now be described. Broadly various ones of the embodiments relate to systems having an input shaft connected mechanically to an output shaft in such a way that torque can be transmitted from the input shaft to the output shaft whilst maintaining a substantially "constant velocity" characteristic. In particular forms the constant velocity characteristic is sought to be maintained despite variations in angle between the input and output shaft.

In this specification a "constant velocity" characteristic refers to a characteristic wherein the instantaneous angular velocity of the input shaft is matched to the instantaneous angular velocity of the output shaft throughout a full rotation of the shafts. It is to be understood that the constant velocity characteristic is a design goal and various embodiments may achieve this characteristic to a greater or lesser degree based on parameters which can include mechanical and structural variations in the assembly.

Where variation is allowed in the angle between the input and output shafts such joints are termed universal constant velocity joints in this specification.

Broadly, the constant velocity characteristic as between the input and output shafts is achieved by use of a control system which, in the embodiments in this specification, is implemented in mechanical form and is variously termed in various embodiments as a control yoke, a control mechanism, a linkage mechanism, constraining means, an interposing connecting member, a centering mechanism and centering means.

Throughout the embodiments the point of intersection of the axes of the input and output shafts is termed the coupling centre or the geometric centre and, in some instances, is referred to as the "contact points" of the axes of the two shafts.

The coupling centre or geometric centre has significance in that in a significant number of embodiments this point becomes a common point of the constant velocity joint through which the rotational axes of all pivots forming part of the control system pass (as well as the axes of the input and output shafts by definition).

Also, in a significant number of embodiments, a gimbal mechanism can be identified forming part of the coupling and more particularly including portions which are controlled by the control system so as to bring out the constant velocity characteristic. In this specification a gimbal most commonly comprises an inner substantially circular yoke residing within and pivotable with respect to an outer also substantially circular yoke. The yokes of the gimbal mechanism are, in turn, pivotably connected to respective input and output shafts. The gimbal is at least partially constrained in its movements by the control mechanism, most often in the form of a control yoke and associated control components so as to impose the constant velocity characteristic upon the relative movements of the input and output shafts.

The constraining behaviour required to impart the constant velocity characteristic is described in the majority of embodiments with respect to the coupling centre or geometric centre as well as the "homokinetic plane" of the coupling.

Figure 23:
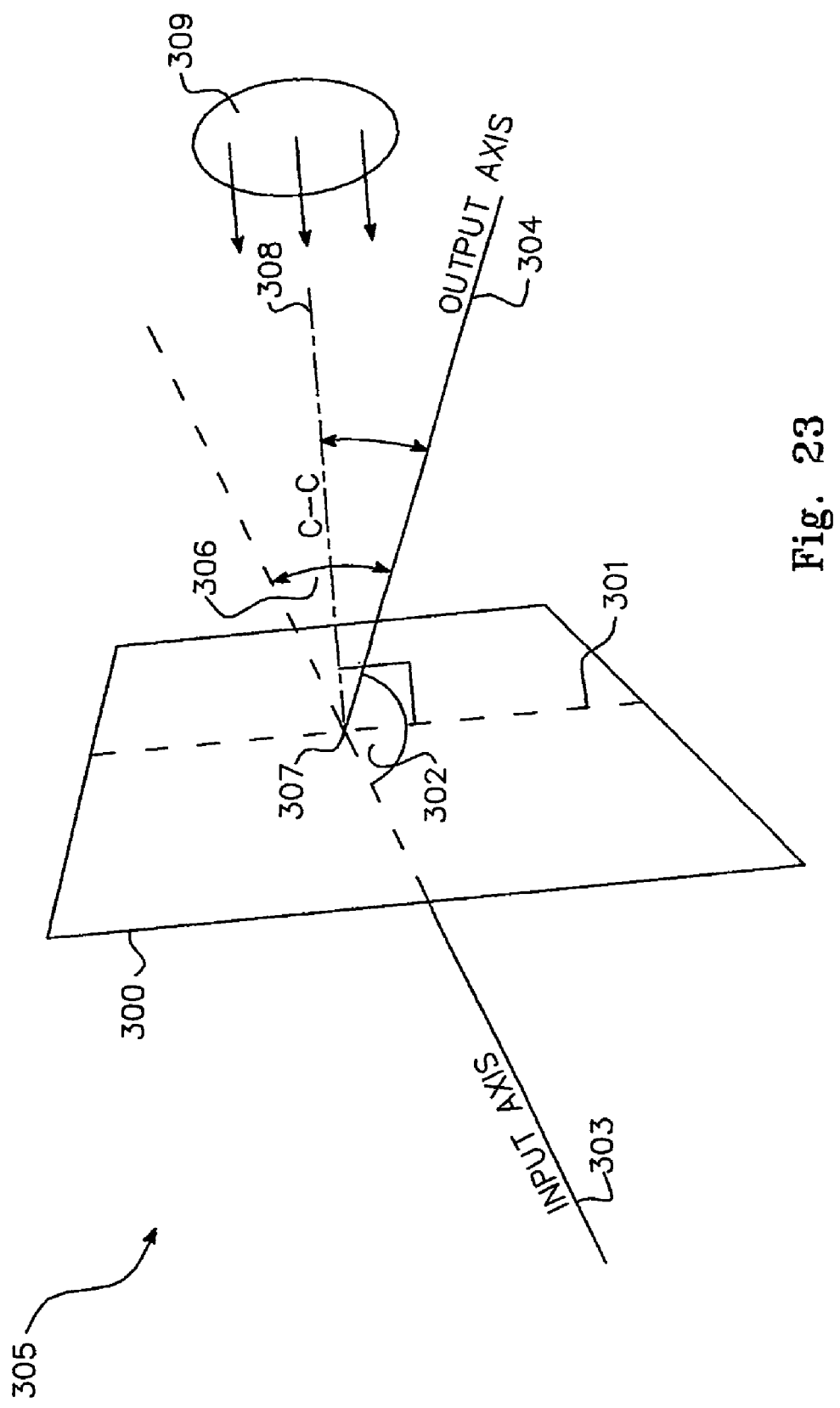
FIG. 23 is a graphical depiction of the homokinetic plane and related axes supporting a general discussion of some of the common features of many of the above referenced embodiments.

With reference to FIG. 23 the homokinetic plane in this specification is that plane 300 which lies on the bisector 361 of the angle 302 between the input axis 303 and the output axis 304 of an indicative constant velocity coupling 305. More specifically the homokinetic plane 300 is defined to lie at right angles to the plane defined by the input and output axes 303, 304. In the particular case of FIG. 23 if it is taken that the input axis 303 and output axis 304 lie in the plane of the page then the homokinetic plane 300 will lie at right angles to the page.

In specific forms the control system is better defined by reference to supplementary angle 306 which is defined as the angle between, in this instance, the output axis 304 and the extension of the input axis 303 through the coupling or geometric centre 307. Mathematically the supplementary angle 306 is 180° minus the angle 302 between the input and output shafts.

The supplementary angle bisector 308 is the bisector of supplementary angle 306 and passes through centre 307 and, by definition, lies at right angles to the homokinetic plane 300 and at right angles to bisector 301. The supplementary angle bisector 308 is labelled CC in FIG. 23 and corresponds to axis C in FIG. 4 described with reference to the first embodiment.

It is a particular characteristic of many of the embodiments of the present invention that the control system in the form of the control mechanism is centred upon axis 308 and operates symmetrically about this axis in all modes of operation. In particular embodiments the terms "spherical triangles" and "spherical geometry" are utilised in the context of linkages and axes for the control system 309 all of which rotate about axes which pass through centre 307.

In particular forms the entire control system providing the constant velocity characteristic (or an arbitrary approximation thereto) can be implemented using joints which are revolutes about these axes such as, for example, ball or roller bearings, which is to say utilising bearing surfaces which require no load bearing sliding surfaces.

1. First Embodiment

A first preferred embodiment of a constant velocity coupling will now be described with reference to FIGS. 1 to 5.

Figure 2:
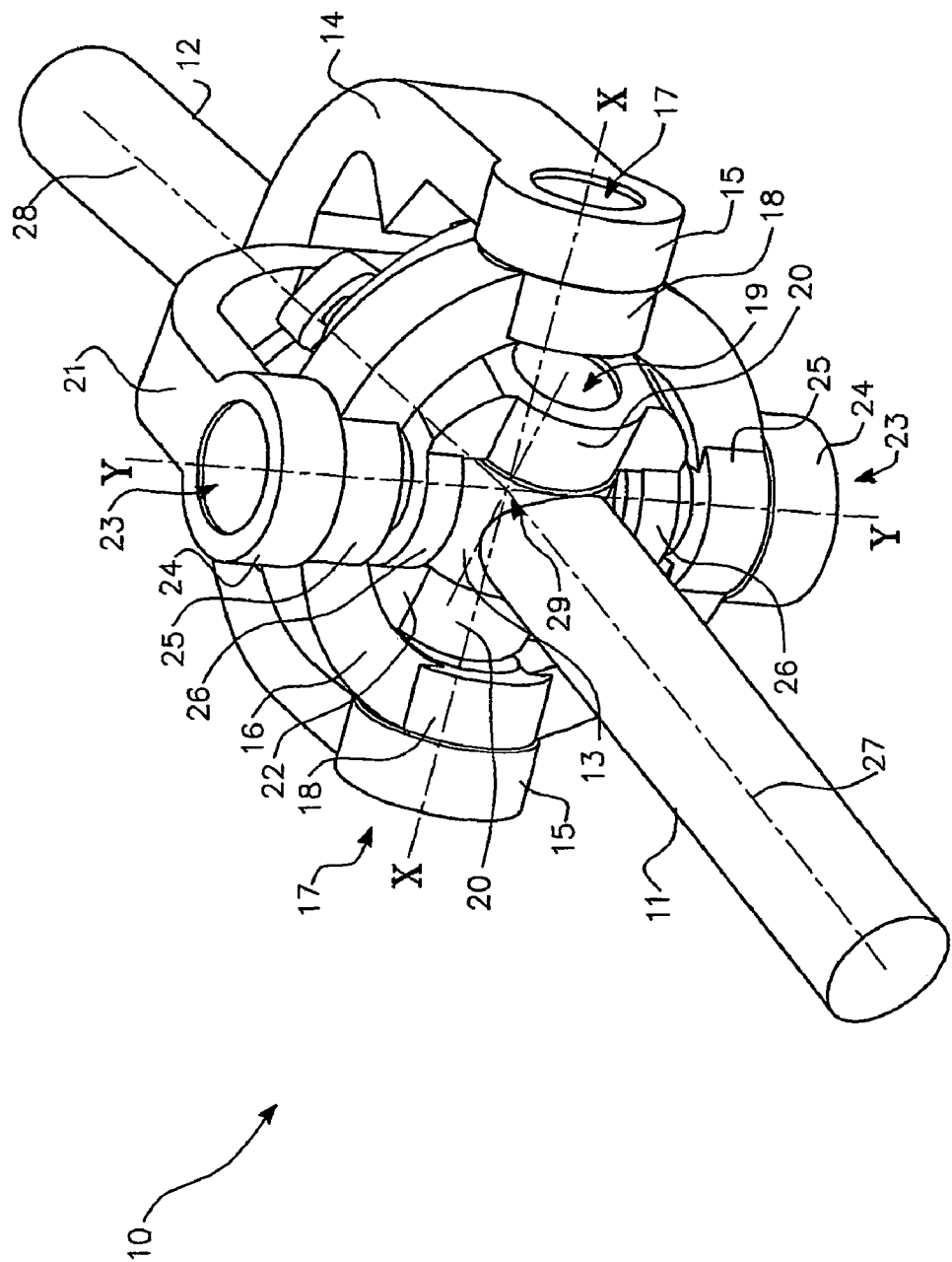
FIG. 2 is a perspective view of the coupling of FIG. 1 with input and output shafts at an angular displacement.

With reference to FIGS. 1 and 2 there is shown a constant velocity coupling 10 in which an input shaft 11 is coupled to an output shaft 12. Input shaft 11 is rigidly connected to input shaft boss 13. Output shaft 12 is rigidly connected to output shaft yoke 14 which is provided with journals 15.

Output shaft yoke 14 is pivotally connected to outer yoke 16 by pivot shafts 17 and bearings (not visible) in outer yoke journals 18.

Input shaft boss 13 is able to pivot about shaft 19 located through inner yoke journals 20.

A control yoke 21 is pivotally connected to outer yoke 16 and inner yoke 22 by means of shafts 23 in control yoke journals 24 and bearings (not visible) in outer yoke journals 25 and inner yoke journals 26. The axis Y—Y defined by control yoke 21 and the journals of outer yoke 16 and inner yoke 22 is the principle axis of the coupling 10.

As shown in FIGS. 1 and 2, all pivotal axes, together with input shaft axis 27 and output shaft axis 28 intersect at the coupling center 29.

Figure 3:
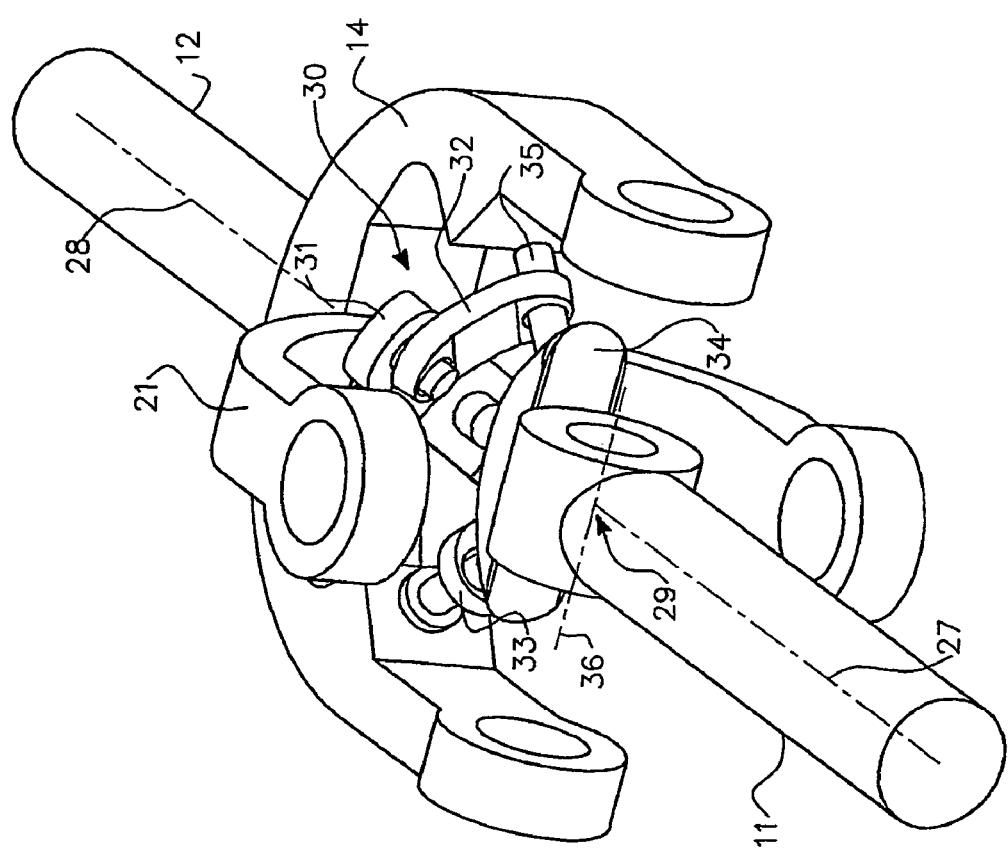
FIG. 3 is a perspective view of the coupling of FIG. 1 with some components removed for clarity.

With reference to FIG. 3 inner yoke 22 and outer yoke 16 have been removed for clarity to show first scissor mechanism 30 comprising first scissor arm 31 and first scissor links 32 and 33. Also visible in FIG. 3 is input shaft extension 34 and input shaft control pin 35. The axis of input shaft control pin 35 intersects coupling center 29 and lies in the plane defined by input shaft axis 27 and input shaft boss axis 36.

Figure 4:
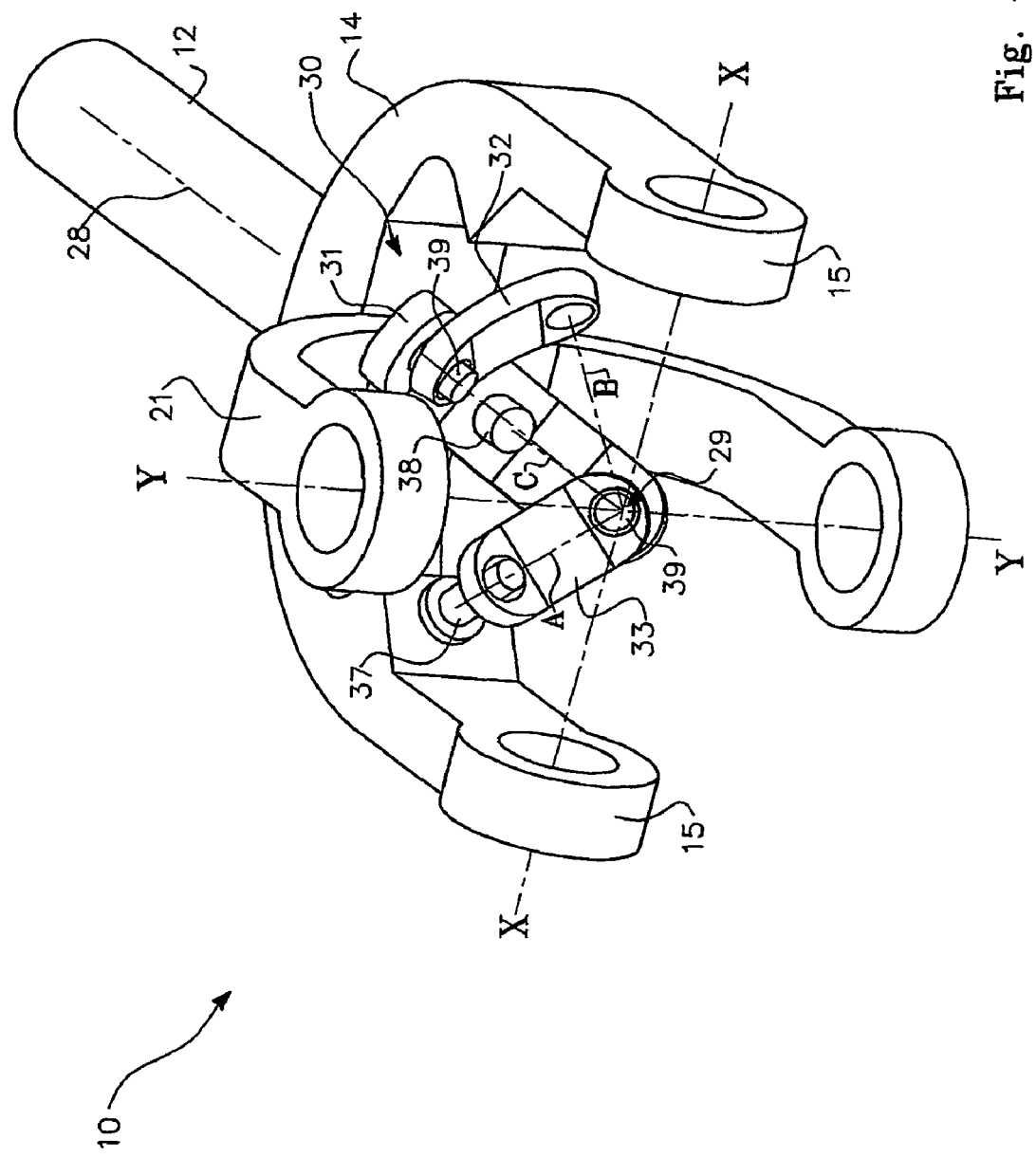
FIG. 4 is a perspective view of the coupling of FIG. 2 illustrating the principle of the control mechanism.

With reference to FIG. 4 where input shaft 11 has been removed for clarity, the geometric characteristics of a first half of scissor control mechanism 30 will now be explained.

Output shaft yoke 14 is provided with output shaft control pin 37. The axis A of control pin 37 lies in the plane defined by output shaft axis 28 and the axis X—X through the centers of output shaft yoke journals 15, and intersects coupling center 29.

Control yoke pivot pin 38 is rigidly connected at the center of control yoke 21 such that its axis C intersects coupling center 29. First scissor arm 31 pivots about control yoke pivot pin 38 and is provide at its outer ends with pivot shafts 39, the axes of which also intersect at coupling center 29. First scissor links 32 and 33 are pivotally connected to pivot shafts 39 of first scissor arm 31. The outer end of first scissor link 32 is pivotally connected to input shaft control pin 35 (refer to FIG. 3) and outer end of first scissor link 33 is pivotally connected to output shaft control pin 37.

Because all axes of rotation of first scissor mechanism 30 intersect at coupling center 29, it is clear that a rotational displacement of input shaft control pin 35 out of the plane defined by output shaft axis 28 and the axis X—X will cause a rotation of control yoke 21 about axis X—X. If the inter-center distances of pivot shafts 39 from control yoke pivot pin 38 and pivot centers of links 32 and 33 are equal, it follow that angular displacement of control yoke 21 will be half that of the angular displacement of input shaft control pin 35.

Figure 5:
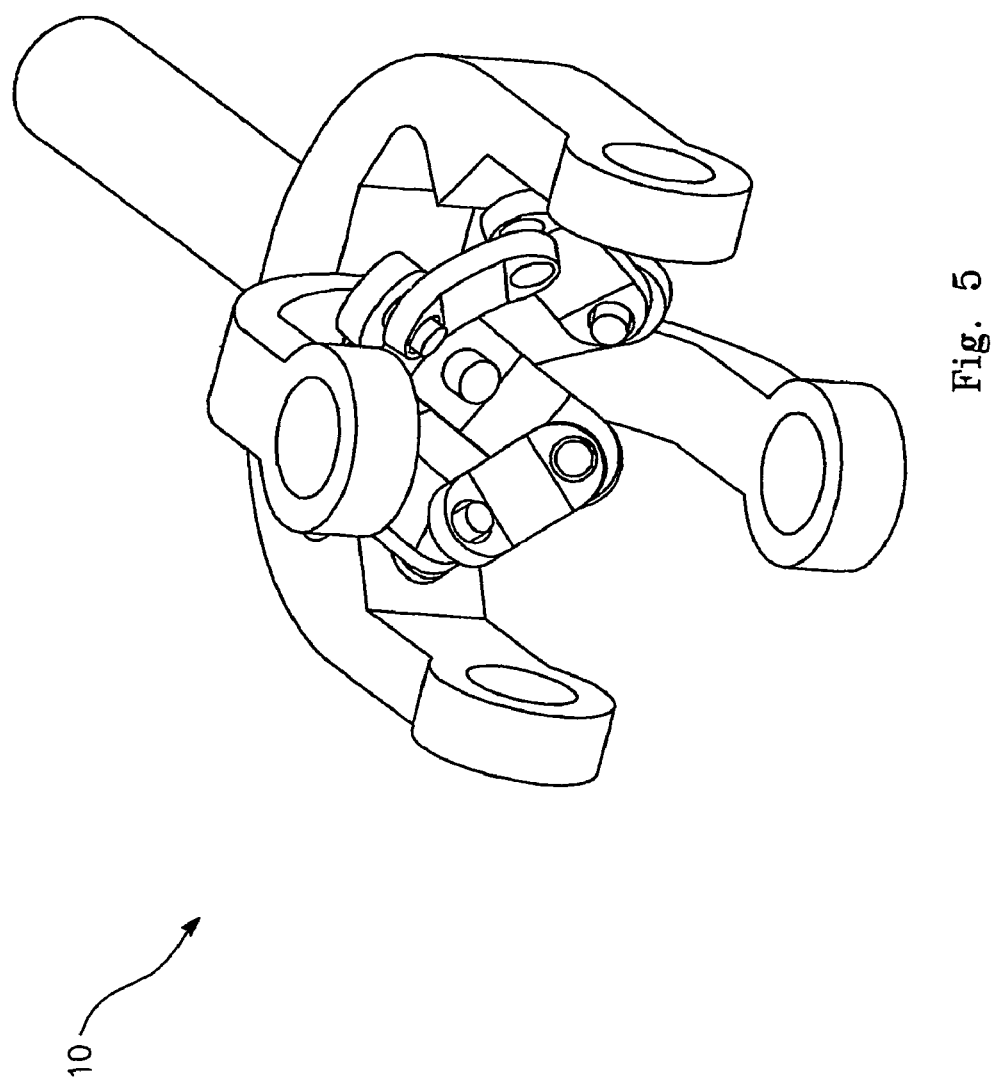
FIG. 5 is a perspective view of the complete control mechanism of the coupling of FIG. 1.

This angular ratio holds true as long as axes A, B and C are constrained to lie in a common plane passing through coupling center 29. As shown in FIG. 5, the control scissor mechanism actually comprises dual symmetrical scissor arms and linkages which ensure that this condition is met. The mechanism can be considered to lie on a series of concentric spheres such that the nominal pivot intersection points of scissor arms and linkages lie at the vertices of spherical triangles, so constrained that corresponding angles within the triangles remain equal as the scissor mechanism re-orients due to the inputs from the two control pins.

For clarity the following example refers only to one half of the dual scissor control mechanism but it will be understood that the motions described are controlled by the complete mechanism.

With reference to FIGS. 3 and 4, let it be assumed that the axis 28 of output shaft 12 is retained in the orientation shown, that is lying in a horizontal plane through X—X. If now input shaft 11 is rotated downward, only about axis X—X, that is the axis 27 of input shaft 11 continues to lie in the same vertical plane as that passing through the axis of output shaft 12 and axis Y—Y, then the end of axis B at its pivotal connection to first scissor link 32, will follow a path upward on a sphere radius B centered at coupling center 29. That path is a small circle on the sphere radius B and lies in a vertical plane parallel to the vertical plane through the axes of input shaft 11 and output shaft 12. This displacement of link 32 forces primary scissor arm 31 to rotate about control yoke pivot pin 38 fixed to control yoke 21. But scissor arm 31 is constrained by its connection to link 33 and output shaft control pin 37. If the angle between the plane defined by axis X—X and rotated axis B and the horizontal plane through X—X is α, then the scissor arm 31 and linkages 32 and 33 will rotate axis C into a plane through X—X at angle α/2. Now the angle between input shaft axis 27 and the horizontal plane is also α, so that it follows that the axis Y—Y bisects the angle (180−α) between input shaft axis 27 and output shaft axis 28.

Clearly the axis Y—Y now lies in the plane bisecting the obtuse angle between input shaft axis 27 and output shaft axis 28 and normal to the plane defined by axes 27 and 28. This plane is the so-called homo-kinetic plane and axes Y—Y may be defined as the axis of symmetry of the coupling.

It can be shown that the axis Y—Y satisfies this relationship to the axes 27 and 28, that is it lies in the homo-kinetic plane, for any relative angle between input shaft 11 and output shaft 12, within the physical constraints of the coupling 10.

This satisfies the theoretical condition for a constant velocity coupling which requires that the input and output shaft axes meet at a point and that the contact points between the two shafts lie on the axis of symmetry in the homokinetic plane.

Clearly all relative movements of components within the coupling are rotational and are realized by roller bearings, thus largely eliminating torque losses through friction.

2. Second Embodiment

Figure 6:
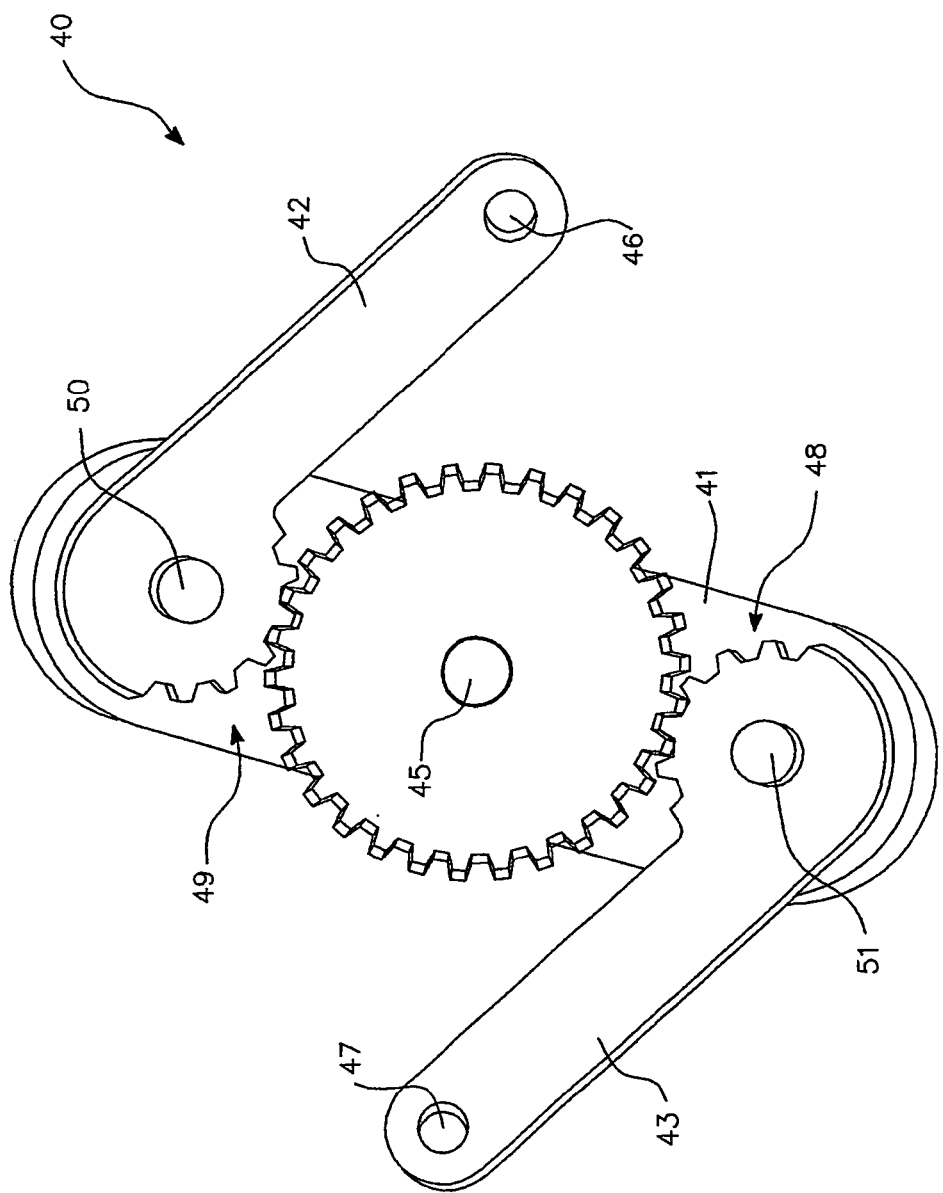
FIG. 6 is an orthogonal view of a control mechanism according to a second preferred embodiment.

In a second preferred embodiment, the scissor control mechanism previously described may be interchanged for a geared mechanism 40 as shown in FIG. 6.

With reference to FIGS. 3, 4 and 6 the center 45 of main arm 41 and central gear. 44 are mounted so as to rotate about control yoke pivot pin 38. Linkage arms 42 and 43 are provided with meshing gear segments 48 and 49 respectively and at their outer ends with pivot centres 46 and 47. Linkage arms 42 and 43 are pivotally mounted to main arm 41 on shafts 50 and 51.

All rotation and pivot axis of control mechanism 40 are radial to the geometric center 29 of the coupling 10 (see FIG. 4). Linkage arms 42 and 43 are of equal length and subtend equal angles with main arm 41. Thus the pivot centers 46 and 47 and the center of central gear 44 are constrained to lie on a great circle arc of a sphere centered on the geometric center 29, and the center of gear 44 will always lie at the midpoint of that great circle arc regardless of any variation in the length of that arc.

On assembly, pivot 46 of control mechanism 40 is connected to input shaft control pin 35 and pivot 47 is connected to output shaft control pin 37.

It will be seen that any change in the angle between input shaft 11 and output shaft 12 will cause displacements of linkage arms 42 and 43. For example, let it be assumed that pivot center 47 of linkage arm 43 remains stationary. Then any displacement induced in pivot center 46 by input shaft control pin 35 will induce half that displacement in the center of gear 44. Thus the axis through control yoke pivot pin 38 will continually bisect the complementary angle between input shaft 11 and output shaft 12 and remain in the plane defined by the axes of the shafts 11 and 12. It follows then that the axis Y—Y will be constrained to lie in the homokinetic plane as previously defined.

3. Third Embodiment

Figure 7:
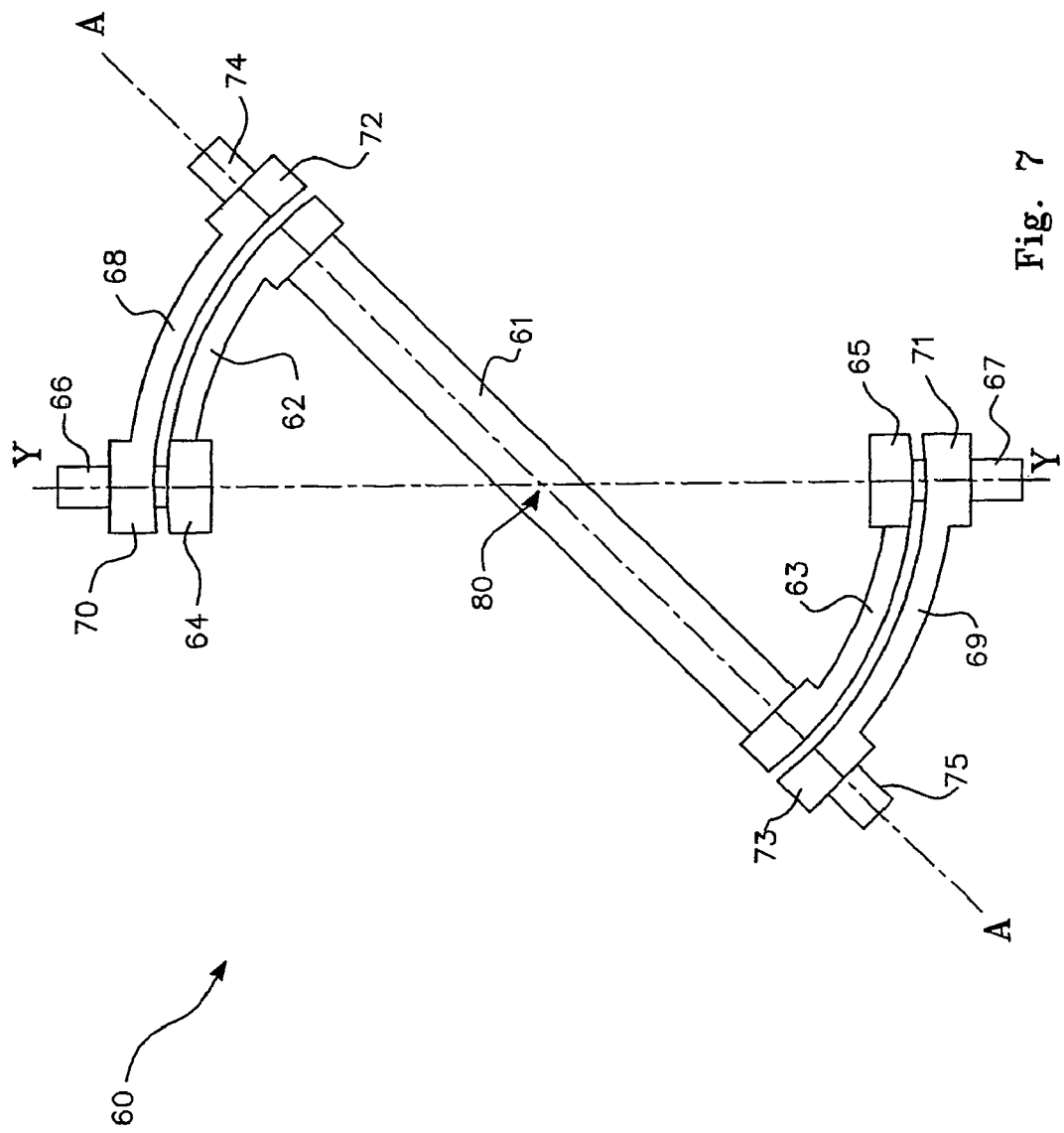
FIG. 7 is an orthogonal view of a linkage mechanism according to a third preferred embodiment.

In a third preferred embodiment with reference to FIG. 7 there is provided a linkage system 60 which takes the place of inner yoke 26 and outer yoke 27 of coupling 10 in FIGS. 1 and 2. Shaft 61 is rigidly connected at its outer ends to linkage members 62 and 63 each of which has at its outer end boss 64 and 65 respectively. Boss 64 and boss 65 carry control trunnion shafts 66 and 67 respectively. Linkage system 60 is further provided with linkage arms 68 and 69 each provided with ends 70 and 71 pivotally connected to control trunnion shafts 66 and 67 respectively. Linkage arms 68 and 69 have outer ends 70 and provided with output shaft yoke trunnion shafts 74 and 75.

Linkage members 62 and 63 and linkage arms 68 and 69 lie within spherical shells centered on the intersection point 80 of the axis of shaft 61 and axis Y—Y and all rotation axes of the linkage system 60 intersect at axes intersection point 80.

On assembly axes intersection point 80 is coincident with the geometric center 29 of the coupling 10 of FIG. 1.

In this embodiment input shaft boss 13 of input shaft 11 of FIG. 1, rotates about shaft 61 of the linkage system 60 shown in FIG. 7, and output shaft yoke journals 15 of output shaft yoke 14 are connected to trunnion shafts 74 and 75.

Control yoke journals 24 of control yoke 21 are connected to control trunnion shafts 74 and 75.

As before, the control yoke axis Y—Y is constrained to remain in the homokinetic plane by the use of either the scissor control mechanism or the geared control mechanism described above.

An advantage of the arrangement of axis Y—Y and shaft 61 at a preferred angle of 45 degrees in this embodiment is that the space so created allows greater freedom of movement of the various rotational elements and the control mechanisms described above.

4. Fourth Embodiment

In a fourth preferred embodiment illustrated in FIG. 7, there is provided a double constant velocity coupling 100 comprising input shaft 111 and output shaft 112. Each of shafts 111 and 112 is provided with yokes 113 and 114 respectively in which the shafts 111 and 112 are pivotally connected about axes X—X and X'—X'. Yokes 113 and 114 are in turn pivotally connected to connecting tube 115, each yoke 113 and 114 able to rotate about axes Y—Y and Y'—Y' respectively.

Figure 8:
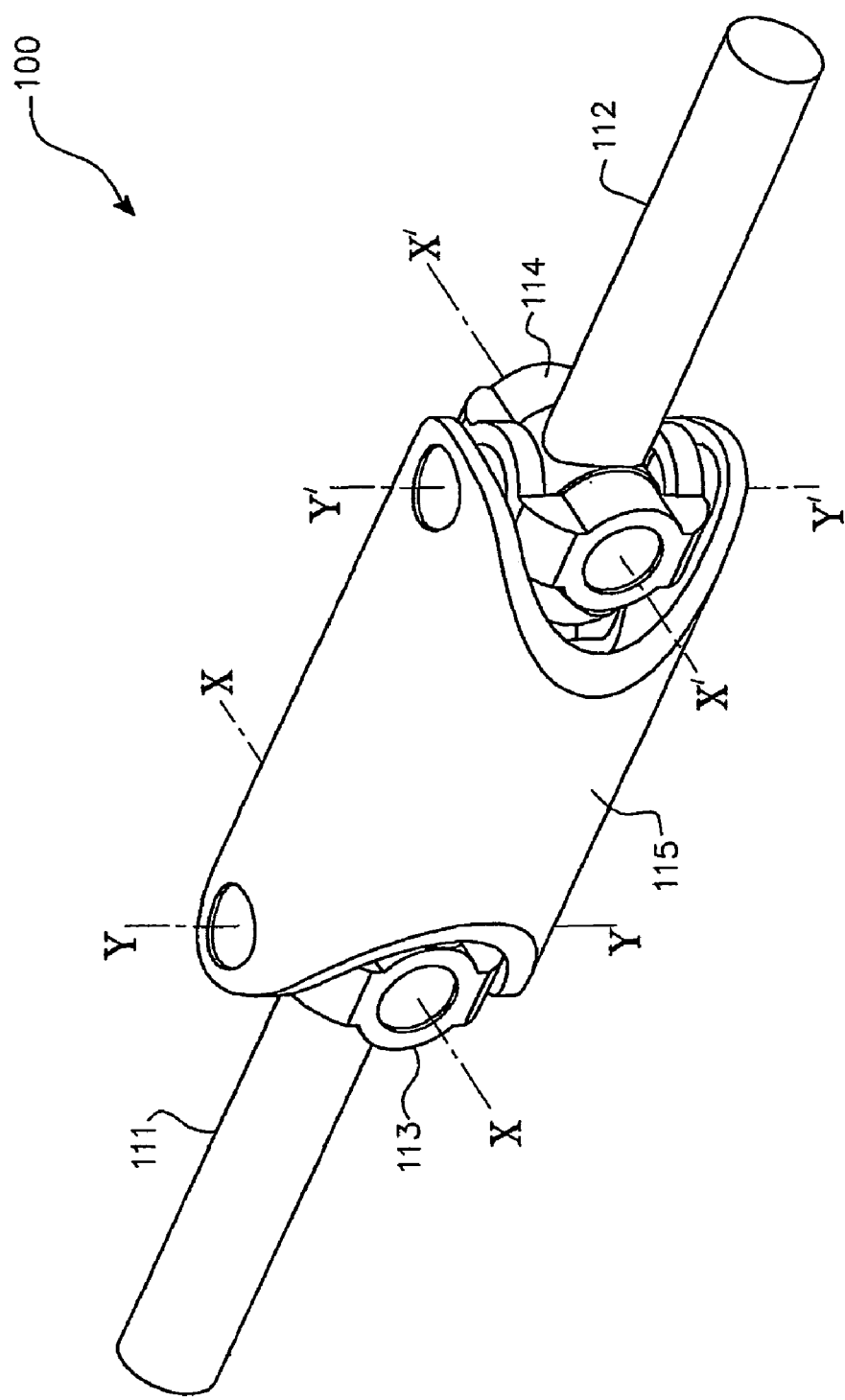
FIG. 8 is a perspective view of an assembled constant velocity coupling according to a fourth preferred embodiment.
Figure 9:
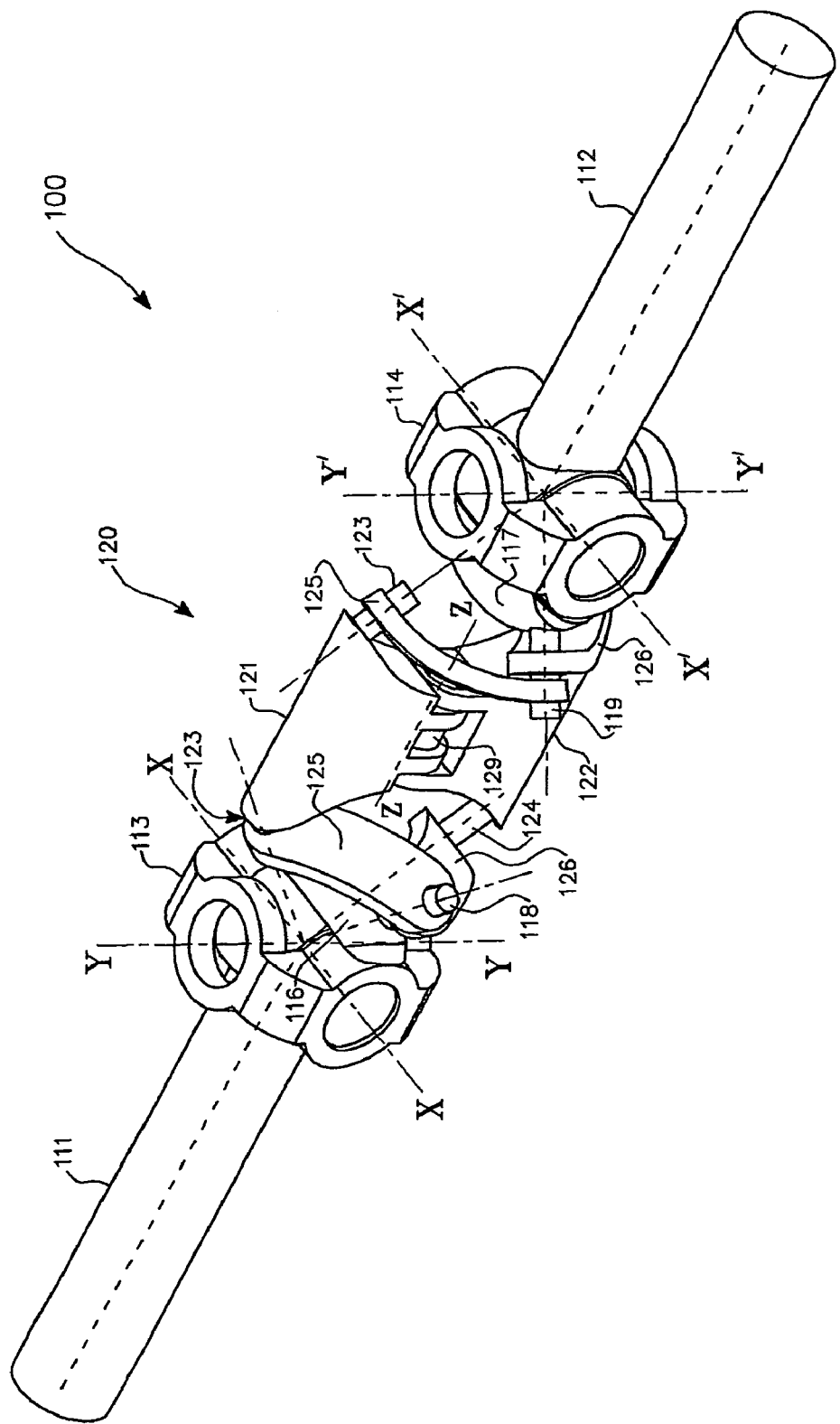
FIG. 9 is a perspective view of the coupling of FIG. 8 with the center tube removed.
Figure 10:
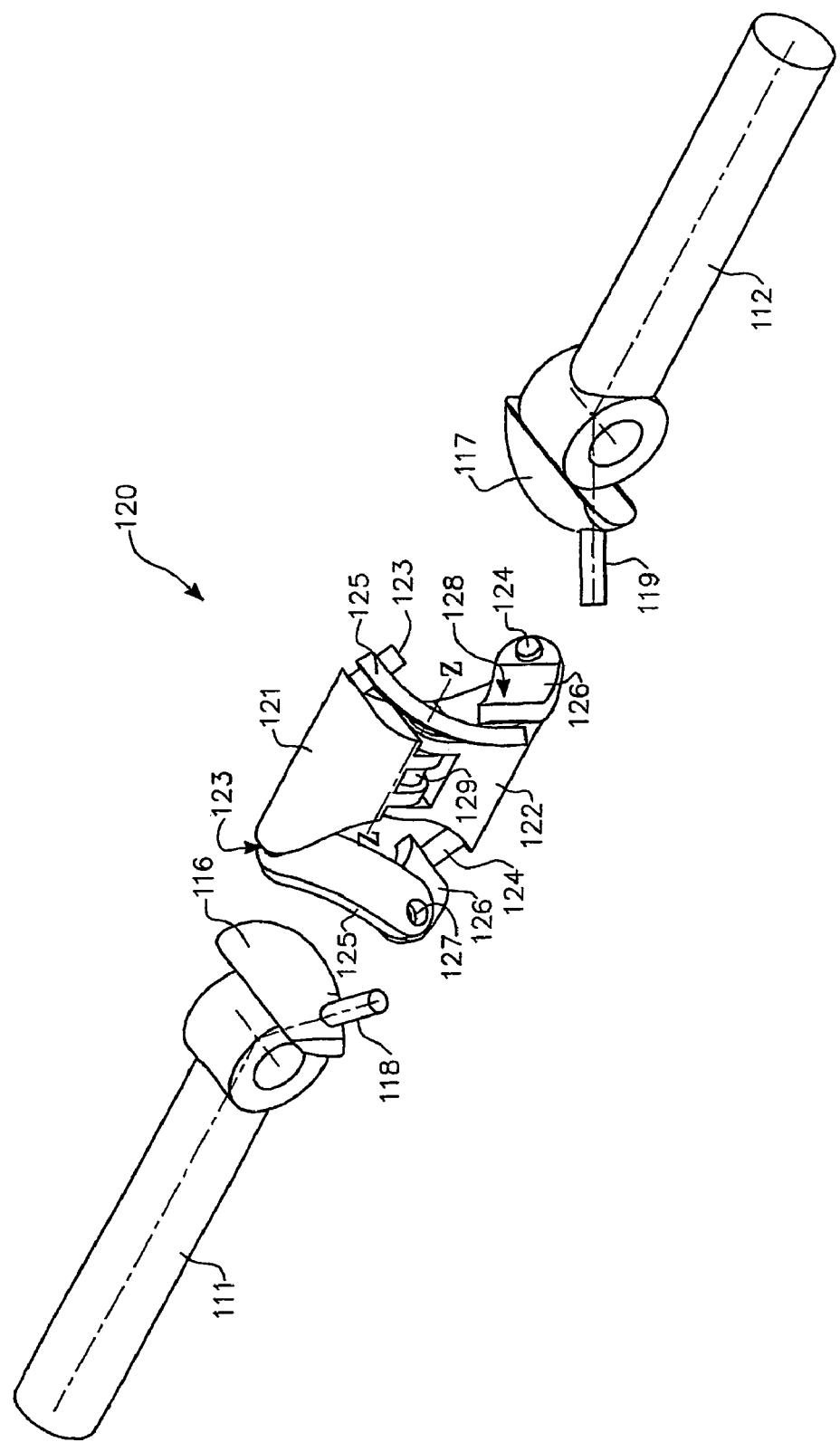
FIG. 10 is a perspective view of the components of the coupling of FIG. 9.

As shown in FIGS. 8 and 9, input shaft 111 and output shaft 112 are of identical construction each being provided with shaft extensions 116 and 117 respectively with each shaft extension having control pins 118 and 119 respectively. The axes of control pins 118 and 119 each lie in the plane defined by the shaft axis and the shaft rotation axis X—X and X'—X' of shafts 111 and 112, and intersect with the intersection of these axes.

Positioned in the center of connector tube 115 (removed in FIGS. 8 and 9 for clarity) is control assembly 120 including upper and lower transmission blocks 121 and 122 respectively. Blocks 121 and 122 are hinged together about the control block hinge shaft 129 lying on central axis Z—Z of connector tube 115. Shaft 129 is supported by means of a fixed pivot (removed for clarity) attached to the inner wall of connector tube 115.

As shown in FIG. 8 all rotation axes at the input shaft end of the coupling 100 are radial to the intersection of axes X—X and Y—Y; similarly all rotation axes at the output end of coupling 100 are radial to the intersection of axes X'—X' and Y'—Y'.

Any rotation within the physical constraints of the coupling of input shaft 111 about its axes of rotation X—X and Y—Y will cause control shaft 118 to displace connected linkages 125 and 126 causing in turn a rotation of transmission blocks 121 and 122 about hinge shaft 129. Corresponding linkages 125 and 126 at the output end of control assembly 120 are forced to duplicate the displacement generated at the input end, transferring the displacement to linked control shaft 119, thereby causing output shaft 112 into corresponding rotations about its axes X'—X' and Y'—Y'.

The angular displacements of input shaft 111 and 112 are symmetrical about a plane normal to the plane defined by the axes of shafts 111 and 112 and passing through the center of control assembly 120. As such the plane lies on the intersection of the axes of shafts 111 and 112, bisecting the angle between them and containing the axis of symmetry. That plane is therefore the homo-kinetic plane and the conditions for constant velocity of input and output shafts are satisfied.

Again, all relative movements between components of the coupling in this embodiment are rotational and are realized by roller bearings, largely eliminating torque losses due to friction.

5. Fifth Embodiment

A fifth preferred embodiment is now described wherein a constant velocity coupling is provided in which the angle between input and output shafts is maintained at some desired value by a variable control mechanism so as to vary the volumetric displacement of a swash plate operated hydraulic pump or motor. In this preferred application the reciprocating pump or motor elements are incorporated within the structure of the coupling.

In this fifth preferred embodiment a constant velocity coupling is adapted to incorporate a variable swash plate hydraulic displacement device.

Figure 11:
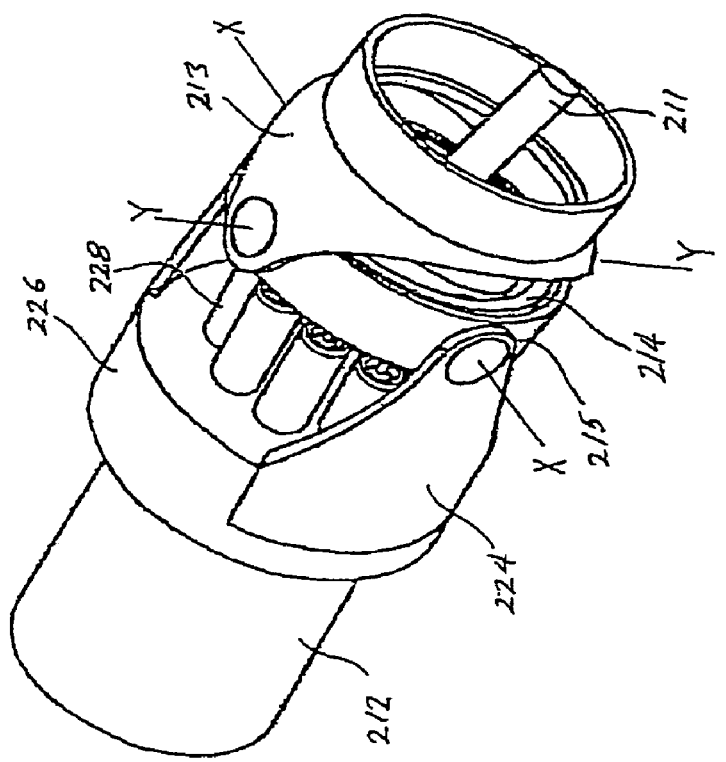
FIG. 11 is a perspective view of a coupling arrangement which can function as a hydraulic motor in accordance with a fifth embodiment.

With reference to FIG. 11 there is shown a constant velocity coupling 200 with input shaft 211 and output shaft 212. It will be obvious to those skilled in the art that the terms "input shaft" and "output shaft" in this embodiment can be assigned to each of these elements interchangeably depending on the application of the coupling.

Figure 12:
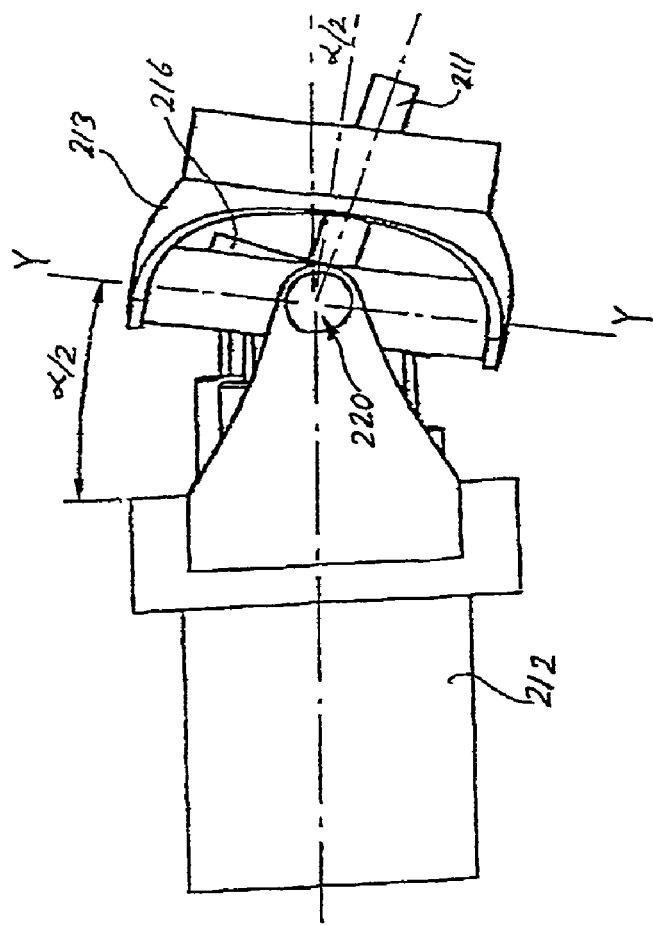
FIG. 12 is a side view of the coupling of FIG. 11.

The axis of each of shafts 211 and 212 intersect at a point 220 coincident with the intersection of axes X—X and Y—Y in FIG. 11; point 220 defining the geometric center of the coupling. The angle between the axes of shafts 111 and 112 may be varied from time to time as desired within the physical constraints of the coupling by a suitable control mechanism. The control mechanism is further adapted to maintain the angle of control yoke 213 in a fixed relationship to that angle set between shafts 211 and 212. This relationship is illustrated in FIG. 12, where if the supplementary angle between shafts 211 and 212 is $\alpha$, then the axis of rotation of control yoke 113 bisects the angle $\alpha$. Thus the axis Y—Y is constrained to rotate in the homokinetic plane, satisfying the condition for a constant velocity coupling.

Figure 13:
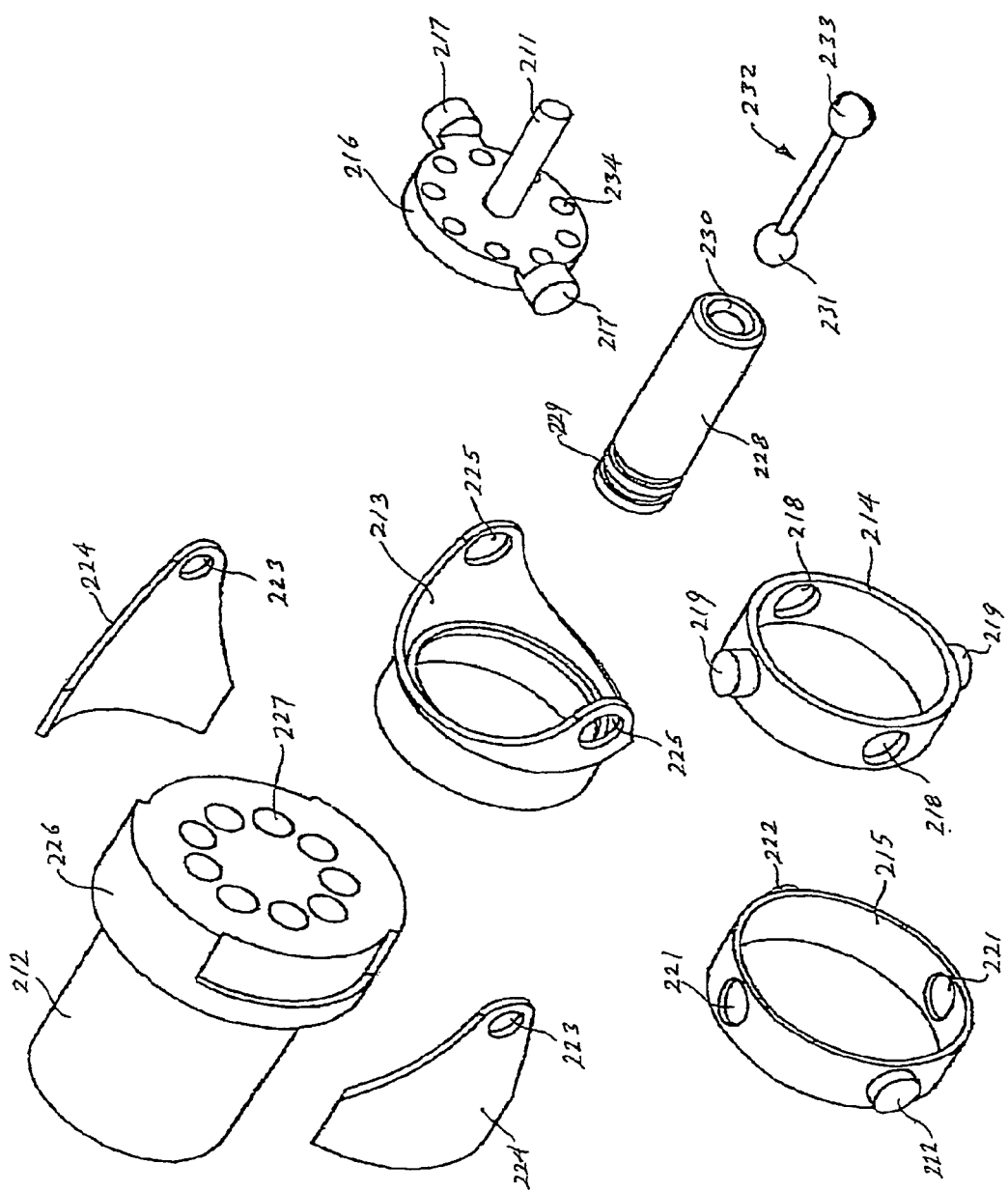
FIG. 13 is a perspective view of the primary components making up the coupling of FIG. 11, FIGS. 14.1 to 14.20 comprise various views of sixth to tenth embodiments, FIGS. 15.1 to 15.4 comprise various views of an eleventh embodiment, FIGS. 16.1 to 16.14 comprise various views of a twelfth to fifteenth embodiment, FIGS. 17.1 to 17.9 comprise views of a sixteenth embodiment, FIGS. 18.1 to 18.13 comprise views of a seventeenth embodiment, FIG. 19.1 comprises a perspective view of an eighteenth embodiment, FIGS. 20.1 to 20.9 comprise views of a nineteenth embodiment, FIGS. 21.1 to 21.5 comprise views of a twentieth embodiment, FIGS. 22.1 to 22.7 comprise views of a twenty-first embodiment.

FIG. 13 shows the disparate elements of the coupling including control yoke 213, inner yoke 214 and outer yoke 215. Input shaft 211 is rigidly connected to swash plate 216 provided with swash plate trunnion shafts 217.

On assembly, swash plate trunnion shafts 217 pivotally connect in inner yoke journals 218 of inner yoke 214. Inner yoke 214 is pivotally connected by its inner yoke trunnion shafts 219 to the outer yoke journals 221 of outer yoke 215. In turn outer yoke 215 is pivotally mounted by its outer yoke trunnion shafts 222 in output shaft yoke journals 223 of output shaft yoke 224. Control yoke 213 (shown from its yoke end) is pivotally connected by control yoke journals 225 to the extended inner yoke trunnion shafts 219 of inner yoke 214.

The output shaft 212 of coupling 200 is further provided with cylinder block 226. Cylinder block 226 is provided with a radial array of cylinders 227. Each of cylinders 227 accepts a piston 228 provided at its compression end with seals 229 and at its opposite end with ball socket 230. Each piston 228 is connected by its ball socket 230 to first end 231 of connecting rod 232. Second end 233 of connecting rod 232 is connected to a ball socket 234 of swash plate 216.

On assembly when input shaft 211 and output shaft 212 are coaxially in alignment, the face of swash plate 216 is oriented normal to the axis of output shaft 212 and thus the axes of cylinders 227. In this situation the rotation of input shaft 211 and output shaft 212 about this common axis will leave pistons 228 stationary in cylinders 227. When an angle $\alpha$ is introduced between input shaft 211 and output shaft 212, by means of the control mechanism, a reciprocal axial displacement is induced in each of the cylinders 227 by pistons 228 for every revolution of the coupling 200.

The volumetric displacements caused by the reciprocal movement of pistons 228 in cylinders 227 within a revolution of the coupling 200 increases as the angle a increases.

Possible advantages of this configuration are:

A. Previous are used a rzeppa type constant velocity joint with the inner member of the constant velocity joint held coaxial with the cylinder body and the outer member of the constant velocity joint forming th swash plate. With such an arrangement the entire torque of the assembly was transmitted through the constant velocity joint and the torque transmission members at a lesser radius than the swash plate with the result that the torque transmitting means were subject to high loadings.

B. With present configuration torque may be transmitted to or from the swash plate by one of two methods both of which are superior to the prior art:
   1. Torque transmitted by shaft connected to the cylinder body—In this case the torque transmitting means is at a greater radius than the swash plate with the result that the torque transmitting members are subject to lesser torque loads than with the prior art.
   2. Torque transmitted by shaft connected to the swash plate—In this case the torque transmitting members of the constant velocity joint are not subject to the working torque of the device, the only load transmitted through the coupling is the torque necessary to rotate the cylinder body.

6. Sixth Embodiment

This embodiment referring to FIG. 14 provides for a joint of the modified Hooke's type where axis A5 continuously lies on the homokinetic plane due to the operation of a system of gears and levers arranged in such a manner that the rate and degree of revolution of a first actuating gear is at all times identical to the rate and degree of revolution of a second actuating gear by means of maintaining the angle of inclination between axis A3 and the axis of a first actuating gear the same as the angle of inclination between axis A4 and the axis of a second actuating gear. Alternatively a system of levers alone is envisaged where the levers perform similar functions to the abovementioned gears.

Several preferred methods of implementing this embodiment will now be disclosed. In each preferred method there is provided two halves of a modified Hooke's joint as shown in FIG. 14.6. It will be observed that the joint shown in FIG. 14.6 is identical to the joint shown in FIG. 14.1 excepting that the cruciform member 6 as shown in FIG. 14.1 is omitted and a circular member 7 is located to yoke 4 such that it is free to rotate about axis A4. The size of ring member 7 and yoke 4 is such that the assembly may fit inside the inside the ring member 5 which is attached to yoke 3. The components shown in FIG. 14.6 are common to all preferred embodiments of the present invention.

FIG. 14.7 shows a cruciform member with two of the arms having the same axis longer than the two other arms such that the two longer arms have a combined length at least equal to the outside diameter of the larger ring member 5 and the two shorter arms have a combined length less than the internal diameter of ring member 7 such that when assembled the longer arms connect the two halves of the joint shown in FIG. 14.6 at axis A5 and the cruciform member is free to rotate on axis A5 within ring member 7.

FIG. 14.8 is the cruciform member shown in FIG. 14.7 with four intermeshed bevel gears one of which is located on and free to revolve on each of the arms of the said cruciform member. The two gears which are located on the shorter arms of the cruciform member have a lever rigidly attached to them but not shown in this drawing.

FIG. 14.9 shows one of the gears with the rigidly attached lever arm. The lever arm has a ball 25 the end of it. Within the parameters discussed below neither the length of the lever arm nor its offset along the axis of the gear is critical. One such gear is located on each of the shorter arms of the cruciform member such that a lever arm extends out on opposite sides of the cruciform member. The lever arm attached to one of the gears must be aligned half a tooth different from the alignment of the other lever arm and gear such that the axis of the two longer arms of the cruciform member bisects the angle between the two levers as they rotate in mesh with the other two gears.

FIG. 14.10 shows a yoke with a ball member rigidly attached to the centre of the inside surface of the yoke, both yokes have such a ball member attached.

FIG. 14.11 shows a linkage member being a rod with a ball socket at either end adapted to connect at one end to the ball on the end of the lever shown in FIG. 14.9 and at the other end to the ball in the centre of the yoke member as shown in FIG. 14.10.

The components described above and shown in FIGS. 14.6, 7, 8, 9, 10 and 11 are assembled such that the longer arms of the cruciform member extend through the holes in ring members 5 and 7 such that the said ring members are located in respect to one another by the longer arms of the cruciform member and free to rotate about axis A5 and the cruciform member is also free to rotate on axis A5. The positions of the various components upon assembly is such that when the axis of shaft 1 and shaft 2 are in line the component parts have the relative positions as shown in FIG. 14.12 and in that view axis A3 and A4 and the axis of the gears located on the shorter arms of the cruciform member are all coaxial and axis A5 is perpendicular to the plane of axis A3, A4, A1 and A2.

The joint as represented in FIG. 14.12 is intentionally shown with yoke 3 substantially larger then yoke 4 in order to illustrate the relationship between the various components. A linkage member 13 (as shown in FIG. 14.11) is connected at one end to the ball at the end of lever 11 and at the other end to the ball which is fixed to the centre of the inside surface of yoke 3 a similar linkage member 14 is similarly connected in the other half of the joint and the length of each linkage member and the length of the two lever arms 11 and 12 are determined as follows. The important consideration is that the triangle which is formed between the point of axis of the lever arm 11 and the centre of the ball which is fixed to the centre of yoke 3 and the centre of the ball at the end of lever 11 has the same internal angles as the triangle similarly formed in the other half of the joint; in other words the two triangles so formed should be identical except for size in this embodiment.

If the centrelines of the lever arms project to the centre of the cruciform member (or disk member described below) then the internal angles of the triangle remain the same at all times while the joint rotates. However if the centreline of the lever arms project to a point which is offset from the centre of the cruciform member the internal angles of the triangle continuously change with revolution of the joint. If the centreline of the lever arms are offset from the centre of the cruciform member it is essential that both lever arms are offset to the extent that identical triangles are formed on either side of the joint.

It will be seen that with operation of the joint described above both of the triangles described above effectively rock about their respective bases and also rock about the point of axis of the lever arms with the effect that when axis A3 and A4 are coaxial then the axis of the two levers are also coaxial with axis A3 and A4 and whenever axis A3 and A4 are not coaxial the axis of the lever arms and associated gears always bisects the angle between axis A3 and A4 as they rotate about axis A5 with the result that the angle between the axis of the actuating levers 11 and 12 and their associated gears are always equally inclined to axis A3 and A4 respectively with the result that with rotation of yoke 3 about axis A3 and with rotation of yoke 4 about axis A4 the levers 11 and 12 and their attached gears will contra rotate about their axes at different rates and to a different degree than the rotation of the yokes about axis A3 and A4. However the said levers and associated gears will contra-rotate at equal rates and to equal degree as one another with the result that axis A5 will continuously lie on the homokinetic plane and the joint will operate as a constant velocity joint in that the angular velocity of shaft 1 and shaft 2 will always be equal no matter what the angle of inclination of the said shafts to one another and will do so even if the angle of inclination alters during operation.

7. Seventh Embodiment

In another embodiment the cruciform member of FIG. 14 and four bevel gears and associated levers are replaced with a member adapted to hold two meshing gears in such a position that when the axis of shaft 1 and shaft 2 are in line their respective axis are perpendicular to the axes of both of the gears and axis A5 is perpendicular to and central to the plane between the axis of the two gears. A lever arm is rigidly affixed to each gear and a ball is on the end of each lever arm. With reference to FIG. 14.13 the member adapted to hold the two gears is a disk like member the diameter of which will fit inside ring 7. The disk member has two lugs which are used to locate and provide the axis for rings 5 and 7. The disk member has a rectangular hole through it so as to permit the meshing of the two gears through the disk. The disk member is free to rotate on axis A5. The disk member has two protrusions from each face and the axle for each of the gears is held by these protrusions. FIG. 14.14 is a side elevation of the disk member with the two gears in place. The lever arms one of which is rigidly attached to each gear are part shown. The operation of this disk like member and associated gears and levers is identical to the operation detailed above in respect to the cruciform member and four bevel gears and the same considerations apply.

8. Eighth Embodiment

Another embodiment illustrated in FIG. 14 is a system of levers arranged to pivot on each of the four arms of the cruciform member described above where their action is similar to the arrangement of the four intermeshing gears.

9. Ninth Embodiment

Another embodiment illustrated in FIG. 14 which may be used with either the cruciform member and the four bevel gears or the disk like member and the two gears or the system of levers alone is as follows. The ball member which is attached to the centre of the inner surface of each yoke is omitted and each of the yolks has an arcuate groove formed in the inside face of the yolk such that upon assembly the ball at the end of the lever arms is located in that groove so that with operation of the joint and as axis A3 and A4 change angle between each other the ball on each lever is caused to traverse the groove. If constructed in this manner the triangle referred to above is not available to maintain the correct relationship between the axis of the actuating gears and axis A3 and A4 so a different means of maintaining equal inclination between the axis of the gears and levers and the axis of their respective actuating yokes must be employed.

One such method is to employ the scissor action of rings 5 and 7 which occurs as the angle between axis A3 and A4 changes. One method of employing this scissor action is to rigidly fix a rod to either one of the longer arms of the cruciform member or one of the lugs of the disk like member as the case may be such that it is oriented perpendicular to the plane of the four arms of the cruciform member or the face of the disk like member as the case may be, two lever arm are used one of which is rotatably fixed to each of the ring members 5 and 7 at one end and the other end is fixed to a member which joins both lever arms at their other end by a member which slides along the rod which is fixed to the arm of the cruciform member or disk member as the case may be so that the rod continuously bisects the angle between ring members 5 and 7. FIG. 14.15 is a representation of just such a scissor mechanism.

It will also be appreciated that without departing from the present invention various other configurations of gears and levers will also work to maintain the relationship between the various components as disclosed herein.

It will also be appreciated that without departing from the present invention it is also possible to arrange a system of levers alone instead of the gear and lever systems to maintain the relationships described herein.

It has been found that in respect of the sixth to ninth embodiments it is helpful to provide separate means to ensure that the shorter arms of the cruciform member bisect the angle between axis A3 and A4 whenever they are not coaxial and in the seventh embodiment it is also helpful to provide separate means to ensure that the plane of the member shown in FIG. 14.13 bisects the angle between axis A3 and A4 whenever they are not coaxial. In both instances such centering means may be to utilise the scissor action between member 5 and 7 as discussed above in respect to the eighth embodiment.

10. Tenth Embodiment

There is now disclosed with further reference to FIG. 14 a further, unique and novel means of providing a constraining means so as to facilitate a constant velocity joint by constraining axis A5 on the homokinetic plane.

This further novel means provides for members which describe two identical spherical triangles one in each half of the joint described below.

As with the previously disclosed constant velocity universal joints the members shown in FIG. 6 are used however in this novel embodiment and with reference to FIG. 14.16 a disk like member 15 is provided. The disk member has two pins or trunnions 16 which provide the connecting means between ring members 5 and 7 and forms axis A5. The disk like member has a hole 17 through the center of the disk. It will be seen that upon assembly of the two halves of a joint as shown in FIG. 14.6 using the disk like member shown in FIG. 14.16 then all of axis A1, A2, A3, A4 and A5 intersect at a point. For the purpose of the present disclosure the point at which all of the said axes intersect will be called "the geometric centre".

With reference to FIG. 14.17 there is also provided a double ended crank like member having a crank pin 18 at each end where the crank pin is angled such that upon assembly the axis A6 of each of the crank pins are each on a radius which intersects the geometric centre.

Upon assembly and with reference to FIG. 14.18 the shaft of the crank like member is passed though the hole in the disk like member shown in FIG. 14.16 such that one crank pin is on either side of the said disk like member.

With reference to FIG. 14.19 which shows the two yokes of a joint a pin 19 is fixed to the inside arc or surface of the yoke members 3 and a further pin 20 is similarly fixed to the inside surface or arc of yoke 4 such that the axis of each of the said pins also lies on a radius which intersects the geometric centre. The pins are situated such that they are on the same side of the joint as one another rather than diagonally opposite.

With reference to FIG. 14.20 a further member 21 is provided having a hole 22 at one end such that member 21 can be located on pin 19 and a further hole 23 such that the other end of member 21 may be located on the first pin 18, a further similar member is provided and is located on one end on pin 20 and at the other on the second pin 18. The length or more correctly the angle between the holes at either end of member 21 is as set out below.

Upon assembly of the joint and when the joint is in a position where axis A1 and A2 are in line and axis A3 and A4 are coaxial the axis of the crank pins 18 is on the plane of axis A5 and A1 and A2 and the axis of pins 19 and 20 are each on the plane of axis A3 and A4 and A1 and A2. The angle between the holes in either end of member 21 is such that the relationships described in this paragraph are held or true.

With the novel restraining means last described herein it will be seen that a spherical triangle is described by the great circle arcs between firstly the axis of pin 19 and axis A1, secondly Axis A1 and the axis of the first crank pin, thirdly the axis of the first crank pin and the axis of pin 19. A similar spherical triangle is described between the corresponding components on the other side of the joint. It will be seen that with rotation of the assembled joint at any time when shafts 1 and 2 are inclined to each other a unique spherical triangle is formed at each point of revolution and angle of inclination and such a triangle is formed on each half of the joint with the result that the axis of the crank like member is equally inclined to firstly axis A1 and secondly axis A2 with the result that the plane of the disk like member 15 and therefore axis A5 is constrained to remain continuously on the homokinetic plane of the joint.

11. Eleventh Embodiment

The present embodiment of FIG. 15 provides firstly a linkage mechanism as set out in FIG. 15.1 hereof and described below and secondly as described below a constant velocity universal joint utilizing the said linkage mechanism.

With reference to FIG. 15.1 hereof the linkage mechanism disclosed consists of the following. Members' 1 and 2 which are two similar members each having a hole formed in each end with the axis of the said holes intersecting at a point. Members 3 and 4 are also two similar members and also similar to members 1 and two excepting that members 3 and 4 have the holes formed in each end at a greater radius than do members 1 and 2. Members 1 and 2 are connected to one another by a shaft 5. Locating pin 6 connects members 1 and 3 such that members 1 and 3 may rotate in relation to one another about axis A1. The said members are assembled in such a manner that the normal axis of shaft 5 intersects axis A1. It will be seen that with such an assembly members 1 and 2 which are connected together by shaft 5 will rotate in unison about axis A1 such that the normal axis of shaft 5 rotates about axis A1 and similarly if members 3 and 4 are held in fixed relationship to each other then they also will rotate in unison about axis A1 such that their axis, axis A2 will also rotate about axis A1 and axis A1, A2 and the normal axis of shaft 5 will always intersect at the geometric centre of the above described linkage mechanism.

One application utilizing the above described linkage mechanism is a constant velocity universal joint as now disclosed. FIG. 15.2 depicts a shaft with a hole formed in one end such that shaft 5 may be passed through the said hole. FIG. 15.3 depicts a yoke as commonly used in universal joints such as the common hooke's joint (also known as a cardan joint). Holes 13 and 14 are formed in the arms of the yoke such that the yoke may be located in relation to the linkage mechanism described above by locating pins 8 and 9 in holes 13 and 14 respectively. Shaft 10 is located on shaft 5 such that axis A3 being the normal axis of shaft 10 intersects axis A1 and A2 at the geometric centre of the linkage mechanism. Similarly it will observed that upon assembly as disclosed above axis A4 which is the normal axis of the yoke member 12 also intersects Axis A1 and A2 at the geometric centre of the linkage mechanism. It will be seen that with such an assembly at any time where axis A3 and A4 are not in line or coaxial to one another rotation of shaft 10 and yoke 12 about axis A3 and A4 respectively will result in members 1 and 2 rotating in unison about axis A1 while concurrently members 3 and 4 will also rotate in unison about axis A1 but in opposite direction of rotation to members 1 and 2. With such an assembly it will be observed that whenever axis A3 and A4 are not in line or coaxial and axis A2 and the normal axis of shaft 5 are not in line or coaxial then the plane of rotation of axis A1 always bisects the angle between the plane of rotation of axis A2 and the normal axis of shaft 5 and additionally the plane of rotation of axis A1 is perpendicular to the plane between axis A3 and A4 and hence the requirements of a constant velocity joint are present at all times.

FIG. 15.4 is a representation of the linkage mechanism assembled with shaft 10 and yoke 12 so as to form a constant velocity joint as described above. In this representation axis A3 and A4 are inline and axis A2 and the normal axis of shaft 5 are also in line or coaxial. In this representation axis A2 and the normal axis of shaft 5 are on the plane of the paper while axis A1 enters the page from the bottom at an inclination equal to the angle between the holes in members 1,2,3 and 4. In this particular representation it will be seen that if shaft 10 was rotated anticlockwise on the plane of the paper and yoke 12 was rotated clockwise on the plane of the paper then shaft 5 would rotate about axis A1 and Axis A2 would also rotate about axis A1 but on the opposite direction.

There is herein disclosed a linkage mechanism having three intersecting axes two of which rotate in relation to the third. There is also disclosed a constant velocity universal joint utilizing the said linkage mechanism and is a constant velocity universal joint having at least three axes two of which rotate about the third. This embodiment should utilise the same control system including the control yoke and control pins of the first embodiment, so as to constrain axis A1 on the homokinetic plane.

12. Twelfth Embodiment

The term "spherical geometry" as intended for the purpose of this embodiment is as follows and with reference to FIG. 16. FIG. 16.1 is a depiction of a sphere with a spherical triangle and associated trihedral set out on it. With reference to FIG. 16.1 axis 2 and 3 are diameters of sphere 1. Spherical triangle sides AD, AO and AZ are the intercepted great circle arcs of trihedral face angles D, Z and O respectively and angles A, B and C are the internal angles of the spherical triangle AD, AO, AZ. With further reference to FIG. 16.1 it will be seen that if spherical triangle AD, AO, AZ is rotated about either radius 4 or radius 5 or diameter 3 then the rotating radii describe cones within the sphere. With further reference to FIG. 1 it will also be seen that if any of the face angles D, O or Z are changed then its intercepted great circle arc also changes as does the spherical triangle AD, AO, AZ. Obviously all of the rules of spherical geometry apply.

With reference to the above the term "spherical geometry" for the purpose of this embodiment means the movement of component parts of a joint in such a manner that they describe or form spherical geometric forms or functions.

The primary purpose of the present embodiment is to provide firstly a basis for a genre of constant velocity universal joint having members interposed between a first rotating shaft and a second rotating shaft where each of the moving or operating interposed members describe spherical geometric forms or functions and the second purpose of the present invention is to provide several specific and novel iterations of constant velocity universal joint based upon spherical geometry.

From the following it will be seen that basing constant velocity joints on spherical geometry 15 rather than geometry other than spherical provides for joints of reduced size and also joints having no sliding and/or skidding components.

The sixth embodiment described earlier provided for a means to form identical spherical triangles in each half of a joint so as to provide a means to maintain an interposed member on the homokinetic plane of the joint described therein. The above mentioned embodiment described a centering means consisting of a shaft having a crankpin at either end and also provided for two yokes each having a pin located on the inside surface and where the extended axis of the said crankpins and of the said pins intercepted the geometric centre of the joint described. For the purpose of clarity the joint described in the sixth embodiment comprised of a modified Hooke's joint having two halves as depicted in FIG. 16.2 herewith. An interposed connecting member is depicted in FIG. 16.3 and consists of a disk like member 15 with a hole 17 in the center and two lugs 16 fixed to it such that the two lugs are used to connect the two halves of the joint shown in FIG. 16.2 by locating the said lugs in the holes 8, 9, 10 and 11 shown in FIG. 16.2. FIG. 16.5 depicts a shaft member 12 having arms 13 and crankpins 18 located at either end oriented in such a manner as the extended axis A6 of the said crankpins intersect at the geometric centre of the joint when assembled. FIG. 16.4 shows a depiction of shaft 12 assembled with disk like member 15. FIG. 16.6 shows yoke member 3 and yoke member 4 each of which has a pin 19 and 20 protruding from the inside surface of the yokes and which pins are oriented such that the extended axis of each pin intersects the geometric centre of the joint upon assembly. The said yokes are assembled such that the pins 19 and 20 are on the same side of the joint or in other words that the extended axis of pins 19 and 20 are not in line or coaxial. Two instances of a further member 21 as depicted in FIG. 16.7 are provided, this member has a hole 22 at either end and the length of the said member and the angle between the said holes is such that upon assembly of the joint the first such member is located at one end on pin 19 and on the other on its adjacent pin 18 and the second such member is located on pin 20 and the second pin 18. The length of each of the members 21 and the angle between the holes 22 in each of member 21 is such that upon assembly of the joint and when the axis A1 and A2 are in line two identical right spherical triangles having the sides G, H, I and J, K, L as depicted in FIG. 16.8 are formed one in each half of the joint and with the right angle being on the axis of the input or output shaft as the case may be. The first member 21 forms side I on the first right spherical triangle and the second member 21 forms side J on the second right spherical triangle.

FIGS. 16.8A and 16.8B are both depictions of the joint according to the above described embodiment. It will be observed by an analysis of FIGS. 16.8A and 16.8B together with the foregoing that at any time when the axis of the input shaft and the output shafts are inclined to one another a unique spherical triangle is formed for each possible rotational position and angular position and it will be further observed that the spherical triangle formed in each half of the joint by virtue of the construction must be identical to each other with the result that the plane of rotation of axis A5 as shown in FIG. 16.1 and as located by lugs 16 must always bisect the angle which exists from time to time between the axis of the input and output shafts.

While the joint and centering means described above utilizes spherical geometry to provide the centering means the remaining components other than the centering means all describe disks or planes centred upon the geometric centre of the joint upon rotation and each of these disks may be described by simple planar geometry. From the following it will be seen that it is advantageous to modify the above described joint according to the present invention which is to provide construction such that the components and the relationship between components describe shapes and forms found in spherical geometry and not in planar geometry.

13. Thirteenth Embodiment

With reference to FIG. 16.9 of FIG. 16 there is provided a member 22 which is a disk-like member with a hole 32 in the centre. Its purpose and function is identical to member 15 as described above in respect of the twelfth embodiment. Member 22 has two pins 23 and 24 rigidly attached. Members 25, 26, 27 and 33 are each identically formed components which are formed to an arc centred upon the assembly shown in FIG. 16.9 and each of members 25, 26, 27 and 33 are free to rotate upon pins 23 and 24. To complete the joint two yokes are provided identical to those shown in FIG. 16.6 one such yoke is located on pins 28 and 29 while the other yoke is located on pins 30 and 31. Centering means are provided as disclosed on the first described joint consisting of members 12, 13, 18, 19, 20 and 21 as shown in FIGS. 16.5, 6 and 7. FIG. 16.10 is a depiction of the assembled joint shown while the axis of the input shaft and output shaft are in line and the view shown is directly along the axis of shaft 2 as numbered in FIG. 16.2. Only the ends of the forks of yoke 3 are visible in this view. It will be seen that with operation of the last described joint at any time that the axis of the input shaft and the output shaft are inclined to one another then there is a spherical triangle formed by the intercepted arcs of the trihedral formed by the axis of pins 23, 28 and 31 and a further identical spherical triangle formed by the intercepted arcs of the trihedral formed by the axis of pins 24, 29 and 30 excepting that twice per revolution when the axis of pins 28 and 31 are coaxial there is momentarily no trihedral formed on either side of the joint. It will also be seen that with operation of the joint pins 28, 29, 30 and 31 each describe great circle arcs and a great circle arc exists between the axis of pins 28 and 31 and also between the axis of pins 29 and 30. It will be observed that with operation of the last described joint there are four constantly changing spherical triangle formed within the joint in that in addition to the last described spherical triangles there are the two spherical triangles associated with the centering means described above.

14. Fourteenth Embodiment

A further modification enable by adhering to spherical geometry rather than planar geometry is shown with reference to FIG. 16.11 of FIG. 16. This further modification provides for a linkage mechanism identical to that shown in FIG. 16.9 excepting that members 27 and 33 are omitted. With reference to FIG. 16.12 there is also provided two yokes as shown in FIG. 16.6 excepting that one arm on each of the yokes is omitted or shortened, it will be observed that in order to maintain pins 19 and 20 on the same side of the joint it is necessary to extend at least one of the foreshortened arms so as to locate pin 20 or pin 19 as the case may be in the required position. With this iteration it will be seen that operation is identical to the last described joint excepting that the spherical triangles related to pins 23 and 24 are both right spherical triangles formed between the axis of pins 23 and 31 and the point where the arc described by pin 31 intercepts the arc of the plane of rotation of pin 23 and the identical triangle is formed on the other side in relation to pins 24, 30 and the arc of pin 24.

It will be observed that in the last three described joints the centering means itself is capable of transmitting power through the joint and in the joints described it does take part of the load. It is possible therefore to construct a constant velocity joint constructed solely from the centering means provided by pins 19, 20 together with the members depicted in FIGS. 16.5 and 16.7.

With reference to FIG. 16.13 shaft 12 is rigidly located to a surface by bearing means 36 and associated mount. Shafts 37 and 38 are also rigidly fixed in such a manner that while the angle between their axes may be either fixed or variable their axes always intersect at the centre of shaft 12 and the axis of the two crankpins 18 and the axis of pins 19 and 20 also intersect at the same point.

It will be readily obvious to an ordinary worker that such an assembly may be incorporated into a stand alone supporting means such as a hollow ball joint from which extends tubes so as to locate shafts 37 and 38.

15. Fifteenth Embodiment

With reference to FIG. 16, a further embodiment is described below. While each of the above described embodiments may be broadly classed as modified Hooke's joints a quite different embodiment can be described which is more akin to the Rzeppa joint. With reference to FIG. 16.14 there is provided a member substantially similar to that depicted in FIG. 16.12 excepting that the spherical plane of the spherical triangle described by members 25 is a solid member 36 of at least that size and shape and similarly on the other side of the joint the spherical plane described by member 26 is also a solid member of at least that size and shape. (notwithstanding the appearance of the drawing in FIG. 16.14 the assembly is symmetrical). Formed into the surface of each solid 36 and 37 is a groove which describes a great circle as would be described by pins 30 and 31 if they were present in this iteration. There is also provided two yokes 38 and 39 as depicted in FIG. 16.15 each such yoke having an extended and curved arm and each having a groove 40 and 41 formed in the inside surface of each of yoke 38 and 39 such that with operation of the joint the ball rolls in the grooves with sliding or skidding. Assembly of this joint is similar to the foregoing descriptions where yokes are used excepting that a ball is interposed between yoke 39 and solid 36 and also between yoke 38 and solid 37. In the last described iteration the third and fourth spherical triangles formed are formed by the great circle arcs between the axis of pin 23 and the centre of the ball and between the point where the path of the ball intercepts the plane of rotation of pin 23 and similarly on the other side, the first and second spherical triangles are formed by the centering means as described elsewhere above.

From the foregoing it will be observed that a potential common characteristic where all of the moving members operate to describe spherical geometry paths and constructions of the type referred to in this specification it is believed possible to construct forms of substantially constant velocity joints where there are no sliding and/or skidding members. It may also possible to reduce all of the component members to members of simple construction whereas in all iterations of the prior art relating to constant velocity joints which do not adhere to spherical geometric functions it is submitted that there is both sliding and/or skidding components and also members of extremely complex construction.

16. Sixteenth Embodiment

FIG. 17.1 is a copy of FIG. 16.2 and is a representation of the two halves of a modified Hooke's joint as is well known and referred to in the earlier embodiments. With reference to FIG. 17.2 the method of this sixteenth embodiment provides for two yokes 3 and 4 each of which have a pin 19 and 20 located on the inside arcuate surface of the said yokes as disclosed in the earlier embodiments. FIG. 17.3 and FIG. 17.4 represent the members which are unique to the presently described or disclosed centering means. FIG. 17.3 is a representation of a circular ring like member having an inside diameter greater than the diameter of the ring member 5 shown in FIG. 17.1 FIG. 17.4 is a further circular ring like member having an inside diameter greater than the outside diameter of the circular member shown in FIG. 17.3. With reference to FIG. 17.3 circular ring like member 21 has two lugs or trunnions 24 and 25 diametrically opposed to one another and holes with bearing means 22 and 23 to permit or facilitate assembly of ring 21 on axis A5 as shown in FIG. 17.6. With reference to FIG. 17.4 circular ring like member 26 has two diametrically opposed holes with bearing means to permit or facilitate assembly of ring member 26 with ring member 21 where lugs or trunnions 24 and 25 are located in bearing means 27 and 28 respectively. With further reference to FIG. 17.4 members 29 and 30 are pins having their axis coaxial with a radii of ring member 26 and each of the said pins being equally angularly disposed from the centre of bearing means 27 and 28 respectively. Circular ring like members 21 and 26 are assembled as shown in FIG. 17.5 and further assemble in relation to the joint as shown in FIG. 17.6. Two arcuate members as depicted in FIG. 17.7 are provided with each having an arc or angle between holes 32 and 33 being equal to the angle between members 29 and 19 and also between members 30 and 20 when the axis of shafts 1 and 2 are in line with one another so that a first spherical triangle is formed on the first half of the joint shown in FIG. 17.6 and a second spherical triangle is formed on the second half of the joint shown in FIG. 17.6 with the first spherical triangle being formed by the great circle arcs existing between pin 29 and pin 19 and pin 19 and the axis of shaft 1 and the axis of shaft 1 and pin 29. The second spherical triangle is formed by the great circle arcs existing between the corresponding points and members in the second half of the joint.

It will be observed that the assembly disclosed herein effectively performs the identical function as does the assembly described in the twelfth embodiment wherein the shaft with the crankpin at either end is utilized to perform the identical task as does ring member 26 and pins 29 and 30 as disclosed herein.

The assembly disclosed herein facilitates the use of a member as depicted in FIG. 17.8. The member depicted in FIG. 17.8 is a shaft member adapted to connect to the center of the joint as either an input shaft or output shaft in place of one of the yoke members. So as to facilitate operation of the centering mechanism as disclosed herein the member shown in FIG. 17.8 has an arcuate slot 36 formed therein so as to permit ring members 21 and 26 to pass through and within the said arcuate slot there is provided a pin 37 so as to perform the same task as pin 19 or 20 as the case may be. FIG. 17.9 is a depiction of the linkage mechanism disclosed in the eleventh embodiment. It will be observed that the centering means disclosed herein together with the member depicted in FIG. 17.8 is particularly applicable as a suitable centering means for a constant velocity joint utilizing the linkage means depicted in FIG. 17.9. In such an application bearing 22 and 23 would be located by pins 38 and 39 respectively.

The present embodiment is a further instance of the centering means which forms a first spherical triangle in a first half of a constant velocity joint and also forms an identical spherical triangle in a second half of a constant velocity joint so as to maintain or constrain members of the joint on the homokinetic plane of the joint as the said spherical triangles continuously change but remain identical to one another with operation of the joint.

17. Seventeenth Embodiment

This embodiment, with reference to FIG. 18 is a hybrid of the earlier joints disclosed together with a truncated instance of the specific instance of the centering mechanism disclosed in the sixteenth embodiment.

With reference to FIG. 18, FIG. 18.1 is yoke member 1 with a shaft 2 attached and holes 4 and 5 in the yoke member. A pin 3 protruding from the inside arcuate surface of the yoke 1. The axis A1 of pin 3 intersects the axis A2 of holes 4 and axis A3 of shaft 2. FIG. 18.2 is a circular member 6 having four equally spaced holes 7, 8, 9 and 10 in the sides. FIG. 18.3 is a further circular member 11 having an outside diameter smaller than the inside diameter of circular, member 6. Circular member 11 has four equally spaced holes 12, 13, 14 and 15 in the sides.

FIG. 18.4 and FIG. 18.5 are a side elevation and plan respectively of a shaft member 16 having a hole 17 through it and protrusion 18 attached. Two arcuate members 19 and 20 are attached to protrusion 18 one of which is solely for balance purposes while the other is to provide supporting means for pin 21. The axis A5 of pin 21 intersects axis A4 and A6 which are the axis of shaft 16 and hole 17 respectively.

FIG. 18.6 depicts part circular members 22 and 23. Member 22 has a pin 24 which is assembled into hole 25 and supported by bearing means 26 such hat member 22 may rotate on axis A7.

Member 22 has pins 27 and 28 equally spaced from axis A7.

FIG. 18.7 depicts an arcuate member having two holes 30 and 31, two such members are provided.

Assembly of the various component parts is shown in FIG. 18.8, FIG. 18.9 and FIG. 18.10 which are a plan view and side elevation section and side elevation respectively of the assembled joint. One member 29 is assembled on pins 27 and 3 while the second member 29 is assembled on pins 28 and 21.

FIG. 18.11 is a further view of the assembled joint with components not numbered.

FIG. 18.12 is a representation of the two spherical triangles formed by the above assembly. The first spherical triangle has the sides formed by the great circle arcs between members 3, 27 and 24 while the second spherical triangle is formed by the great circle arcs between members 21, 28 and 24. It will be observed that when the axis members 2 and 16 are coaxial then both of the abovementioned spherical triangles are right spherical triangles and that with operation of the joint at any time when axis A4 and A3 are not coaxial then the said spherical triangles continuously change but remain identical to one another with the result that the pin connecting means 60 between members 11, 6 and 23 is constrained to continuously rotate on the homokinetic plane of the joint.

With reference to FIG. 18.13 which is a representation of a sphere, spherical triangles A, B, C and A, E, D are formed with the relationships shown and with the corresponding members of the joint shown in brackets.

As an alternative to the members disclosed and depicted in FIG. 18.4 and FIG. 18.5 member 11 is provided with a series of lands and grooves or spline cut into the inner circular surface and holes 12 and 13 are omitted. In such an embodiment an arm is rigidly fixed to the alternative member 11 so as to locate pin 21 in the same relative position as disclosed herein.

18. Eighteenth Embodiment

With reference to FIG. 19.1 this embodiment introduces the doubling of the equal spherical triangle centering mechanism disclosed in the earlier embodiments, to become the scissor mechanism employed in the coupling of the first embodiment.

19. Nineteenth Embodiment

With reference to FIG. 20, this embodiment has two forms, firstly a constant velocity joint or coupling for coupling two shafts which have fixed angular axial displacement and secondly a constant velocity universal joint or coupling for the coupling of two shafts which have variable angular axial displacement. In both instances the extended axis of the two shafts intersect at a point and in the second instance the axis may also be coaxial.

With reference to FIG. 20.1 there is provided a means to rigidly locate at least three pins or trunions equally radially spaced from a central axis and equally angularly spaced from one another and such that the extended axis of the said pins or trunnions all intersect at a point. FIG. 20.1 shows one preferred embodiment of such a member and the embodiment shown is on the bottom of part spherical concave profile and on the top of part spherical convex profile and has three equally dimensioned arms radiating from the centre of the member and three holes are provided, one in each arm for the receiving of a pin.

For the purpose of this embodiment as it relates to joints or couplings for shafts having a fixed angular displacement there is provided two such members as depicted in FIG. 20.1 with the concave inner surface of the first such member of a greater radius than the convex outer surface of the second such member such difference in radii being greater than the radial thickness of the linkage member set out in FIG. 20.2 and described below. FIG. 20.2 depicts a curved or part spherical member having essentially parallel sides and a pin protruding from either end such that the extended axis of the said pins intersect at a point which is also intersected by a radial bisecting the axis of the two pins and perpendicular to the inner or concave surface of the said member. One such pin protrudes from the concave side while the second such pin protrudes from the convex side. The outer or convex surface having a radius less than the concave side of the first or larger instance of the member depicted in FIG. 1 while the inner or concave surface has a radius greater than the convex surface of the second or smaller instance of the member depicted in FIG. 20.1.

For the purpose of this embodiment of as it relates to couplings for shafts having a fixed angular displacement there is provided three instances of the member depicted in FIG. 20.1 each of identical dimension and each such member has an angular distance between the axis of the pins at either end equal to the fixed angular displacement of the shafts which it is intended to couple but in no instance can that angle be greater than the angle of the lesser great circle arc between any two of the holes in the members depicted in FIG. 20.1 minus the angle between the axis of a pin of the curved member depicted in FIG. 20.2 and its nearest adjacent end.

The above described members are assembled as follows.
1. The pin protruding from the convex side of each of the three instances of the member depicted in FIG. 2 is rotatably located into the holes in the concave surface of the larger instance of the members depicted in FIG. 20.1.
2. The pin protruding from the concave side of the member depicted in FIG. 20.2 is rotatably located in the holes in the convex surface of the smaller instance of the member depicted in FIG. 20.1.

The above described members and assembly thereof provide a three layered assembly where each of the three instances of the members depicted in FIG. 20.2 connect or link between a hole in the larger instance of the member depicted in FIG. 20.1 with a hole in the smaller instance of the member depicted in FIG. 20.1 and where the extended axis of each of the pins protruding from each of the three instances of the member depicted in FIG. 20.2 and the extended axis of each of the holes in both instances of the member depicted in FIG. 20.1 intersect at a point. In addition with the above assembly the arc between the axis of the pins of each one of the three instances of the member depicted in FIG. 2 lies on a great circle arc centred upon the point of intersection of all of the before mentioned axis namely the extended axis of each of the three holes in the larger instance of the member depicted in FIG. 20.1 and the extended axis of the three holes in the smaller instance of the member depicted in FIG. 20.1 and the extended axis of each of the pins protruding from each of the three instances of the member depicted in FIG. 20.2. In addition the axis of each of the instances of the member depicted in FIG. 20.1 also intersect at the same point.

FIG. 20.3 is a schematic, side elevation, sectional, depiction of the above described assembly without regard to perspective. With respect to FIG. 20.3 member 1 is the larger instance of the member depicted in FIG. 20.1, members 2 and 3 are a first and second instance of the member depicted in FIG. 20.2, member 6 is the smaller instance of the member depicted in FIG. 20.1, members 4, 5, 7 and 8 are the pins protruding from members 2 and 3 as described above and each such pin is located in a hole of either the larger or smaller instance of the member depicted in FIG. 20.1. Axis A1, A3, A4 and A6 are each extended axis of the pins 7, 4, 8 and 5 respectively and axis A2 and A5 are respectively the axis of members 6 and 1.

The above described assembly provides a constant velocity linkage system whereby if axis A2 and A5 are held in fixed relationship to each other and member 1 is caused to rotate about axis A5 then the linkages provided between members 1 and 6 by each of the three instances of the member depicted in FIG. 20.2 two of which are visible in the view shown in FIG. 20.3 will cause member 6 to rotate about axis A2 at an identical angular velocity to the rotation of member 1 about axis A5 and the reverse is also true in that if member 6 is caused to rotate about axis A2 then the said linkages will cause member 1 to rotate about axis A5 at an identical angular velocity to member 6.

Using the above described assembly or linkage system is it possible to provide a constant velocity coupling or joint for two shafts having a fixed angular displacement. Where the above described assembly is schematically represented by a block representation as set out in FIG. 20.4 attention is drawn to FIG. 20.5 which is a representation of a complete joint or coupling.

With regard to FIG. 20.5 base 12 is a solid base having a corner 15 around which it is required to transmit shaft power from a first shaft 10 to a second shaft 11. Shaft 10 is rigidly mounted to base 12 by means of bearing and mounting means 13 and shaft 11 is similarly rigidly mounted to base 12 by bearing and mounting means 14. Any suitable connecting means is used to rigidly connect shaft 10 to assembly 9 such that it is fixed to member 6 and coaxial with axis A2 as depicted in FIG. 20.3 and similarly any suitable fixing means are used to rigidly connect shaft 10 to assembly 9 such that it is fixed to member 1 and coaxial with axis A5 as depicted in FIG. 20.3. Point B is the point of intersection of all of the above described axis and also of the axis of shafts 10 and 11. Such an assembly will transmit power at a constant or uniform angular velocity from shaft 10 to shaft 11.

In order to provide a constant velocity universal joint or coupling capable of transmitting power between shafts having a variable angular axial offset there is firstly provided an assembly identical to that described above and depicted in FIG. 20.3 together with three further instances of the members depicted in FIG. 20.2 and one further instance of the member depicted in FIG. 20.1 where the further three instances of the member depicted in FIG. 20.2 and the further instance of the member depicted in FIG. 20.1 have a decreasing radius so as to form a further layer added below or more central to the point B as depicted in FIG. 20.3 to the earlier described assembly, although the members decrease in physical size their angular size is identical to those corresponding members in the higher layers so that all axis intersect at a point.

FIG. 20.6 is a representation of an embodiment configured to provide an assembly suitable for inclusion in a joint or coupling where the shafts have a variable angular relationship to one another. Member 22 is a third instance of the member depicted in FIG. 20.1 and has the same angular size as the first two instances of the said member namely members 1 and 6. Members 16 and 17 are a fourth and fifth instance of the member depicted in FIG. 20.2 and they have the same angular size as the first three instances. It should be noted that the third and sixth instance of the member depicted in FIG. 20.2 are not visible and not shown in the perspective shown in FIG. 20.6. Shaft 23 is rigidly connected to the centre of the concave surface of member 22 and shaft 24 is rigidly connected to the convex surface of member 1 such that in the position of the assembly as depicted in FIG. 20.6 shafts 23 and 24 are coaxial with one another and also coaxial with the axis of members 1 and 22. All axes converge on point B.

In order for the last described assembly to function as a constant velocity universal joint it is necessary to provide a mounting or coupling which provides for angular movement of the axis of shafts 23 and 24 while concurrently constraining the axis of shafts 23 and 24 such that at any time when the axis of the said shafts are not coaxial they intersect at a point. Where the assembly depicted in FIG. 20.6 as described above is schematically represented by a block representations as depicted in FIG. 20.7 attention is first drawn FIG. 20.8 which is a representation depicting the important relationships between the shafts and the assembly disclosed above. During operation of the joint of this embodiment it is important that point B as shown in FIG. 20.6 always falls on the axis of shaft 23 and it is important that a point on the axis of shaft 24 always falls on a spherical plane centred upon point B. If constructed with sufficient strength and tolerance the assembly depicted in FIG. 20.6 will maintain the required relationships or alternatively constraining means may be provided to maintain the said relationships, one example of such a constraining mechanism is depicted in FIG. 20.9.

With respect to FIG. 9 yoke 25 has a bearing means 26 adapted to receive shaft 24 such that shaft 24 may rotate within bearing means 26. Bearing means 27 is adapted to receive shaft 23 such that shaft 23 may rotate within bearing means 27 but is held rigidly such that point B as 10 depicted in FIG. 20.6 and FIG. 20.8 is always located at the intersection of the axis A7 and A8. Axis A7 is the axis for bearing means 27 within housing 28, axis A8 in turn is the axis for housing 28.

It will be seen that with an assembly such as that disclosed herein and depicted in FIG. 20.6 and constrained so that point B as depicted in FIG. 20.6 is the point of axis of all the above mentioned axes, there is provided a constant velocity universal joint without any load bearing sliding surfaces as distinct from rotating surfaces and which has all operating members operating to transfer or transmit the torque from a first shaft to a second shaft being of part spherical construction and operating within a spherical system.

There is claimed a joint having the characteristics inherent in the construction disclosed and a joint based upon spherical geometry and a joint having the construction first described and depicted in FIG. 20.3 and a joint having the construction second described and depicted in FIG. 20.6 and there is claimed a mounting means as described and set out in FIG. 20.5 and also FIG. 20.9.

20. Twentieth Embodiment

With reference to FIG. 21, this embodiment provides for two instances of the assembly depicted in FIG. 21.3 which is a spherical four bar linkage with the extended axes of each of the four axis A1, A2, A3 and A4 in the linkage extending to a single point and where the arcs between each axis form great circle arcs.

A mounting means is provided in the centre of the double yoke member 5 such that the two instances of the assembly depicted in FIG. 21.3 are held within double yoke member 5 in relationship to each other as depicted in FIG. 21.4. In FIG. 21.4 points P1 and P2 represent the centre of cruciform members 1 and 2 respectively, C1 and C2 are great circles of spheres centred upon points P1 and P2 respectively.

A pin (not shown) extends from shaft members 3 and 4 such that the axis of each such pin extends radial from point P1 and P2 respectively when assembled and forms the axis for axis A3 in each instance of the assembly depicted in FIG. 21.3.

It will be observed that with such an assembly if means are provided to cause both instances of the assembly depicted in FIG. 21.3 to move uniformly with operation of the joint then the angle between shaft 1 and double yoke member 5 will remain the same as the angle between shaft 4 and double yoke member 5 and the necessary requirements for a constant velocity joint of the double Cardan type will have been satisfied.

One method of ensuring that the two instance of the assembly depicted in FIG. 21.3 move uniformly is to rigidly connect the first instance of member 6 with the second instance of member 6 and similarly rigidly connect the two instances of member 7.

One method of rigidly connecting each instance of member 6 to each other is to provide a single member as shown in FIG. 21.5 where pins 10 and 11 provide the axis for each of the two instances of axis A2 and hole 12 is axis A1.

It will be observed without further illustration that the two instances of member 7 may also be constructed as a single component as in FIG. 21.5.

21. Twenty-First Embodiment

With reference to FIG. 22, a further embodiment is described for constraining the mechanism of the seventeenth embodiment so that the spherical triangles formed by that mechanism remain identical to one another with operation of the joint.

FIG. 22.1 hereof is a further depiction of the mechanism depicted in FIG. 18.12 thereof. FIG. 22.2 hereof is a depiction of the mechanism disclosed in the eighteenth embodiment. FIG. 22.3 hereof is an exploded view of a constant velocity joint according to the disclosures of the seventeenth and eighteenth embodiments. FIGS. 22.4, 5 and 6 are assembled views of that joint with the spherical assembly numbered 7 in FIG. 22.3 being the spherical linkage disclosed in substance in the eighteenth embodiment.

With reference to FIG. 22.1 hereof it will be observed that arm or bar 1 is free to pivot about axis A1 and arm or bar 2 is free to pivot about axis A2 such that angles 4 and 5 which are the angles between bar 1 and bar 3 and between bar 2 and bar 3 respectively may differ from one another. The present disclosure is to provide a means whereby angles 4 and 5 are continuously essentially identical to one another with the result that the two spherical triangles formed by the mechanism remain identical to one another.

According to the present embodiment, with reference to FIG. 22.7 hereof there is provided a mechanism as disclosed in FIG. 1 hereof with the addition of a gear wheel 6 interposed between arm 1 and arm 2. Arm 1 and arm 2 are each provided with gear teeth to mesh with gear wheel 3. With such a mechanism it will be observed that angles 4 and 5 will always remain substantially identical to one another with the result that the spherical triangles formed by the mechanism also remain substantially identical to one another.

According to the present embodiment therefore there is disclosed a centering mechanism as depicted in FIG. 22.7 and there is provided a constant velocity joint as depicted in FIGS. 22.3, 4, 5 and 6 wherein the centering mechanism 7 is replaced with the mechanism disclosed in FIG. 22.7 hereof.

SUMMARY

Summary of Embodiments

First Embodiment

A constant velocity coupling wherein the axes of all rotational elements intersect at the intersection of the input and output shaft axes. The coupling is provided with a control yoke and control mechanism wherein the control yoke defines an axis of rotation bisecting the supplementary angle between the input shaft axis and output shaft axis of the coupling.

The control mechanism is in the form of a double scissor assembly where all linkages have axes radial to the intersection point of the input and output shaft axes, the pivoting centers of the control linkages effectively lying at the vertices of equal spherical triangles.

Second Embodiment

A constant velocity coupling wherein all elements are identical to those of the first embodiment except that the control mechanism consists of a geared mechanism where two linkage arms provided with gear segments mesh with a central gear, this assembly controlling the axis of the control yoke to lie on the bisector of the supplementary angle between the input and output shaft axes.

Third Embodiment

A constant velocity coupling wherein either the scissor mechanism of the first embodiment, or the geared mechanism of the second embodiment controlling the axis of the control yoke to lie on the bisector of the supplementary angle between the input and output shaft axes but where the inner and outer yokes are modified from a full circular form to a partial segment form.

Fourth Embodiment

A constant velocity coupling where the rotational elements supporting the ends of the input and output shafts are separated by a connecting tube and where the connecting tube supports a control mechanism such that the tube axis is constrained to lie on the bisector of the supplementary angle between the input and output shafts.

Fifth Embodiment

A constant velocity coupling in which the angle between the input and output shafts may be varied from time to time by a control mechanism, the control mechanism further constraining the orientation of a control yoke such that its axis of rotation lies on the bisector of the supplementary angle between the input and output shafts. The coupling incorporates a swash plate variable hydraulic displacement device.

ADDITIONAL EMBODIMENTS

In one form an embodiment provides for a constant velocity coupling in a first form in which a control mechanism may be tailored to a particular fixed angle between the axes of the input shaft and the output shaft using a limited assembly of control elements. The control elements are based on spherical geometrical forms.

In a second form, an extended assembly of similar control elements are adapted to provide a control mechanism for a constant velocity coupling in which the angle between input and output shafts is variable.

In a further embodiment a constant velocity coupling is provided having a control mechanism of the form described in the first preferred embodiment. The initial form (as disclosed in PR5731) comprised one half of the scissor mechanism of the first embodiment with the modification to the double scissor system in PR5992.

In a further embodiment, the conditions for a constant velocity coupling are realized through a variety of linkages to constrain the alignment of the axis of rotation of a control yoke such that the axis bisects the supplementary angle between the axes of the input and output shafts of the coupling. The control linkages are formed as elements based on arcs of spherical triangles.

In a further embodiment a linkage mechanism is disclosed which is a novel realization of the principles of an inner and outer yoke system or gimbal system such as commonly used in double Cardan joints. It is in the form of the yoke mechanism as utilized in the fourth preferred embodiment.

Yet a further embodiment discloses a centering mechanism for a constant velocity coupling comprising a system of intermeshing pinion gears and levers to control the angular relationship between the two halves of the coupling.

With particular reference to the first embodiment described with reference to FIGS. 1 to 4 it will be noted that a significant number of the characteristics referred to in the introductory portion of the detailed description with reference to FIG. 23 are exhibited by this embodiment including:

(a) The control yoke in conjunction with the scissor mechanism and forming the control mechanism for the gimbal assembly comprising the inner and outer yoke operates entirely symmetrically about the supplementary angle bisector 308 (designated C in FIG. 4);

(b) All axes of the control mechanism pass through the coupling centre 307 (also termed geometric centre);

(c) The otherwise substantially unconstrained linkage between the input and output shafts provided by the gimbal mechanism in the form of the inner yoke and outer yoke is constrained by the control mechanism in the form of the control yoke, in this instance so that axis YY (referred to in FIG. 1) lies on the homokinetic plane.

The above describes only some embodiments of the present invention and modifications, obvious to those skilled in the art, can be made thereto without departing from the scope and spirit of the present invention.

What is claimed is:

1. A constant velocity coupling wherein conditions for substantially equal instantaneous transfer of angular velocities between an input shaft and an output shaft are maintained, said coupling including:
  (a) an input shaft defining an input shaft rotation axis;
  (b) an output shaft defining an output shaft rotation axis;
  (c) a plurality of input axes about which said input shaft and said input shaft rotation axis pivot;
  (d) a plurality of output axes about which said output shaft and said output shaft rotation axis pivot;
  (e) an input pivot point where said input shaft rotation axis and each of said input axes intersect and about which input pivot point said input shaft is free to pivot in any direction;
  (f) an output pivot point where said output shaft rotation axis and each of said output axes intersect and about which output pivot point said output shaft is free to pivot in any direction;
  (g) a geometric centre being that point where the said input pivot point and said output pivot point coincide;
  (h) a control yoke;
  (i) a homokinetic plane defined as being that plane which bisects an angle between said input shaft rotation axis and said output shaft rotation axis and wherein the homokinetic plane is perpendicular to a plane containing both said input shaft and output shaft axes;
  (j) at least one torque transmitting member adapted to connect an input half or side of said coupling with an output half or side of said coupling; said torque transmitting member transmitting torque from said input side to said output side of said coupling;
  (k) a first or input shaft control pin having an input control pin axis in fixed angular relationship with said input shaft rotation axis; said input control pin axis intersecting said input shaft rotation axis at an acute angle at said input pivot point;
  (l) a second or output shaft control pin having an output control pin axis in fixed angular relationship with said output shaft axis; said output control pin axis intersecting said output shaft rotation axis at an acute angle at said output pivot point, said input shaft control pin axis and said output shaft control pin axis continuously having an angle less than 180 degrees between them and where said control pin axes are continuously contained within a same hemisphere as one another, that hemisphere being a hemisphere of a sphere centered upon said geometric centre; and
  (m) a control mechanism which on a first or input side is in pivotal relationship with and controlled by said input shaft control pin and on a second or output side is in pivotal relationship with and controlled by said output shaft control pin, said control mechanism comprising a plural bar linkage mechanism having link axes radial to said geometric centre and a central axis radial to said geometric centre and normal to said homokinetic plane and where said control mechanism has the characteristics of a spherical pantograph so as to replicate relative motion of the linkage bars and link axes on either side of the central axis of the said control mechanism and thereby constraining the said central axis to continuously bisect the angle between said input shaft control pin axis and said output shaft control pin axis, said control mechanism being entirely contained in the same hemisphere as that containing the said input shaft control pin axis and said output shaft control pin axis, said control mechanism adapted to constrain a rotation axis of said control yoke to be continuously coaxial with the central axis of said control mechanism such that the rotation axis of said control yoke is thereby constrained to continuously bisect an angle between said input shaft control pin axis and said output control pin axis and to be continuously coincident with a bisector of a supplementary angle between said input shaft rotation axis and said output shaft rotation axis, said control yoke adapted to constrain said torque transmitting member.

\* \* \* \* \*

UNITED STATES PATENT AND TRADEMARK OFFICE
CERTIFICATE OF CORRECTION

| | | |
|---|---|---|
| PATENT NO. | : 7,144,326 B2 | |
| APPLICATION NO. | : 10/472969 | |
| DATED | : December 5, 2006 | |
| INVENTOR(S) | : Glenn Alexander Thompson | |

It is certified that error appears in the above-identified patent and that said Letters Patent is hereby corrected as shown below:

Title Page

Item (57) (Abstract), line 1, delete "rotabably" and insert -- rotatably --

Column 1

Line 21-22, delete "2001, which are hereby incorporated in their entirety be reference herein" and insert -- 2001. --

Column 5

Line 9, delete "CC" and insert -- C-C --

Column 7

Line 13 (approx.), delete "gear.", and insert -- gear --

Column 9

Line 67, delete "a", and insert -- $\alpha$ --

Column 10

Line 5 (approx.), delete "th" and insert -- the --

Line 50 (approx.), before "ring" delete "inside the"

Column 14

Line 29, delete "Axis" and insert -- axis --

Line 50, delete "Members'" and insert -- Members --

Column 15

Line 8, delete "hooke's" and insert -- Hooke's --

Line 9, delete "cardan" and insert -- Cardan --

UNITED STATES PATENT AND TRADEMARK OFFICE
CERTIFICATE OF CORRECTION

| | | |
|---|---|---|
| PATENT NO. | : 7,144,326 B2 | Page 2 of 2 |
| APPLICATION NO. | : 10/472969 | |
| DATED | : December 5, 2006 | |
| INVENTOR(S) | : Glenn Alexander Thompson | |

It is certified that error appears in the above-identified patent and that said Letters Patent is hereby corrected as shown below:

<u>Column 15 (continued)</u>

Line 17, delete "Axis" and insert -- axis --

Line 45, delete "Axis" and insert -- axis --

Line 65, delete "0" and insert -- O --

<u>Column 19</u>

Line 33 (approx.), after "FIG. 17.1" insert -- . --

<u>Column 20</u>

Line 44, delete "circular," and insert -- circular --

<u>Column 21</u>

Line 45, delete "trunions" and insert -- trunnions --

<u>Column 22</u>

Line 20, delete "follows," and insert -- follows: --

Signed and Sealed this

Twenty-ninth Day of April, 2008

JON W. DUDAS
*Director of the United States Patent and Trademark Office*